US012769334B2

(12) United States Patent
Hamilton

(10) Patent No.: US 12,769,334 B2

(45) Date of Patent: Oct. 20, 2026

(54) ROBOT WITH TENNIS BALL GATHERING CAPABILITIES

(71) Applicant: Clutterbot, Inc., Claymont, DE (US)

(72) Inventor: Justin David Hamilton, Wellington (NZ)

(73) Assignee: Clutterbot, Inc., Claymont, DE (US)

( * ) Notice: Subject to any disclaimer, the term of this patent is extended or adjusted under 35 U.S.C. 154(b) by 0 days.

(21) Appl. No.: 18/819,175

(22) Filed: Aug. 29, 2024

(65) Prior Publication Data

US 2026/0064133 A1 Mar. 5, 2026

(51) Int. Cl.

| | |
|---|---|
| ***G05D 1/667*** | (2024.01) |
| ***A63B 47/02*** | (2006.01) |
| ***G05D 1/246*** | (2024.01) |
| ***G05D 1/661*** | (2024.01) |
| *G05D 105/60* | (2024.01) |
| *G05D 107/20* | (2024.01) |

(52) U.S. Cl.

CPC ........... *G05D 1/667* (2024.01); *A63B 47/021* (2013.01); *G05D 1/246* (2024.01); *G05D 1/661* (2024.01); *A63B 2047/022* (2013.01); *G05D 2105/60* (2024.01); *G05D 2107/24* (2024.01)

(58) Field of Classification Search

CPC ........ G05D 1/667; G05D 1/661; G05D 1/246; G05D 2107/24; G05D 2105/60; A63B 47/021; A63B 2047/022

USPC ........................................................... 701/24

See application file for complete search history.

(56) References Cited

U.S. PATENT DOCUMENTS

| | | | |
|---|---|---|---|
| 6,338,013 B1 | 1/2002 | Ruffner | |
| 6,810,305 B2 | 10/2004 | Kirkpatrick, Jr. | |
| 9,089,969 B1 | 7/2015 | Theobald | |
| 9,827,677 B1 | 11/2017 | Gilbertson et al. | |
| 9,827,678 B1 * | 11/2017 | Gilbertson .......... | A47L 11/4055 |
| 10,207,408 B1 | 2/2019 | Ebrahimi Afrouzi | |
| 11,020,858 B2 | 6/2021 | Amacker et al. | |
| 11,407,118 B1 | 8/2022 | Augenbraun et al. | |
| 11,409,296 B1 | 8/2022 | Kim et al. | |
| 11,720,117 B1 | 8/2023 | Kim et al. | |
| 11,789,457 B1 | 10/2023 | Woo et al. | |

(Continued)

FOREIGN PATENT DOCUMENTS

| | | |
|---|---|---|
| AU | 2015218522 A1 | 9/2015 |
| AU | 2020101865 A4 | 10/2020 |

(Continued)

OTHER PUBLICATIONS

Bahl, Laavanye et al. "Cu Bi: Room De cluttering Robot". May 2019. Retrieved from the Internet (Year: 2019) Carnegie Mellon University pp. 1-29.

(Continued)

*Primary Examiner* — Mahmoud S Ismail

(74) *Attorney, Agent, or Firm* — Carnelian Law, LLC

(57) ABSTRACT

A method, apparatus, and system are disclosed for a robot with tennis ball gathering capabilities. A robot is configured to collect, transport, and deposit for storage tennis balls and other light-mobile sports equipment such as are used in table tennis, badminton, squash, pickleball, golf, basketball, dodgeball, floor hockey, indoor soccer, etc., to assist a player in practice without need for additional support personnel or manual ball retrieval by the player.

20 Claims, 42 Drawing Sheets

(56) References Cited

U.S. PATENT DOCUMENTS

| | | | | |
|---|---|---|---|---|
| 12,064,880 | B2 | 8/2024 | Hamilton et al. | |
| 12,287,639 | B1 | 4/2025 | Queiroz et al. | |
| 12,310,545 | B1 | 5/2025 | Hamilton | |
| 2002/0116089 | A1 | 8/2002 | Kirkpatrick, Jr. | |
| 2006/0116973 | A1 | 6/2006 | Okamoto et al. | |
| 2007/0239315 | A1 | 10/2007 | Sato et al. | |
| 2009/0137348 | A1* | 5/2009 | Tsai | A63B 47/021 473/436 |
| 2016/0260161 | A1 | 9/2016 | Atchley et al. | |
| 2017/0329333 | A1 | 11/2017 | Passot et al. | |
| 2018/0104815 | A1 | 4/2018 | Yang | |
| 2018/0284792 | A1 | 10/2018 | Kleiner et al. | |
| 2018/0312095 | A1* | 11/2018 | Eletrabi | B60P 1/00 |
| 2018/0329425 | A1 | 11/2018 | Watts | |
| 2019/0217476 | A1 | 7/2019 | Jiang et al. | |
| 2020/0026301 | A1 | 1/2020 | Taylor | |
| 2020/0086182 | A1* | 3/2020 | New | A63B 47/02 |
| 2020/0156246 | A1 | 5/2020 | Srivastav | |
| 2020/0279436 | A1 | 9/2020 | Bleyer et al. | |
| 2020/0376675 | A1 | 12/2020 | Bai et al. | |
| 2021/0038950 | A1* | 2/2021 | Sullivan | G05D 1/0212 |
| 2021/0069904 | A1 | 3/2021 | Duan et al. | |
| 2021/0128989 | A1* | 5/2021 | Legg | G05D 1/0094 |
| 2021/0132213 | A1 | 5/2021 | Advani et al. | |
| 2021/0138311 | A1* | 5/2021 | Wang | A63B 47/002 |
| 2021/0339393 | A1 | 11/2021 | Dan | |
| 2021/0373560 | A1 | 12/2021 | Koga et al. | |
| 2022/0168893 | A1 | 6/2022 | Hamilton et al. | |
| 2022/0171907 | A1 | 6/2022 | Chang et al. | |
| 2022/0253056 | A1 | 8/2022 | Ranjan et al. | |
| 2022/0398775 | A1 | 12/2022 | Streem et al. | |
| 2023/0015751 | A1 | 1/2023 | Serackis et al. | |
| 2023/0116896 | A1 | 4/2023 | Hamilton et al. | |
| 2023/0206755 | A1 | 6/2023 | Jha et al. | |
| 2023/0401837 | A1 | 12/2023 | Yan et al. | |
| 2024/0142994 | A1 | 5/2024 | Ebrahimi Afrouzi | |
| 2024/0192690 | A1 | 6/2024 | Ebrahimi Afrouzi et al. | |
| 2024/0218863 | A1* | 7/2024 | Eletrabi | F04B 53/16 |
| 2024/0292990 | A1 | 9/2024 | Hamilton | |
| 2024/0424355 | A1* | 12/2024 | Zhang | A63B 69/38 |
| 2024/0428560 | A1 | 12/2024 | Buerkle et al. | |

FOREIGN PATENT DOCUMENTS

| | | | | |
|---|---|---|---|---|
| AU | 2022360549 | A1 | 5/2024 | |
| CN | 202526850 | U | 11/2012 | |
| CN | 107137890 | A | 9/2017 | |
| CN | 107378958 | A | 11/2017 | |
| CN | 107650147 | A | 2/2018 | |
| CN | 108217183 | A | 6/2018 | |
| CN | 108786065 | A | 11/2018 | |
| CN | 110558900 | A | 12/2019 | |
| CN | 210616549 | U | 5/2020 | |
| CN | 111633627 | A | 9/2020 | |
| CN | 112828847 | A | 5/2021 | |
| CN | 114468859 | A | 5/2022 | |
| CN | 218552245 | U | 3/2023 | |
| CN | 116616642 | A | 8/2023 | |
| CN | 116709962 | A | 9/2023 | |
| CN | 117442132 | A | 1/2024 | |
| DE | 102017112740 | A1 | 12/2018 | |
| EP | 1942223 | B1 | 7/2008 | |
| EP | 3766591 | A1 | 1/2021 | |
| JP | 2019092999 | A | 6/2019 | |
| JP | 2020138046 | A | 9/2020 | |
| JP | 2023052271 | A | 4/2023 | |
| KR | 1020190130941 | | 11/2019 | |
| KR | 20200126036 | A | 11/2020 | |
| KR | 20230139407 | A | 10/2023 | |
| KR | 20240133919 | A | 9/2024 | |
| WO | WO-2012103525 | A2 * | 8/2012 | B25J 11/009 |
| WO | 2016105702 | A1 | 6/2016 | |
| WO | 2019126332 | A1 | 6/2019 | |
| WO | 2020071669 | A1 | 4/2020 | |
| WO | 2020190272 | A1 | 9/2020 | |
| WO | 2022029730 | A1 | 2/2022 | |
| WO | 2022115761 | A1 | 6/2022 | |
| WO | 2023031620 | A1 | 3/2023 | |
| WO | 2023060285 | A1 | 4/2023 | |
| WO | 2023110103 | A1 | 6/2023 | |
| WO | 2025184405 | A1 | 9/2025 | |

OTHER PUBLICATIONS

CuBi: Room Decluttering Robot May 2019) (chromeextension://efaidnbmnnnibpcajpcglclefindmkaj/https://mrsdprojects.ri.cmu.edu/2018teamd/wpcontent/uploads/sites/34/2019/12/TeamD_FinalReport 10.pdf).

PCT/US2022/077917 International Search Report dated Jan. 25, 2023.

PCT/US2022/077917 Written Opinion of the ISA.

Official Action Translation from Japanese Patent Office dated Apr. 2, 2024 for application JP 2023-533262 100107766.

PCT/US2021/061143 International Search Report Feb. 8, 2022.

PCT/US2021/061143 Written Opinion of the International Searching Authority Feb. 6, 2022.

Bahl, Laavanye et al. "Cu Bi: A Decluttering Robot ". Dec. 2018. Retrieved from the Internet (Year: 2018).

Bahl, Laavanye et al. "Cu Bi: Room De cluttering Robot". May 2019. Retrieved from the Internet (Year: 2019).

Gonzalez et al., Multi-Li DAR Mapping for Scene Segmentation in Indoor Environments for Mobile Robots, May 2022, MDPI, pp. 1-19. (Year: 2022).

China National Intellectual Property Administration Application No. 202180080246.2 filing date May 30, 2023 First Office Action, translation of entire document dated Dec. 3, 2025.

China National Intellectual Property Administration 202180080246.2, First Office Action Dated Nov. 3, 2025, entire document pp. 1-9.

Canberk Alper et al: "Cloth Funnels: Canonicalized-Alignment for Multi-Purpose Garment Manipulation", 2023 IEEE International Conference on Robotics and Automation (ICRA), IEEE, May 29, 2023 (May 29, 2023), pp. 5872-5879.

Guanqi Chen et al: "Language-Augmented Symbolic Planner for Open-world Task Planning", arxiv.org, Cornell University Library, Jul. 13, 2024.

PCT/US25/43792, International Search Report, Dec. 10, 2025.

PCT/US25/43792, Written Opinion, Dec. 10, 2025.

PCT/US25/43802, International Search Report, Dec. 16, 2025.

PCT/US25/43802, Written Opinion, Dec. 16, 2025.

PCT/US25/43805, International Search Report, Dec. 16, 2025.

PCT/US25/43805, Written Opinion, Dec. 16, 2025.

PCT/US25/44087, International Search Report, Jan. 8, 2026.

PCT/US25/44087, Written Opinion, Jan. 8, 2026.

PCT/US25/44271, International Search Report, Jan. 5, 2026.

PCT/US25/44271, Written Opinion, Jan. 5, 2026.

PCT/US25/44310, International Search Report, Nov. 27, 2025.

PCT/US25/44310, Written Opinion, Nov. 27, 2025.

PCT/US25/44316, International Search Report, Jan. 8, 2026.

PCT/US25/44316, Written Opinion, Jan. 8, 2026.

PCT/US25/44322 International Search Report Dec. 11, 2025.

PCT/US25/44322, Written Opinion, Dec. 11, 2025.

PCT/US25/44326, International Search Report, Dec. 15, 2025.

PCT/US25/44326, Written Opinion, Dec. 15, 2025.

Tsurumine Yoshihisa et al: "Variationally Autoencoded Dynamic Policy Programming for Robotic Cloth Manipulation Planning based on Raw Images", 2022 IEEE/SICE International Symposium on System Integration (SII), IEEE, Jan. 9, 2022, pp. 416-421.

Changsheng Shen (Bobby), "CMU MRSD 2020: Team D—Cu Bi—A Decluttering Robot," YouTube, Dec. 10, 2019. https://www.youtube.com/watch?v=IA-MaF _m8QA (accessed Jan. 19, 2026). (Year: 2019).

* cited by examiner

FIG. 22A
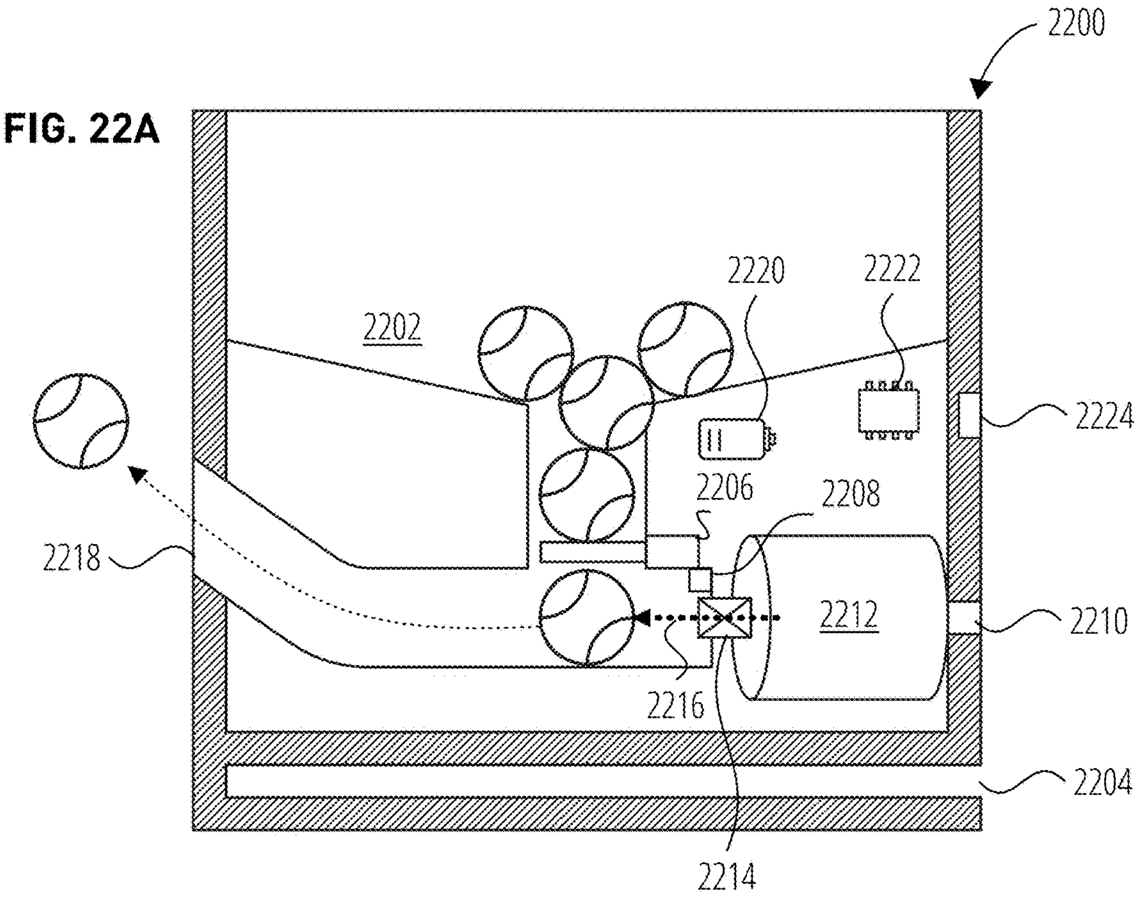
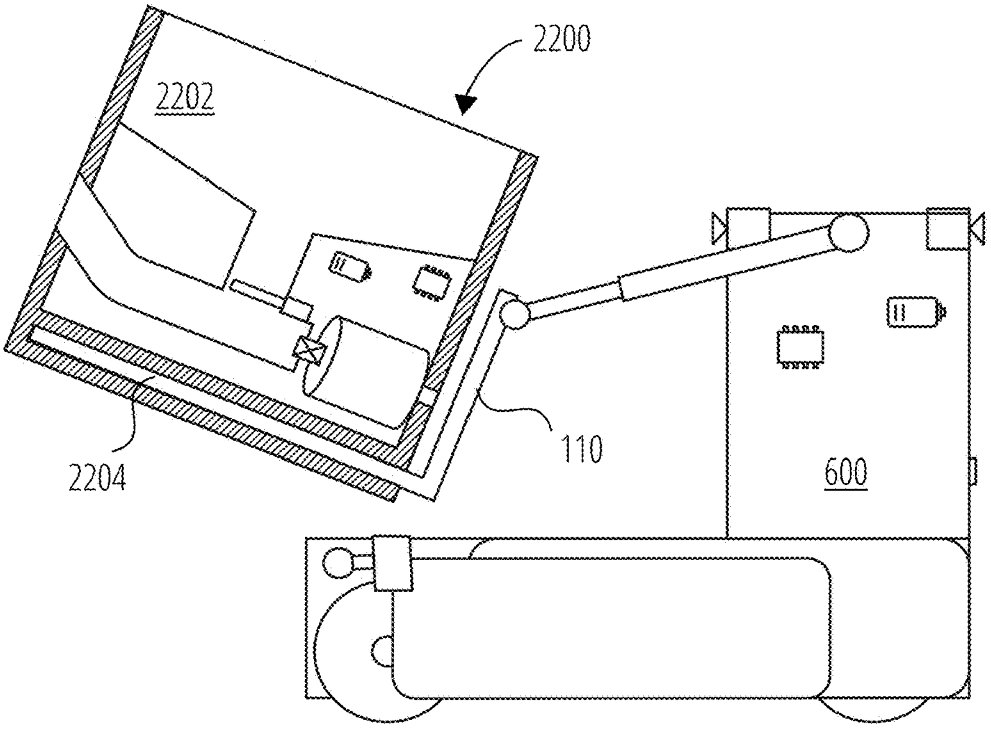
FIG. 22B

ROBOT WITH TENNIS BALL GATHERING CAPABILITIES

BACKGROUND

When playing or practicing tennis and other ball sports, it is often tedious and time-consuming to retrieve all the tennis balls from around the court, or from multiple courts, and put them away into a basket. Furthermore, balls that get left on or near the courts may be a tripping hazard to people walking and running across the playing surface.

Conventional solutions rely upon manual pickup by personnel. More automated or mechanized solutions conventionally involve direct or remote steering. There is, therefore, a need for a fully automated robotic system capable of exploring an area and retrieving and tidying away light, mobile equipment with minimal human intervention.

BRIEF SUMMARY

In one aspect, a robotic system includes a robot having a scoop, pusher pad arms with pusher pads, at least one wheel or one track for mobility of the robot, a processor, and a memory storing instructions that, when executed by the processor, allow operation and control of the robot. The robotic system also includes a base station. The robotic system also includes a plurality of ball baskets for at least one of storing balls and launching the balls. The robotic system also includes a robotic control system in at least one of the robot and a cloud server. The robotic system also includes logic for operating the disclosed robot to perform the disclosed method.

In one aspect, a method includes executing an initialization mode by a robot, the robot including a scoop, pusher pad arms with pusher pads, at least one wheel or one track for mobility of the robot, and a robotic control system including a processor and a memory storing instructions that, when executed by the processor, allow operation and control of the robot, and the initialization mode including mapping an environment with a court, including identifying the court, court boundary lines, at least one player on the court, and ball baskets. The method also includes the robot localizing itself within the environment. The method also includes receiving an operating state from at least one of a user and a timing setting. The method also includes, on condition the operating state is a pick up ball mode, determining if a pickup threshold has been reached. The method also includes, on condition the pickup threshold has not been reached, determining a pickup strategy for picking up balls. The method also includes, on condition the operating state is a pick up ball mode executing the pickup strategy until the pickup threshold has been reached, the pickup strategy including navigating the environment while following ball pickup area rules; extending the pusher pads out and forward with respect to the pusher pad arms and raise the pusher pads to a grabbing height. The method also includes approaching a target ball, coming to a stop when the target ball is positioned between the pusher pads. The method also includes pushing the target ball with the pusher pads onto the scoop to hold the target ball in the scoop. The method also includes, on condition the pickup threshold has been reached, executing a post pickup mode, including navigating to a post pickup location to at least one of transfer the balls into the ball baskets, and bring the balls to the at least one player.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 22A-FIG. 22C illustrate a ball launcher 2200 in accordance with various embodiments.

DETAILED DESCRIPTION

A tennis ball retrieval robot as disclosed herein may provide a flexible and intelligent automated solution to fetching tennis balls from in and around an area of play. A tennis ball fetching robot would make it easier to play or practice tennis without having to run around picking up all the balls afterwards. Such a solution may also apply to other similar sports with balls (or similarly light and mobile equipment) such as table tennis, badminton, squash, pickleball, golf, basketball, dodgeball, floor hockey, indoor soccer, etc. In one embodiment, the robot may be constructed and configured for use over uneven terrain and across longer distances and may retrieve golf balls from a driving range or golf course.

Figure 1A:
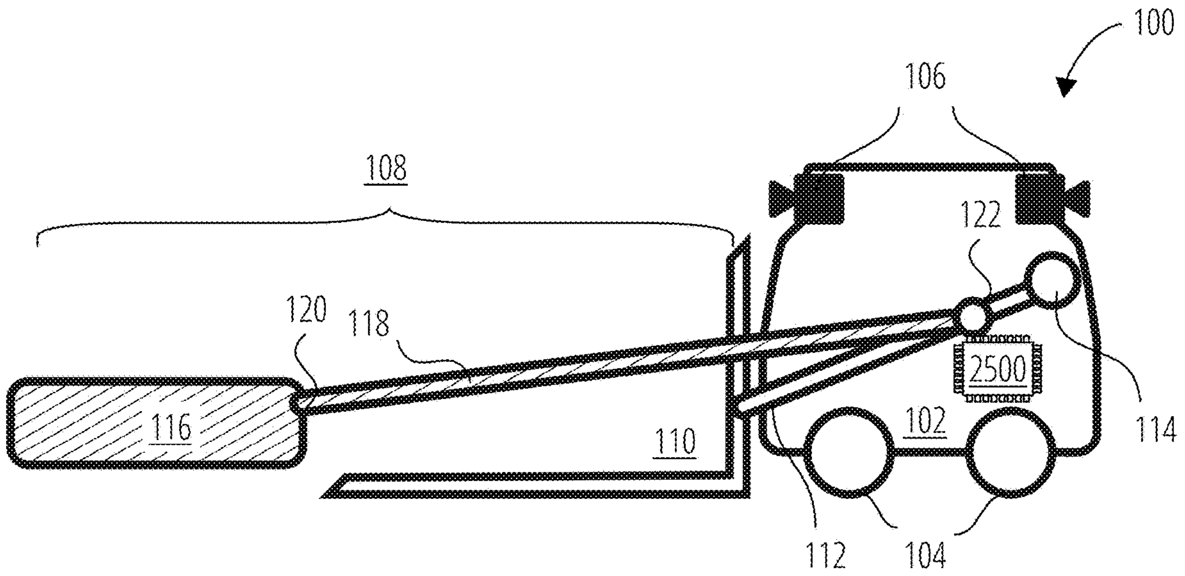
FIG. 1A-FIG. 1D illustrate aspects of a robot 100 in accordance with one embodiment.
Figure 1B:
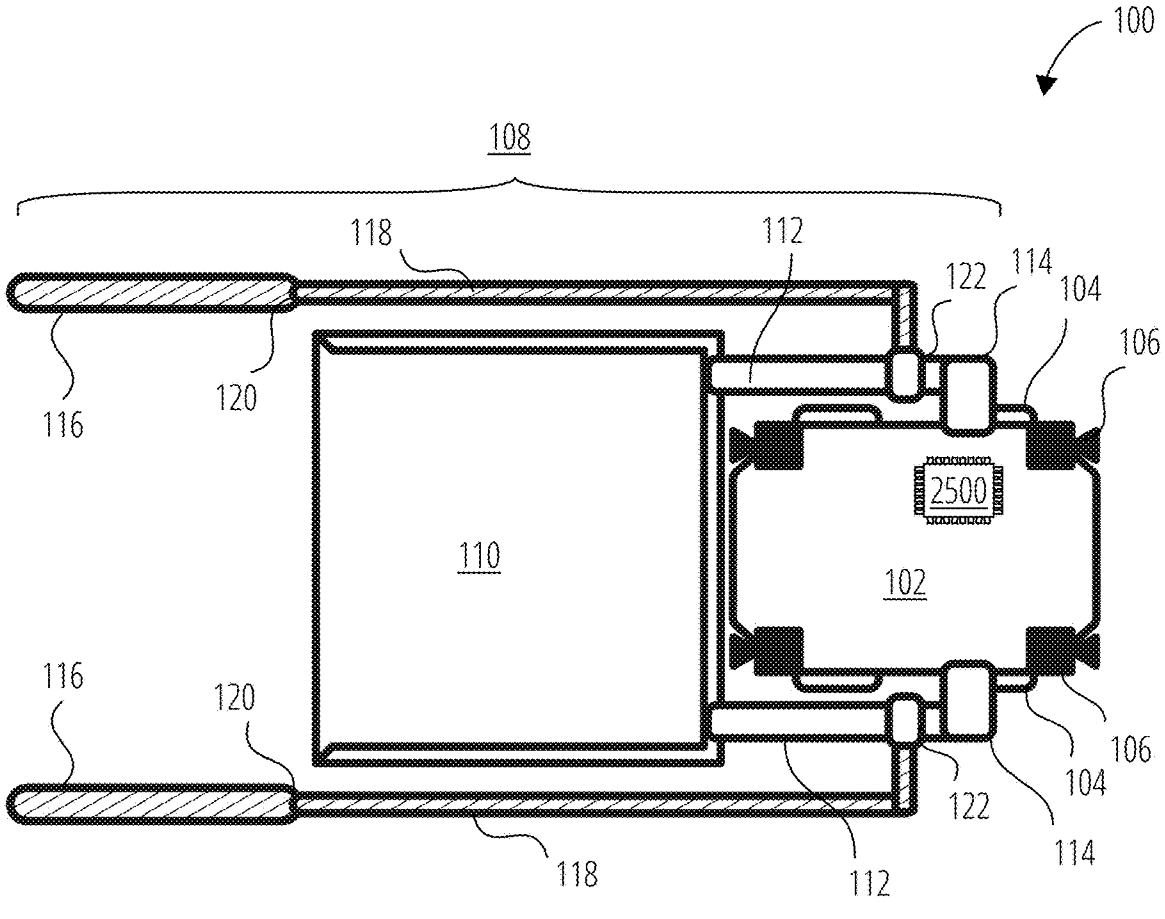

FIG. 1A through FIG. 1D illustrate a robot 100 in accordance with one embodiment. FIG. 1A illustrates a side view of the robot 100, and FIG. 1B illustrates a top view. The robot 100 may comprise a chassis 102, a mobility system 104, a sensing system 106, a capture and containment system 108, and a robotic control system 2500. The capture and containment system 108 may further comprise a scoop 110, a scoop arm 112, a scoop arm pivot point 114, two pusher pads 116, two pusher pad arms 118, and two pad arm pivot points 122.

The chassis 102 may support and contain the other components of the robot 100. The mobility system 104 may comprise wheels as indicated, as well as caterpillar tracks, conveyor belts, etc., as is well understood in the art. The mobility system 104 may further comprise motors, servos, or other sources of rotational or kinetic energy to impel the robot 100 along its desired paths. Mobility system 104 components may be mounted on the chassis 102 for the purpose of moving the entire robot without impeding or inhibiting the range of motion needed by the capture and containment system 108. Elements of a sensing system 106, such as cameras, lidar sensors, or other components, may be mounted on the chassis 102 in positions giving the robot 100 clear lines of sight around its environment in at least some configurations of the chassis 102, scoop 110, pusher pad 116, and pusher pad arm 118 with respect to each other.

The chassis 102 may house and protect all or portions of the robotic control system 2500, (portions of which may also be accessed via connection to a cloud server) comprising in some embodiments a processor, memory, and connections to the mobility system 104, sensing system 106, and capture and containment system 108. The chassis 102 may contain other electronic components such as batteries, wireless communication devices, etc., as is well understood in the art of robotics. The robotic control system 2500 may function as described in greater detail with respect to FIG. 25. The mobility system 104 and or the robotic control system 2500 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 108 may comprise a scoop 110, a scoop arm 112, a scoop arm pivot point 114, a pusher pad 116, a pusher pad arm 118, a pad pivot point 120, and a pad arm pivot point 122. In some embodiments, the capture and containment system 108 may include two pusher pad arms 118, pusher pads 116, and their pivot points. In other embodiments, pusher pads 116 may attach directly to the scoop 110, without pusher pad arms 118. Such embodiments are illustrated later in this disclosure.

The geometry and of the scoop 110 and the disposition of the pusher pads 116 and pusher pad arms 118 with respect to the scoop 110 may describe a containment area, illustrated more clearly in FIG. 2A through FIG. 2E, in which objects may be securely carried. Servos, direct current (DC) motors, or other actuators at the scoop arm pivot point 114, pad pivot points 120, and pad arm pivot points 122 may be used to adjust the disposition of the scoop 110, pusher pads 116, and pusher pad arms 118 between fully lowered scoop and grabber positions and raised scoop and grabber positions, as illustrated with respect to FIG. 2A through FIG. 2C.

The point of connection shown between the scoop arms and pusher pad arms is an exemplary position and is not intended to limit the physical location of such points of connection. Such connections may be made in various locations as appropriate to the construction of the chassis and arms, and the applications of intended use.

In some embodiments, gripping surfaces may be configured on the sides of the pusher pads 116 facing inward toward objects to be lifted. These gripping surfaces may provide cushion, grit, elasticity, or some other feature that increases friction between the pusher pads 116 and objects to be captured and contained. In some embodiments, the pusher pad 116 may include suction cups in order to better grasp objects having smooth, flat surfaces. In some embodiments, the pusher pads 116 may be configured with sweeping bristles. These sweeping bristles may assist in moving small objects from the floor up onto the scoop 110. In some embodiments, the sweeping bristles may angle down and inward from the pusher pads 116, such that, when the pusher pads 116 sweep objects toward the scoop 110, the sweeping bristles form a ramp, allowing the foremost bristles to slide beneath the object, and direct the object upward toward the pusher pads 116, facilitating capture of the object within the scoop and reducing a tendency of the object to be pressed against the floor, increasing its friction and making it more difficult to move.

Figure 1C:
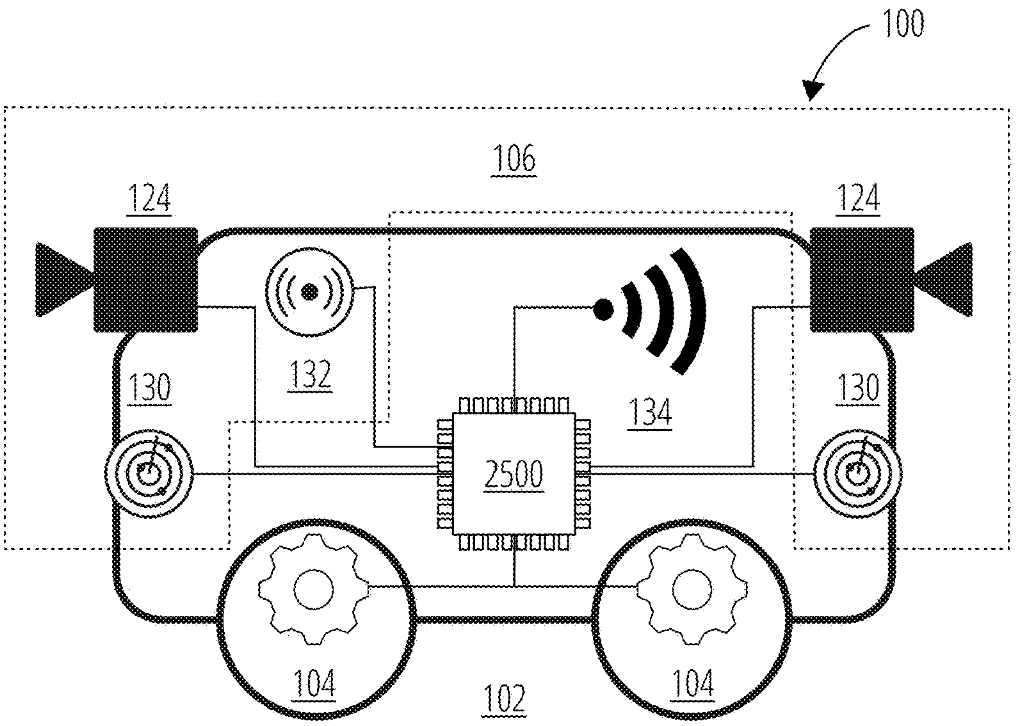
Figure 1D:
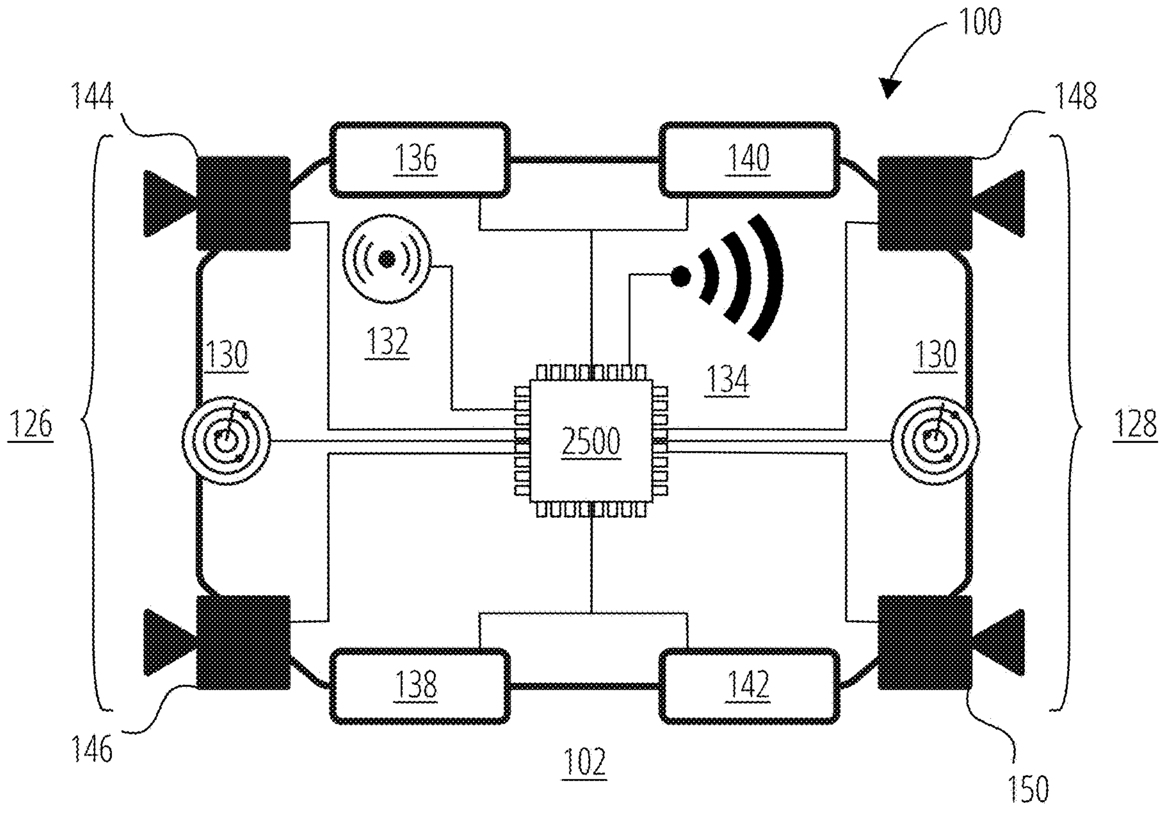

FIG. 1C and FIG. 1D illustrate a side view and top view of the chassis 102, respectively, along with the general connectivity of components of the mobility system 104, sensing system 106, and communications 134, in connection with the robotic control system 2500. In some embodiments, the communications 134 may include the network interface 2512 described in greater detail with respect to robotic control system 2500.

In one embodiment, the mobility system 104 may comprise a right front wheel 136, a left front wheel 138, a right rear wheel 140, and a left rear wheel 142. The robot 100 may have front-wheel drive, where right front wheel 136 and left front wheel 138 are actively driven by one or more actuators or motors, while the right rear wheel 140 and left rear wheel 142 spin on an axle passively while supporting the rear portion of the chassis 102. In another embodiment, the robot 100 may have rear-wheel drive, where the right rear wheel 140 and left rear wheel 142 are actuated and the front wheels turn passively. In another embodiment, each wheel may be actively actuated by separate motors or actuators.

The sensing system 106 may further comprise cameras 124 such as the front cameras 126 and rear cameras 128, light detecting and ranging (LIDAR) sensors such as lidar sensors 130, and inertial measurement unit (IMU) sensors, such as IMU sensors 132. In some embodiments, front camera 126 may include the front right camera 144 and front left camera 146. In some embodiments, rear camera 128 may include the rear left camera 148 and rear right camera 150.

Additional embodiments of the robot that may be used to perform the disclosed algorithms are illustrated in FIG. 2A through FIG. 2E, FIG. 3A through FIG. 3C, FIG. 4A through FIG. 4C, FIG. 5, FIG. 6A, FIG. 6B, FIG. 7, and FIG. 8.

Figures 2A, 2B, 2C:
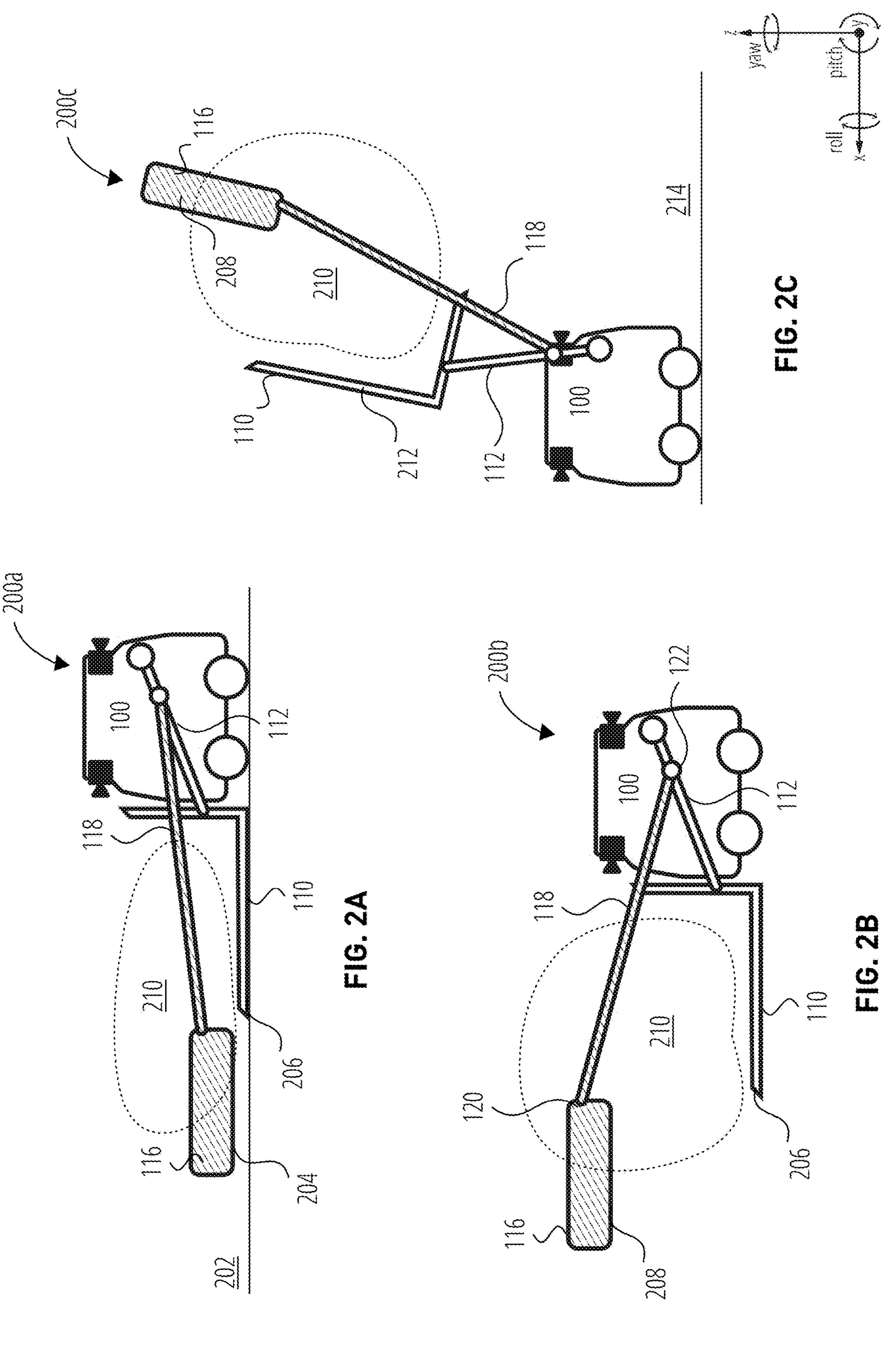
FIG. 2A illustrates a lowered scoop position and lowered pusher pad position 200*a* for the robot 100 in accordance with one embodiment.
FIG. 2B illustrates a lowered scoop position and raised pusher pad position 200*b* for the robot 100 in accordance with one embodiment.
FIG. 2C illustrates a raised scoop position and raised pusher pad position 200*c* for the robot 100 in accordance with one embodiment.

FIG. 2A illustrates a robot 100 such as that introduced with respect to FIG. 1A disposed in a lowered scoop position and lowered pusher pad position 200*a*. In this configuration, the pusher pads 116 and pusher pad arms 118 rest in a lowered pusher pad position 204, and the scoop 110 and scoop arm 112 rest in a lowered scoop position 206 at the front 202 of the robot 100. In this position, the scoop 110 and pusher pads 116 may roughly describe a containment area 210 as shown.

FIG. 2B illustrates a robot 100 with a lowered scoop position and raised pusher pad position 200*b*. Through the action of servos or other actuators at the pad pivot points 120 and pad arm pivot points 122, the pusher pads 116 and pusher pad arms 118 may be raised to a raised pusher pad position 208 while the scoop 110 and scoop arm 112 maintain a lowered scoop position 206. In this configuration, the pusher pads 116 and scoop 110 may roughly describe a containment area 210 as shown, in which an object taller than the scoop 110 height may rest within the scoop 110 and be held in place through pressure exerted by the pusher pads 116.

Figure 5:
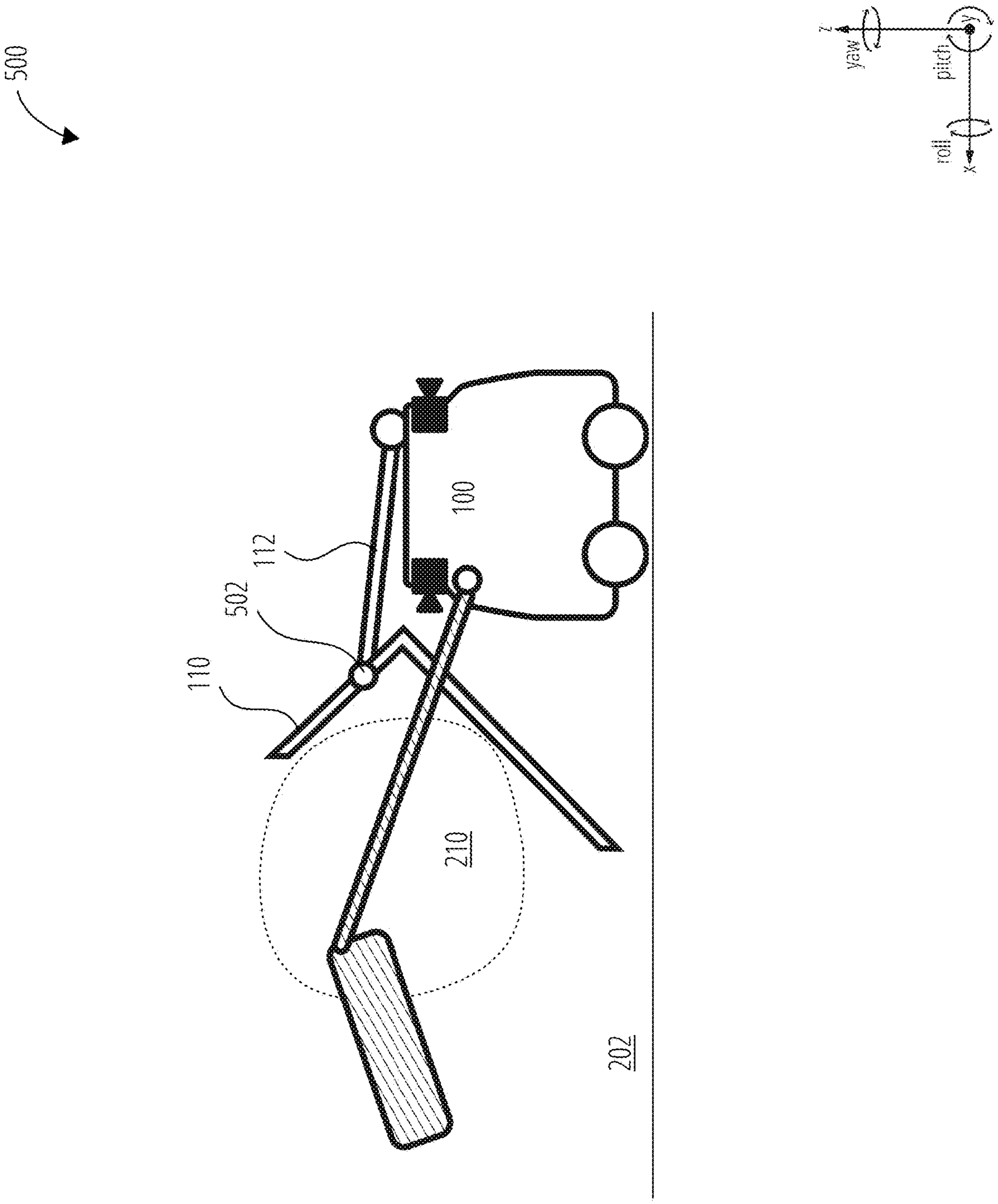
FIG. 5 illustrates a front drop position 500 for the robot 100 in accordance with one embodiment.

Pad arm pivot points 122, pad pivot points 120, scoop arm pivot points 114 and scoop pivot points 502 (as shown in FIG. 5) may provide the robot 100 a range of motion of these components beyond what is illustrated herein. The positions shown in the disclosed figures are illustrative and not meant to indicate the limits of the robot's component range of motion.

FIG. 2C illustrates a robot 100 with a raised scoop position and raised pusher pad position 200*c*. The pusher pads 116 and pusher pad arms 118 may be in a raised pusher pad position 208 while the scoop 110 and scoop arm 112 are in a raised scoop position 212. In this position, the robot 100 may be able to allow objects drop from the scoop 110 and pusher pad arms 118 to an area at the rear 214 of the robot 100.

The carrying position may involve the disposition of the pusher pads 116, pusher pad arms 118, scoop 110, and scoop arm 112, in relative configurations between the extremes of lowered scoop position and lowered pusher pad position 200*a* and raised scoop position and raised pusher pad position 200*c*.

Figure 2D:
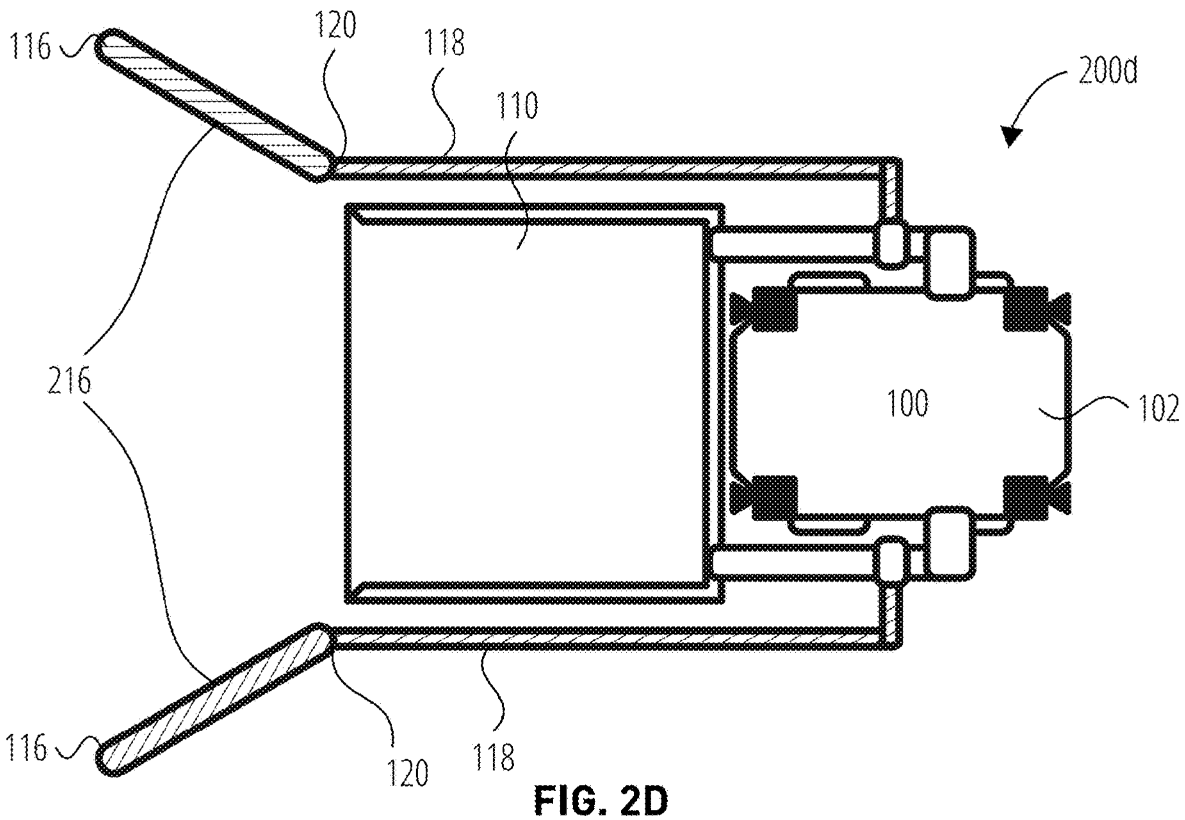
FIG. 2D illustrates a robot 100 with pusher pads extended 200*d* in accordance with one embodiment.

FIG. 2D illustrates a robot 100 with pusher pads extended 200*d*. By the action of servos or other actuators at the pad pivot points 120, the pusher pads 116 may be configured as extended pusher pads 216 to allow the robot 100 to approach objects as wide or wider than the robot chassis 102 and scoop 110. In some embodiments, the pusher pads 116 may be able to rotate through almost three hundred and sixty degrees, to rest parallel with and on the outside of their associated pusher pad arms 118 when fully extended.

Figure 2E:
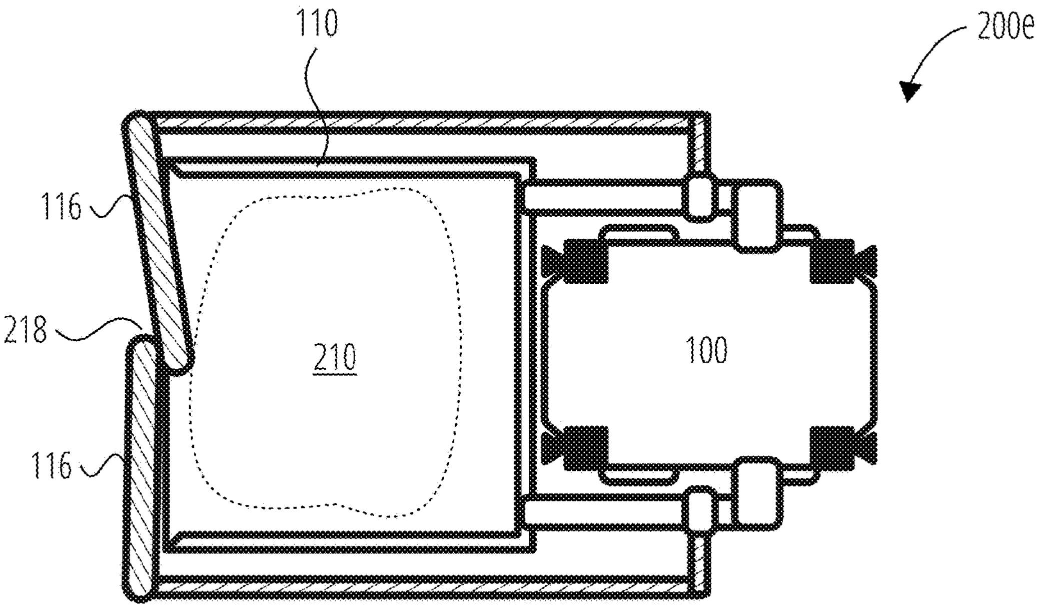
FIG. 2E illustrates a robot 100 with pusher pads retracted 200*e* in accordance with one embodiment.

FIG. 2E illustrates a robot 100 with pusher pads retracted 200*c*. The closed pusher pads 218 may roughly define a containment area 210 through their position with respect to the scoop 110. In some embodiments, the pusher pads 116 may be able to rotate farther than shown, through almost three hundred and sixty degrees, to rest parallel with and inside of the side walls of the scoop 110.

Figures 3A, 3B, 3C:
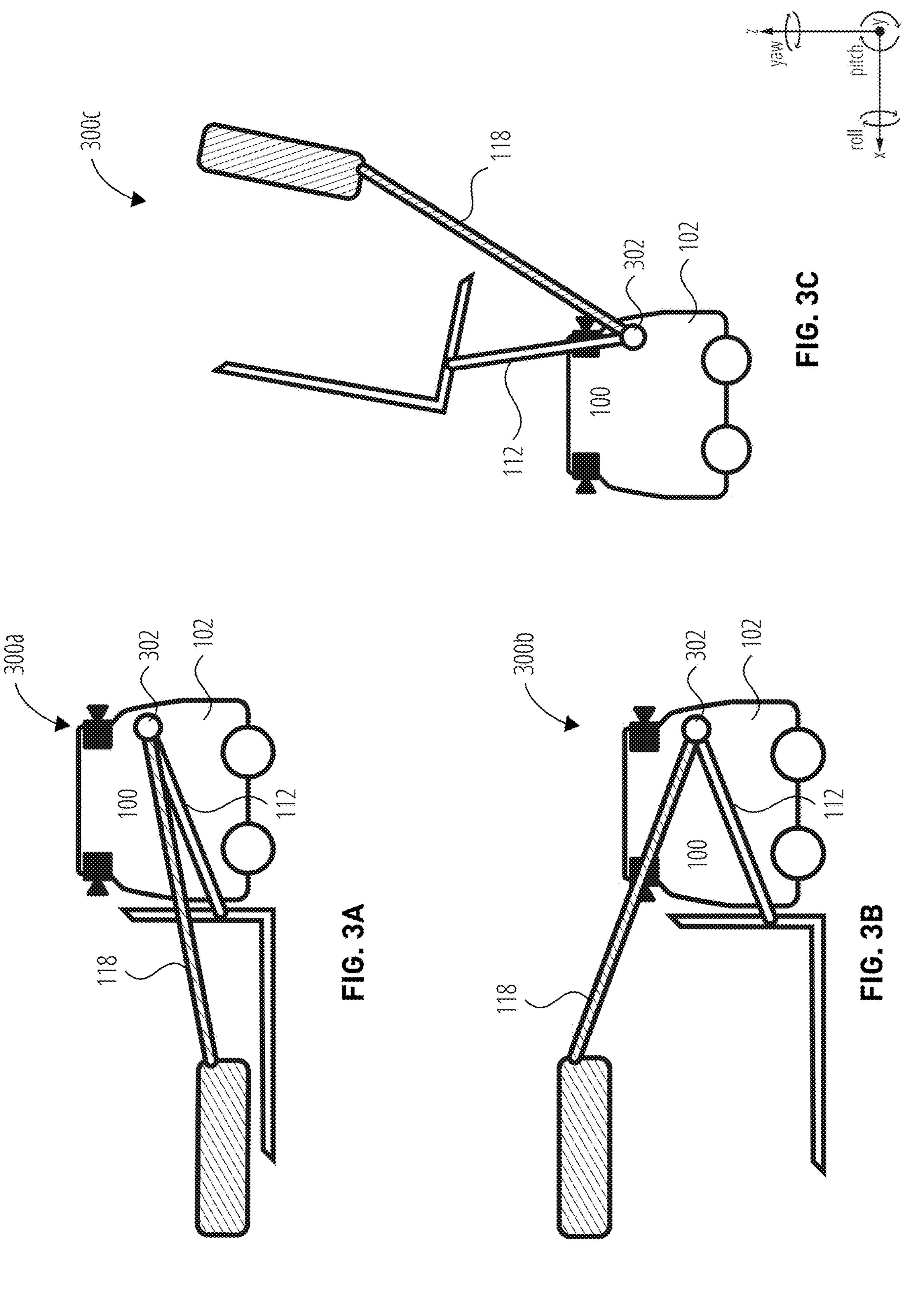
FIG. 3A illustrates a lowered scoop position and lowered pusher pad position 300*a* for the robot 100 in accordance with one embodiment.
FIG. 3B illustrates a lowered scoop position and raised pusher pad position 300*b* for the robot 100 in accordance with one embodiment.
FIG. 3C illustrates a raised scoop position and raised pusher pad position 300*c* for the robot 100 in accordance with one embodiment.

FIG. 3A through FIG. 3C illustrate a robot 100 such as that introduced with respect to FIG. 1A through FIG. 2E. In such an embodiment, the pusher pad arms 118 may be controlled by a servo or other actuator at the same point of connection 302 with the chassis 102 as the scoop arms 112. The robot 100 may be seen disposed in a lowered scoop position and lowered pusher pad position 300*a*, a lowered scoop position and raised pusher pad position 300*b*, and a raised scoop position and raised pusher pad position 300*c*. This robot 100 may be configured to perform the algorithms disclosed herein.

The point of connection shown between the scoop arms 112/pusher pad arms 118 and the chassis 102 is an exemplary position and is not intended to limit the physical location of this point of connection. Such connection may be made in various locations as appropriate to the construction of the chassis 102 and arms, and the applications of intended use.

Figure 4C:
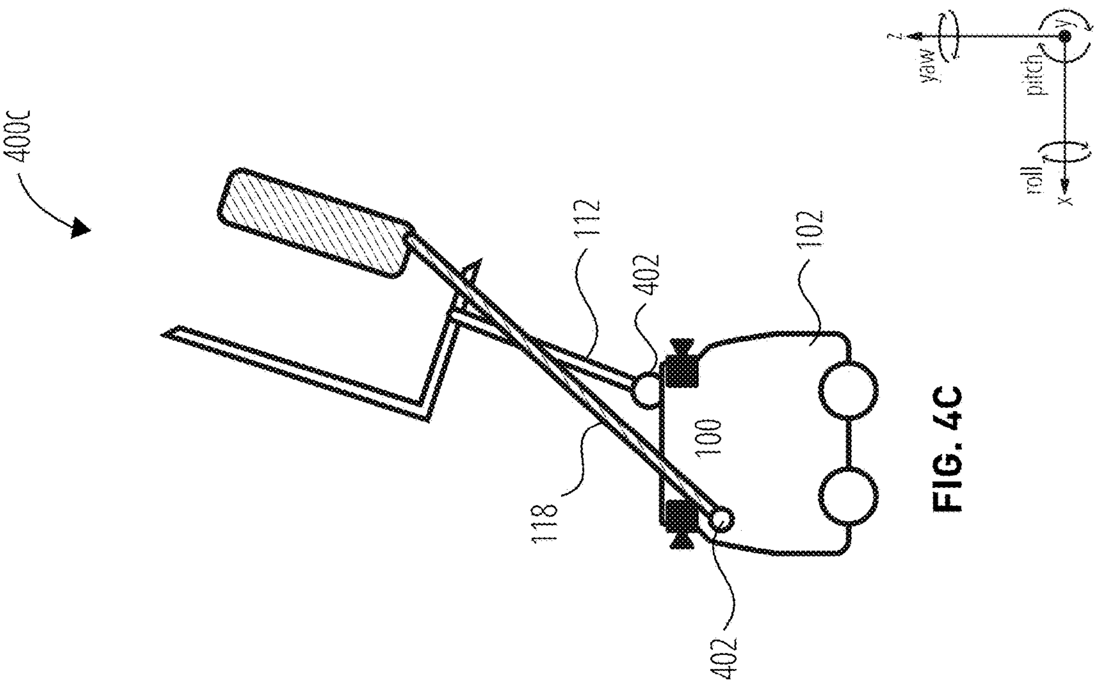
FIG. 4C illustrates a raised scoop position and raised pusher pad position 400*c* for the robot 100 in accordance with one embodiment.
Figure 4A:
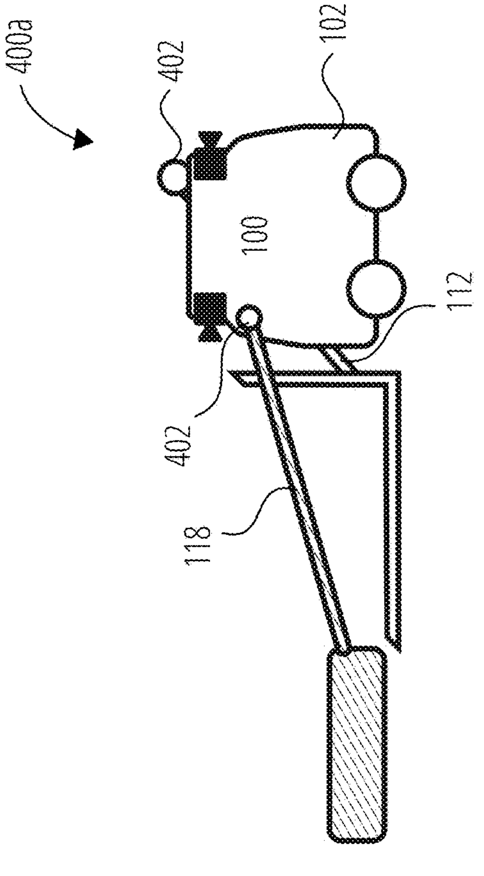
FIG. 4A illustrates a lowered scoop position and lowered pusher pad position 400*a* for the robot 100 in accordance with one embodiment.
Figure 4B:
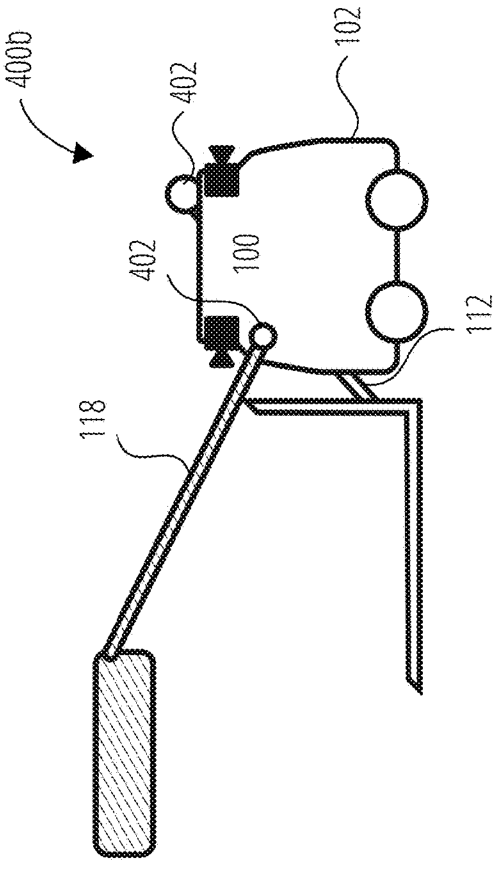
FIG. 4B illustrates a lowered scoop position and raised pusher pad position 400*b* for the robot 100 in accordance with one embodiment.

FIG. 4A through FIG. 4C illustrate a robot 100 such as that introduced with respect to FIG. 1A through FIG. 2E. In such an embodiment, the pusher pad arms 118 may be controlled by a servo or servos (or other actuators) at different points of connection 402 with the chassis 102 from those controlling the scoop arm 112. The robot 100 may be seen disposed in a lowered scoop position and lowered pusher pad position 400*a*, a lowered scoop position and raised pusher pad position 400*b*, and a raised scoop position and raised pusher pad position 400*c*. This robot 100 may be configured to perform the algorithms disclosed herein.

The different points of connection 402 between the scoop arm and chassis and the pusher pad arms and chassis shown are exemplary positions and are not intended to limit the physical locations of these points of connection. Such connections may be made in various locations as appropriate to the construction of the chassis and arms, and the applications of intended use.

FIG. 5 illustrates a robot 100 such as was previously introduced in a front drop position 500. The arms of the robot 100 may be positioned to form a containment area 210 as previously described.

The robot 100 may be configured with a scoop pivot point 502 where the scoop 110 connects to the scoop arm 112. The scoop pivot point 502 may allow the scoop 110 to be tilted forward and down while the scoop arm 112 is raised, allowing objects in the containment area 210 to slide out and be deposited in an area to the front 202 of the robot 100.

Figure 6A:
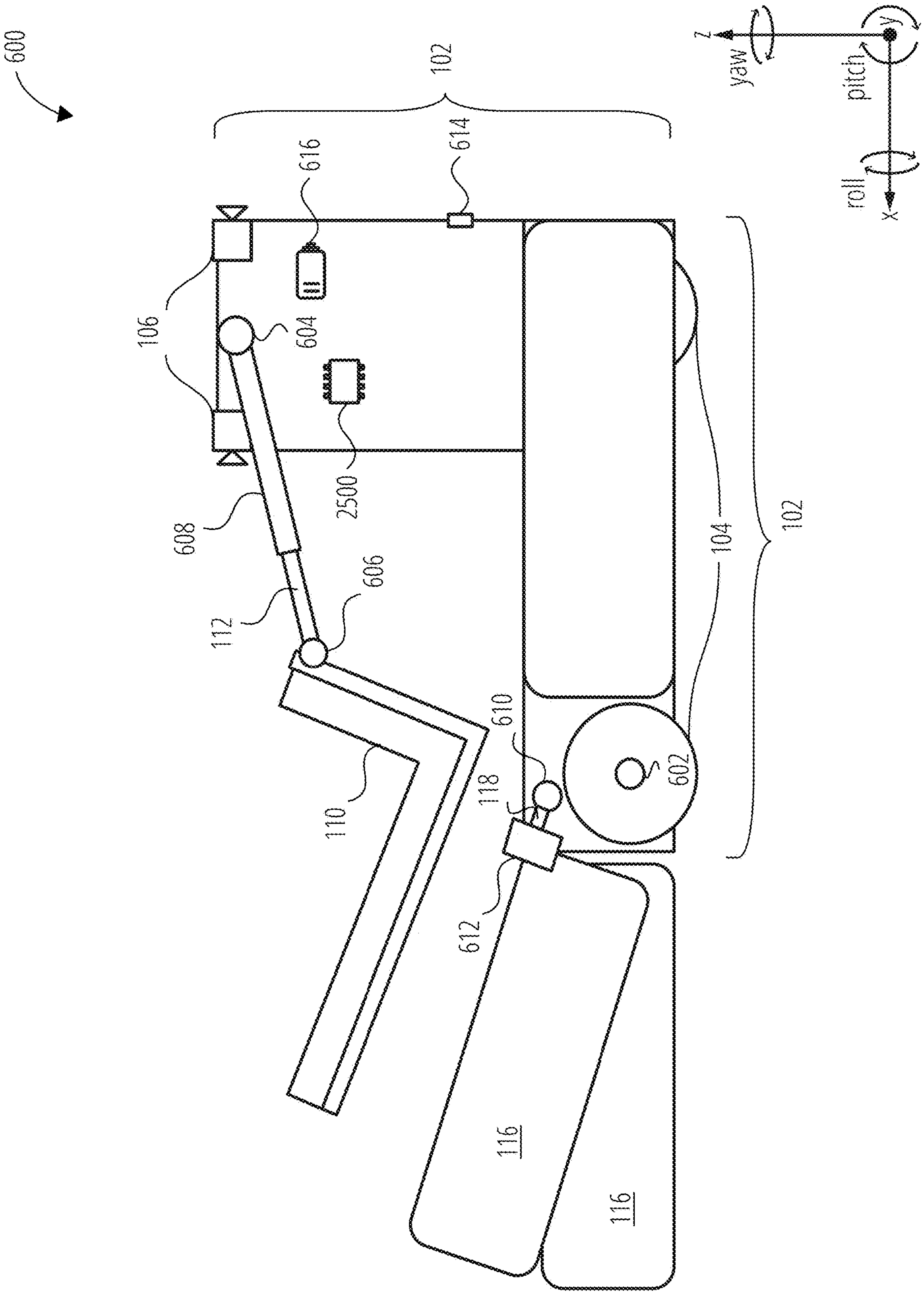
FIG. 6A illustrates a left side view of a ball collection robot 600 in accordance with one embodiment.
Figure 6B:
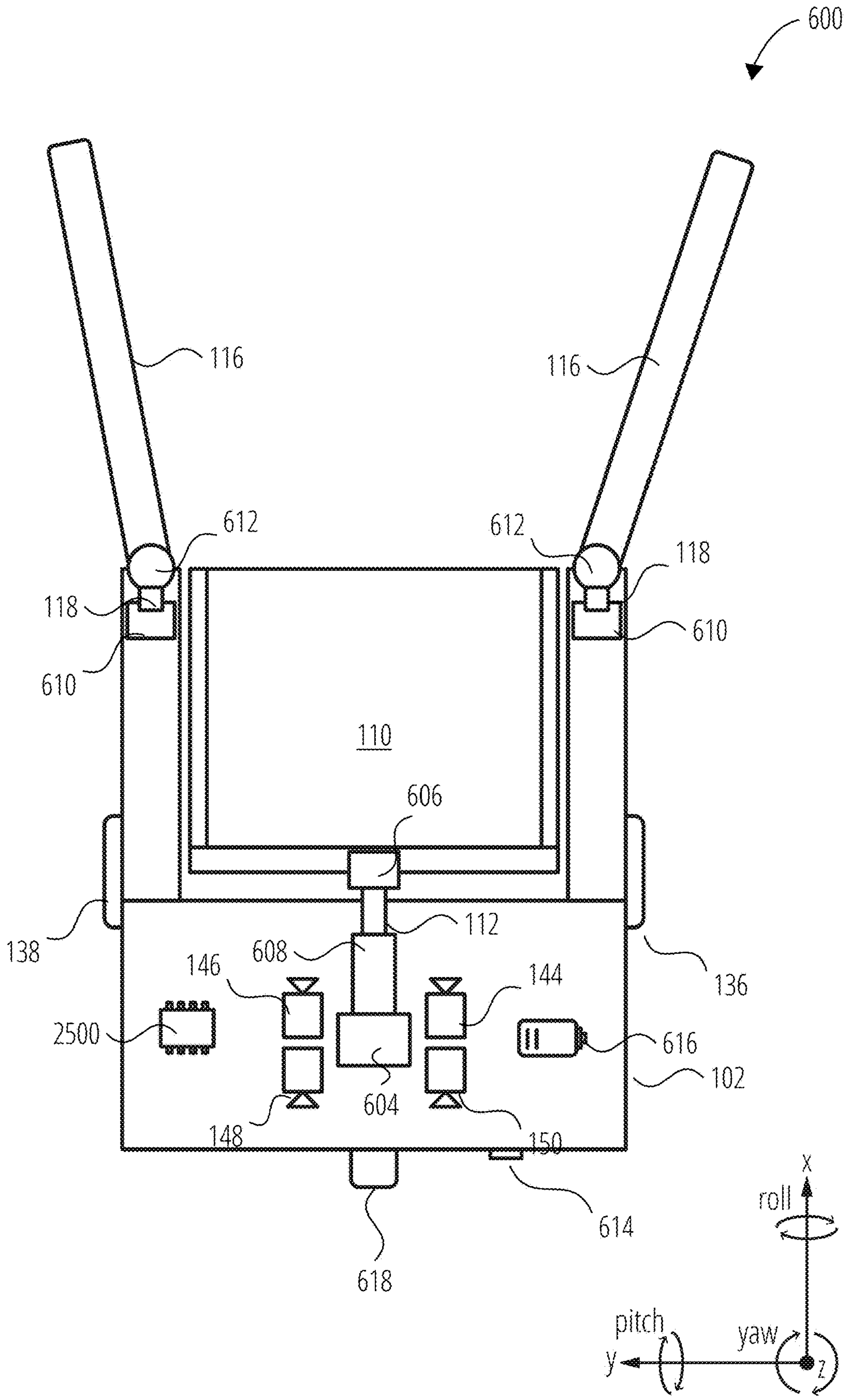
FIG. 6B illustrates a top view of a ball collection robot 600 in accordance with one embodiment.

FIG. 6A and FIG. 6B illustrate a ball collection robot 600 in accordance with one embodiment. FIG. 6A shows a left side view, and FIG. 6B shows a top view. The ball collection robot 600 may comprise a chassis 102, a mobility system 104 and at least one first motor 602 to actuate it; a sensing system 106 including cameras, a scoop 110 and an associated third motor 606 to rotate the scoop 110 into different positions; a scoop arm 112 and an associated second motor 604 and linear actuator 608 to raise/lower and extend the scoop arm 112, respectively; pusher pads 116 and associated fifth motors 612 to rotate the pusher pads 116 into different positions; pusher pad arms 118 and associated fourth motors 610 to raise, lower, and extend the pusher pad arms 118; a charge connector 614 to connect to a charging station; a battery 616; cameras 124; and a robotic control system 2500, as described in greater detail with respect to FIG. 25.

In one embodiment, the scoop 110 may be configured with flexible and/or collapsible sides. For example, the sides of scoop 110 may be constructed of elasticized netting that may expand as the scoop fills up, allowing increased ball storage, but able to collapse when the scoop is empty, facilitating interface with a ball basket such as those illustrated in FIG. 18A-FIG. 21, eliminating or simplifying the slot configurations implemented to allow the ball basket to interface with the scoop.

Each pusher pad 116 may be able to raise and lower through the action of the fourth motors 610 upon the pusher pad arms 118 as shown. In one embodiment, the pusher pad arms 118 may incorporate linear actuators allowing them to also extend and retract with respect to their points of attachment either to the robot chassis 102 as shown for ball collection robot 600, or the robot scoop as illustrated with respect to the ball collection robot 700 of FIG. 7. The ball collection robot 600 may be configured, incorporate features of, and behave similarly to the robot 100 described with respect to the preceding figures.

In one embodiment, the robotic control system 2500 may further include sensors and control logic capable of recognizing radio frequency identification (RFID) tagging or other similar configurations used to individually mark specific balls or pieces of equipment. For example, cameras may allow recognition of different colors of tennis balls or other collected objects, or specific branding logos or other identifying marks. In this manner, the ball collection robot 600 may accurately sort and store equipment based on this data.

Figure 7:
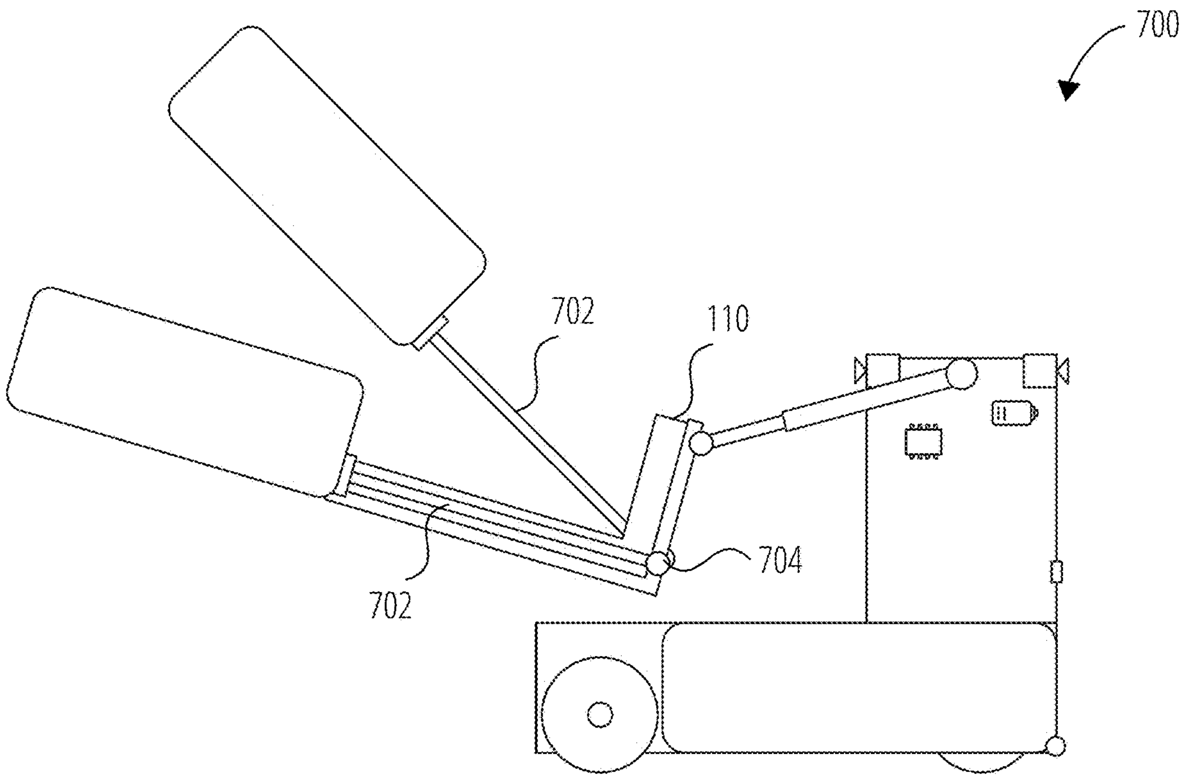
FIG. 7 illustrates a ball collection robot 700 in accordance with one embodiment.
Figure 8:
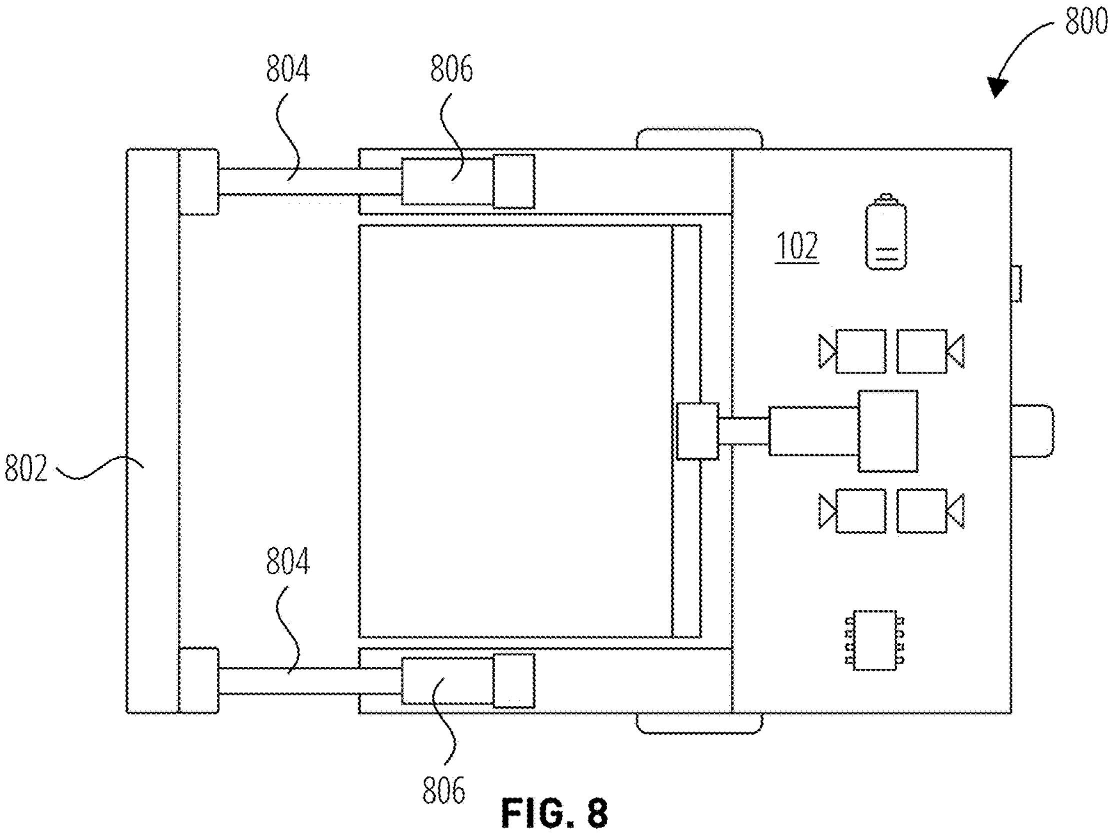
FIG. 8 illustrates a ball collection robot 800 in accordance with one embodiment.

The ball collection robot 600 may in some embodiments be configured as illustrated with respect to FIG. 7 and FIG. 8, and capable of performing the actions and functions disclosed herein.

As illustrated in FIG. 6B, the mobility system 104 of the ball collection robot 600 may include a right front wheel 136, a left front wheel 138, and a single rear wheel 618, in contrast to the four wheels shown for the robot 100. In one embodiment, the first motor 602 of the mobility system 104 may actuate the right front wheel 136 and left front wheel 138 while the single rear wheel 618 provides support and reduced friction with no driving force, as indicated in FIG. 6A. In another embodiment, the ball collection robot 600 may have additional first motors to provide all-wheel drive, may use a different number of wheels, or may use caterpillar tracks or other mobility devices in lieu of wheels.

As indicated in FIG. 6B, the sensing system 106 of the ball collection robot 600 may comprise a front right camera 144, a front left camera 146, a rear left camera 148, and a rear right camera 150, as is shown and described for the robot 100, among other sensors as described with respect to FIG. 1C and FIG. 1D.

In one embodiment, as shown in FIG. 6B, the scoop arm 112 may be configured with a linear actuator 608. This may allow the scoop arm 112 to extend and retract linearly, moving the scoop 110 away from or toward the chassis 102 of the ball collection robot 600, independently from the rotation of the scoop 110 or scoop arm 112.

FIG. 7 illustrates a ball collection robot 700 in accordance with one embodiment. The ball collection robot 700 may be configured to operate as described with respect to previously illustrated robot embodiments, as will be readily apprehended by one of ordinary skill in the art. The ball collection robot 700 may have scoop-mounted pusher pad arms 702 coupled to the scoop 110 with motors 704 or other actuators to drive the motions needed to implement the disclosed actions. In one embodiment, the scoop-mounted pusher pad arms 702 may incorporate linear actuators allowing the scoop-mounted pusher pad arms 702 to extend and retract with respect to their connection point on the scoop 110.

FIG. 8 illustrates a ball collection robot 800 in accordance with one embodiment. The ball collection robot 800 may be configured to operate as described with respect to previously illustrated robot embodiments, as will be readily apprehended by one of ordinary skill in the art. The ball collection robot 800 may have a single pusher pad 802 supported and manipulated by two pusher pad arms 804. The pusher pad arms 804 may include linear actuators 806. In this manner, the single pusher pad 802 may be raised and lowered with respect to the surface the ball collection robot 800 travels over, and may be extended and retracted with respect to the chassis 102 of the ball collection robot 800. In some embodiments, in order to reduce cost and control logic coordination, one pusher pad arm 804 may be "active" with the motors and actuators needed to drive these movements, while the other may be "passive", providing low-friction support of single pusher pad 802 motion without active actuator components.

Figure 9:
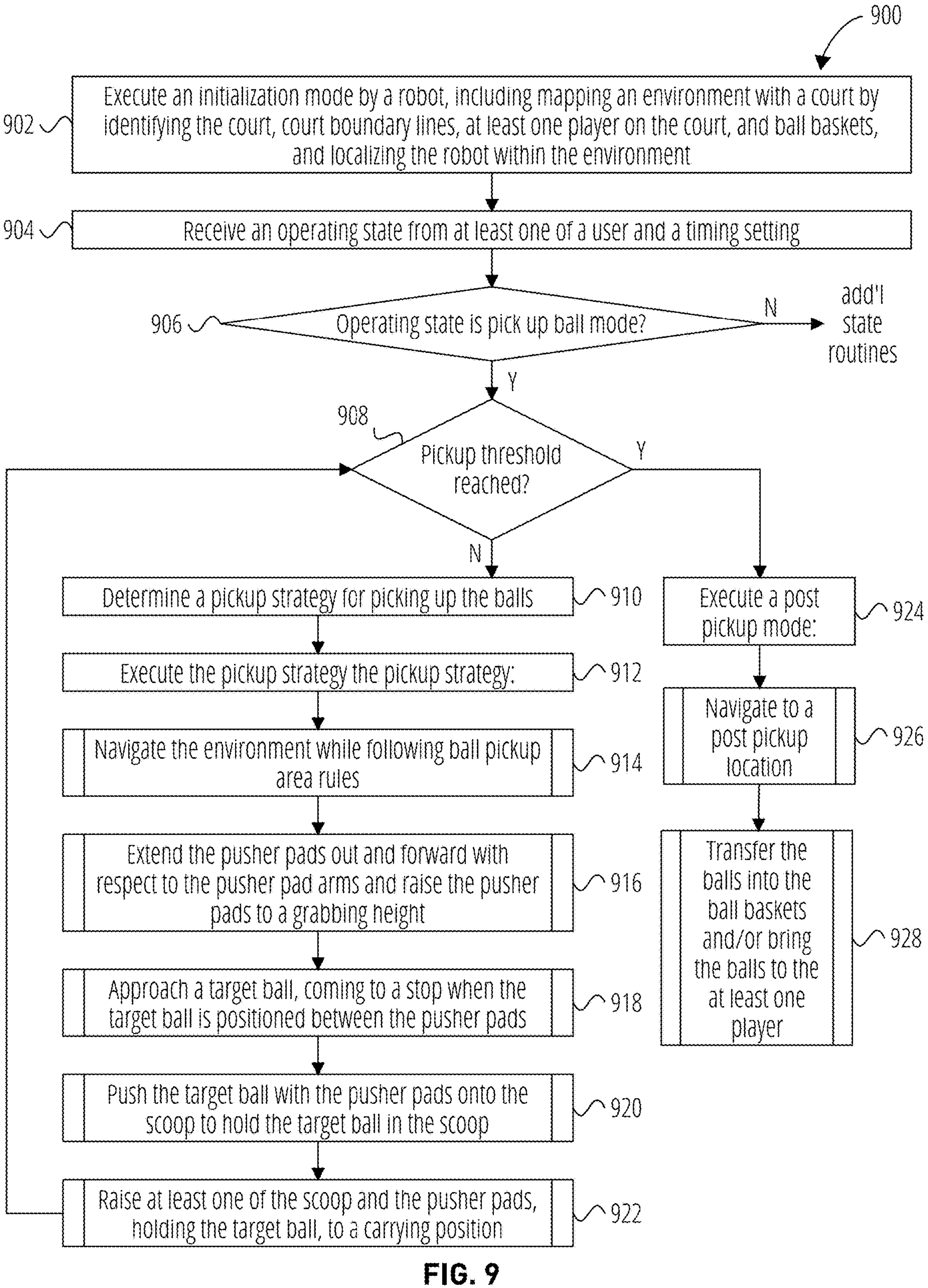
FIG. 9 illustrates a routine 900 in accordance with one embodiment.

FIG. 9 illustrates a routine 900 in accordance with one embodiment. Although the example routine 900 depicts a particular sequence of operations, the sequence may be altered without departing from the scope of the present disclosure. For example, some of the operations depicted may be performed in parallel or in a different sequence that does not materially affect the function of the routine 900. In other examples, different components of an example device or system that implements the routine 900 may perform functions at substantially the same time or in a specific sequence.

According to some examples, the method includes executing an initialization mode by a robot, including mapping an environment with a court by identifying the court, court boundary lines, at least one player on the court, and ball baskets, and localizing the robot within the environment at block 902. According to some examples, the method includes receiving an operating state from at least one of a user and a timing setting at block 904.

If the operating state is pick up ball mode at decision block 906, the routine continues to decision block 908. Otherwise, the routine 900 proceeds to additional state routines.

If the pickup threshold is determined to have not been reached yet at decision block 908, proceed to block 910. If the pickup threshold has been reached, the routine 900 proceeds to block 924.

According to some examples, the method includes determining a pickup strategy for picking up the balls at block 910. According to some examples, the method includes executing the pickup strategy at block 912. The pickup strategy may be performed according to the subroutine beginning at subroutine block 914.

According to some examples, the method includes navigating the environment while following ball pickup area rules at subroutine block 914. According to some examples, the method includes extending the pusher pads out and forward with respect to the pusher pad arms and raise the pusher pads to a grabbing height at subroutine block 916.

According to some examples, the method includes approaching a target ball, coming to a stop when the target ball is positioned between the pusher pads at subroutine block 918. According to some examples, the method includes pushing the target ball with the pusher pads onto the scoop to hold the target ball in the scoop at subroutine block 920. According to some examples, the method includes raising at least one of the scoop and the pusher pads, holding the target ball, to a carrying position at subroutine block 922.

According to some examples, the method includes executing a post pickup mode at block 924. The post pickup mode may be performed according to the subroutine beginning at subroutine block 926. According to some examples, the method includes navigating to a post pickup location at subroutine block 926. According to some examples, the method includes transferring the balls into the ball baskets and/or bring the balls to the at least one player at subroutine block 928. At this point, the routine 900 may be repeated in whole or part, or additional state routines may be performed.

Figure 10:
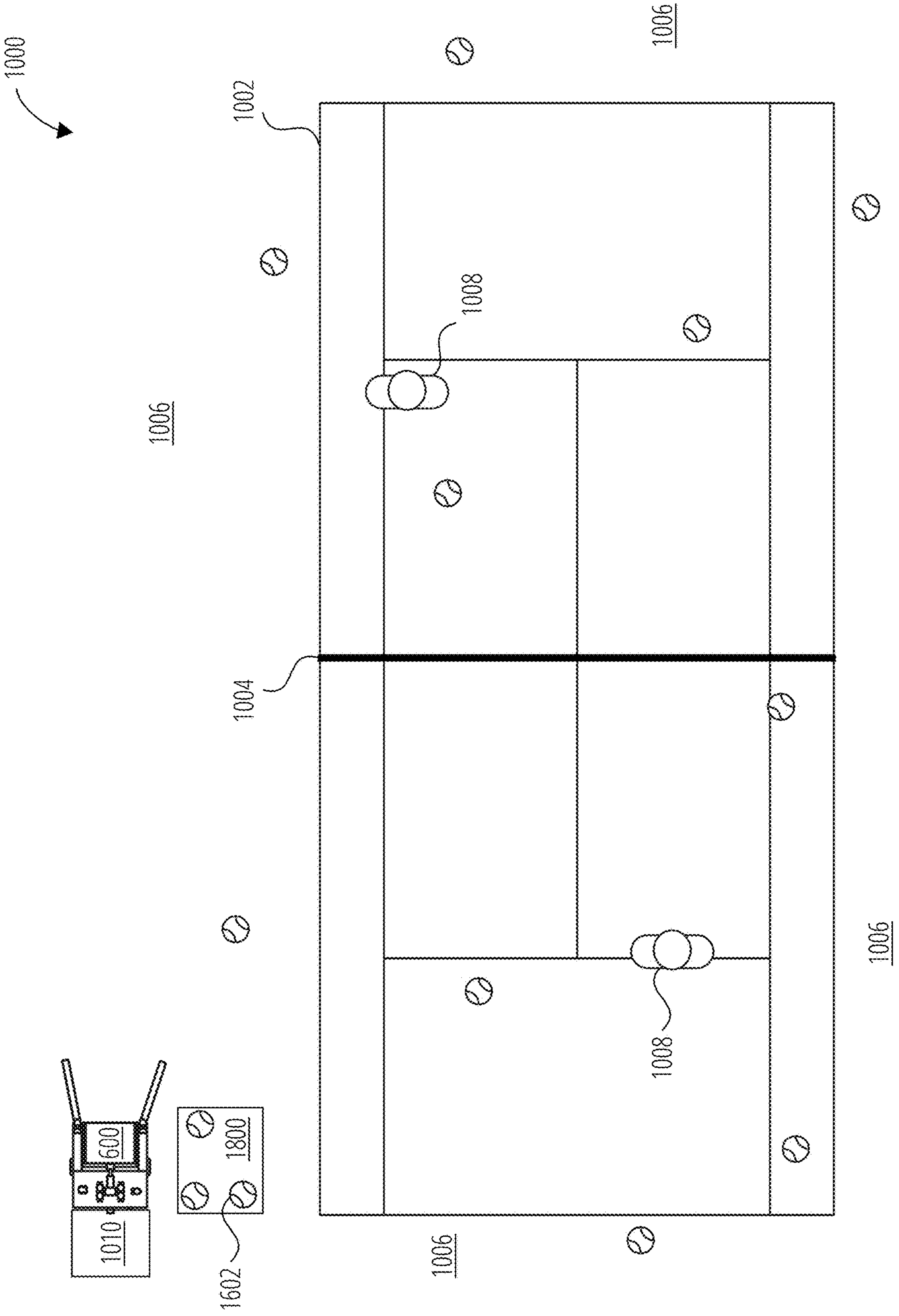
FIG. 10 illustrates a tennis court environment 1000 in accordance with one embodiment.

FIG. 10 illustrates a tennis court environment 1000 in accordance with one embodiment. The tennis court environment 1000 may comprise a court of play with court bounds 1002 marked off with paint or other markings on a level playing surface. A net 1004 divides the two halves of the court. The court lies within a surrounding area 1006 which may provide room between multiple courts and between the court(s) and a surrounding fence or wall.

The ball collection robot 600 may explore, map, and operate within the features and landmarks of the tennis court environment 1000. These may include ball baskets 1800, ball launchers, tennis balls 1602 lying on the ground in a number of locations as shown, other ball collection robots 600, and human players 1008 and other personnel. Players 1008 or other personnel, such as ball boys and ball girls, coaches, instructors, spectators, etc., may move about within the tennis court environment 1000, and may present particular challenges to conventional automated ball retrieval systems. The tennis court environment 1000 may also include a base station 1010 at which the ball collection robot 600 may dock for charging.

While a tennis court environment 1000 shows one environment the disclosed solution may operate in and the attributes that may be expected in such an environment, this specific environment is illustrated for exemplary purposes, and is not intended to limit the operation of the disclosed solution to environments configured for the sport of tennis. One of ordinary skill in the art may readily apprehend how similar gameplay environments such as basketball courts, racquetball courts, football and soccer fields, golf courses, driving ranges, etc., may be mapped and operated within by the robots disclosed herein.

Figure 11:
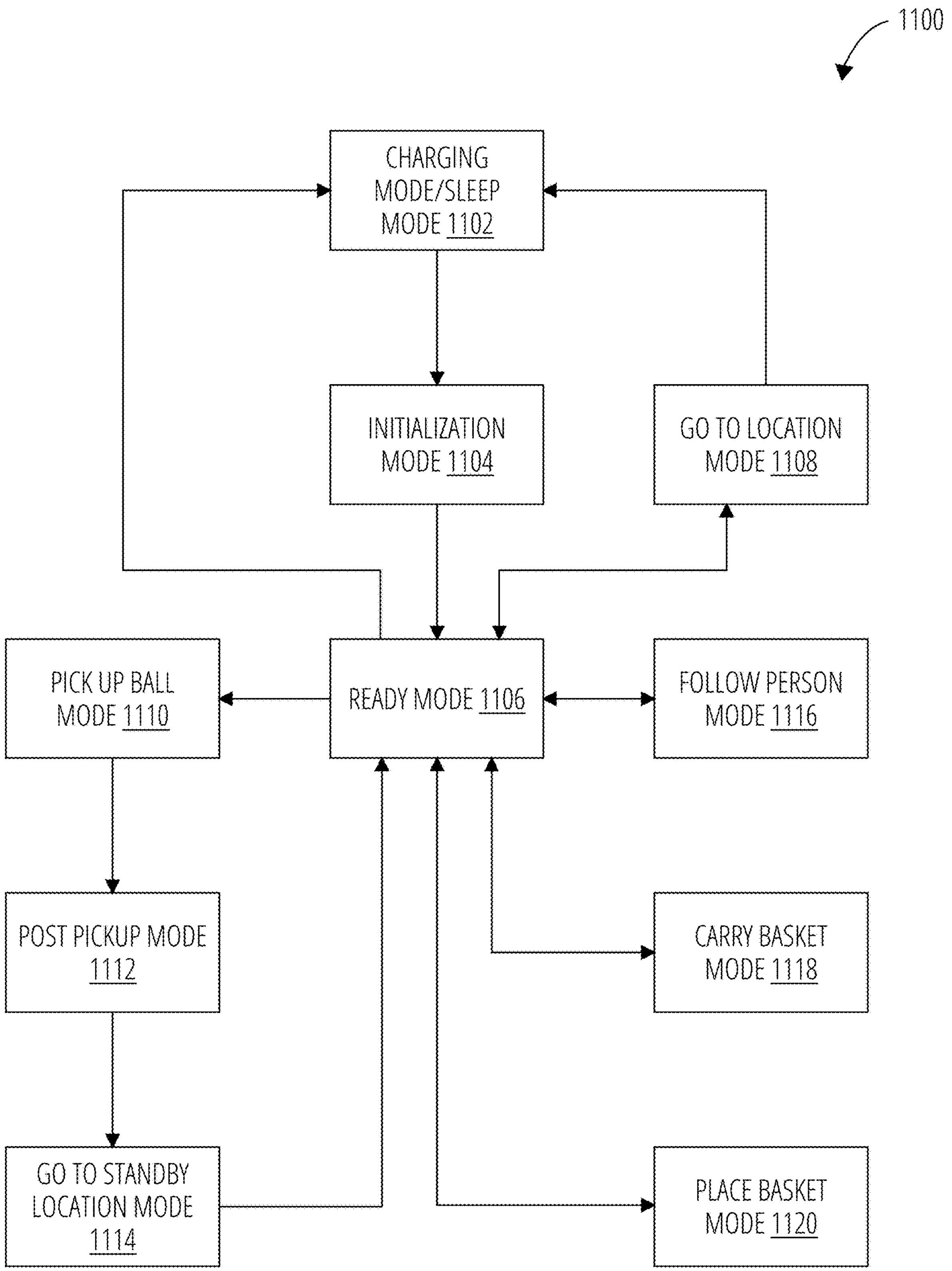
FIG. 11 illustrates ball collection robot operating states 1100 in accordance with one embodiment.

FIG. 11 illustrates a ball collection robot operating states 1100 in accordance with one embodiment. The ball collection robot 600 may inhabit or perform the actions of these ball collection robot operating states 1100 in a manner similar to that described with respect to other algorithms described herein, as will be readily apprehended by one of ordinary skill in the art. The ball collection robot operating states 1100 may comprise charging mode/sleep mode 1102, initialization mode 1104, ready mode 1106, go to location mode 1108, pick up ball mode 1110, post pickup mode 1112, go to standby location mode 1114, follow person mode 1116, carry basket mode 1118, and place basket mode 1120.

The ball collection robot 600 may perform some or all states autonomously, based on preconfigured algorithms, which may include machine learning to refine the efficiency and efficacy of the robot's operations. The ball collection robot 600 may also be configured to transition among the ball collection robot operating states 1100 through set up or real-time control using a user interface, such as the user interface 2300 configured on a mobile device as illustrated in FIG. 23A-FIG. 23K.

In the charging mode/sleep mode 1102 state, the ball collection robot 600 may be in a low power or sleep mode to conserve battery power. The ball collection robot 600 may enter this state when it is docked and charging in the charging mode. It may be well understood that, while these modes may often be entered at the same time, i.e., when the ball collection robot 600 is charging at its base station, in some embodiments they may be two separate states/modes, such that the ball collection robot 600 may remain in a normal power mode while charging, and may enter a low power or sleep mode to conserve energy while away from the charging or base station.

When a user turns the ball collection robot 600 on, or the robot is automatically activated based on programmatic or environmental conditions, the ball collection robot 600 may enter the initialization mode 1104 state. During initialization mode 1104, the ball collection robot 600 turns on and begins mapping its environment, such as the tennis court environment 1000 illustrated in FIG. 10, in order to localize itself, detect the bounds of its operation, identify players or other personnel within those bounds, locate the ball baskets or other post pickup locations or receptacles, identify obstacles, and detect tennis court boundary lines (or other defining landmarks of the sport it is configured to pick up for).

Once initial mapping is complete, the ball collection robot 600 may enter a ready mode 1106 state. In the ready mode 1106 state, the ball collection robot 600 is initialized and may remain stationary while waiting for a command from a player or other personnel. The ball collection robot 600 may continue to map features of its environment. This may include tracking the changing positions of players and other persons and balls it may later retrieve.

In one embodiment, the ball collection robot 600 may also detect and track aspects of gameplay, such as points scored, stage of the game, such as sets and matches in tennis or periods or quarters in timed sports. In one embodiment, the ball collection robot 600, the ball launcher 2200, or other apparatus that includes cameras or other sensors and controllers described herein, may detect conditions such as a ball or player out of bounds, serving faults, offsides, etc. In this manner, the ball collection robot 600 may be able to determine without additional intervention when a game is concluded, and may recognize that it may begin collecting balls.

Figure 23B:
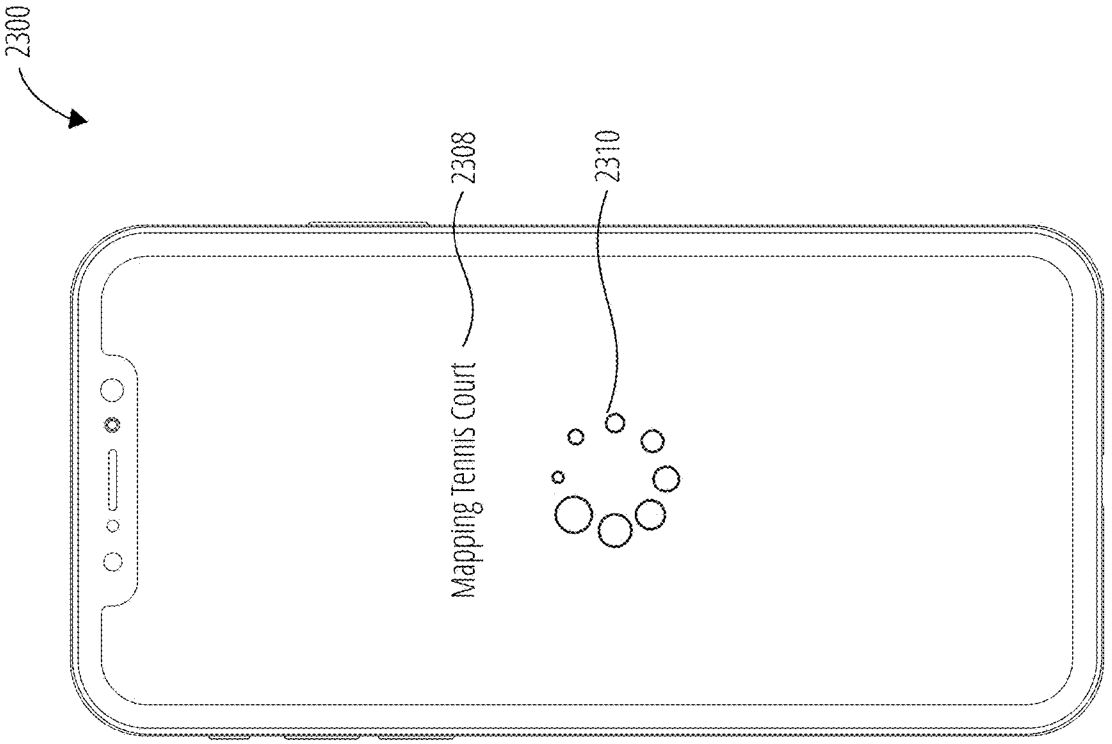
FIG. 23A-FIG. 23K illustrate a user interface 2300 in accordance with one embodiment.
Figure 23A:
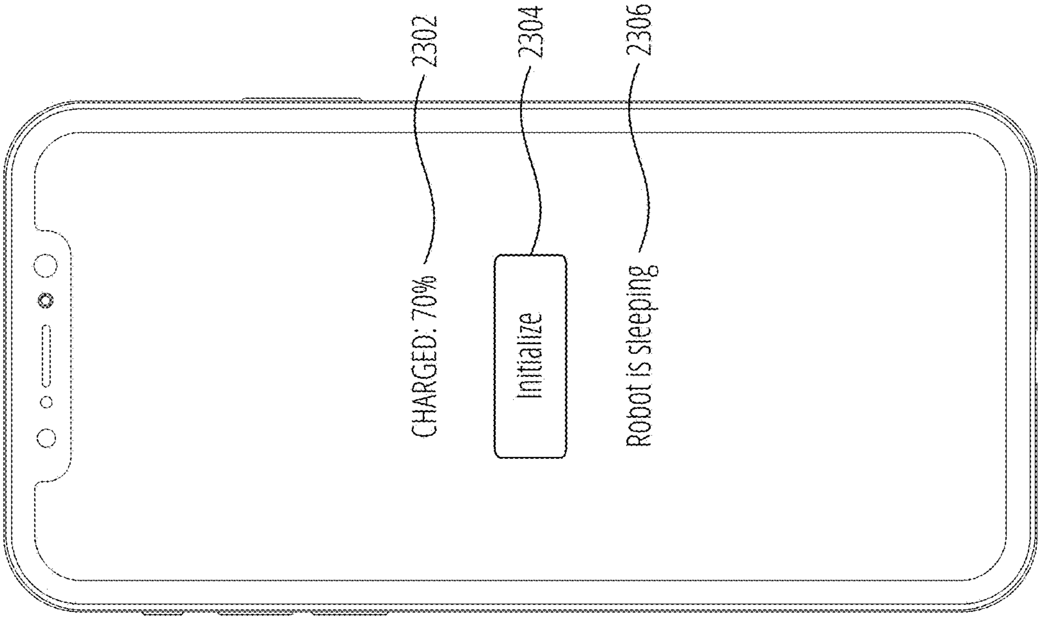
Figure 24A:
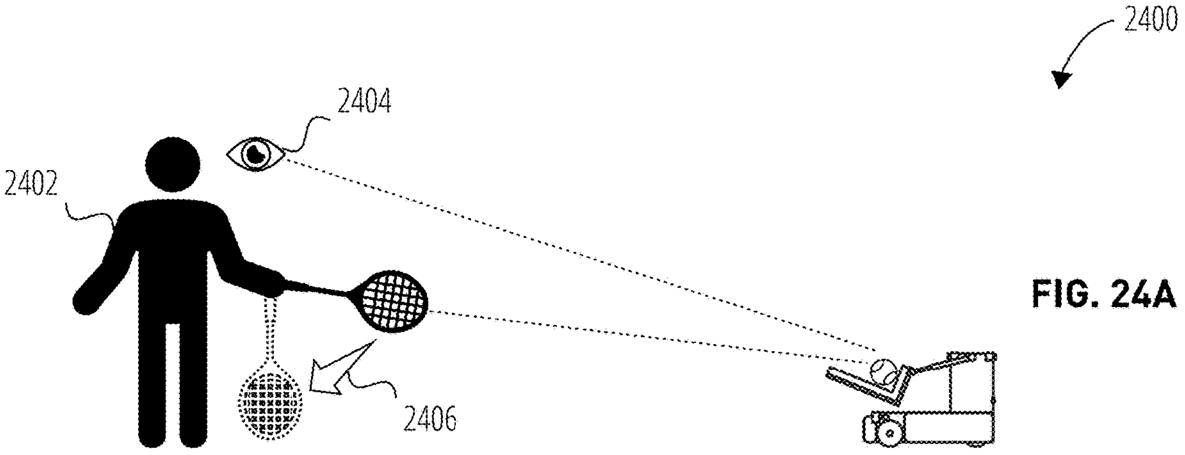
FIG. 24A-FIG. 24C illustrate gesture controls 2400 in accordance with one embodiment.
Figure 24B:
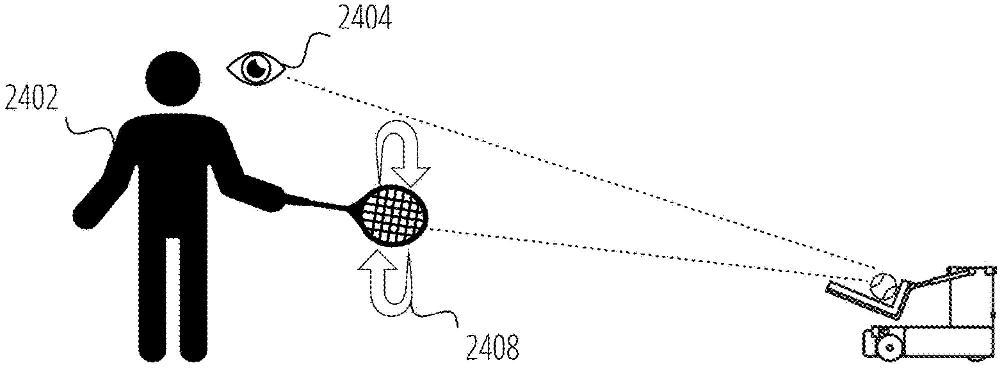
Figure 24C:
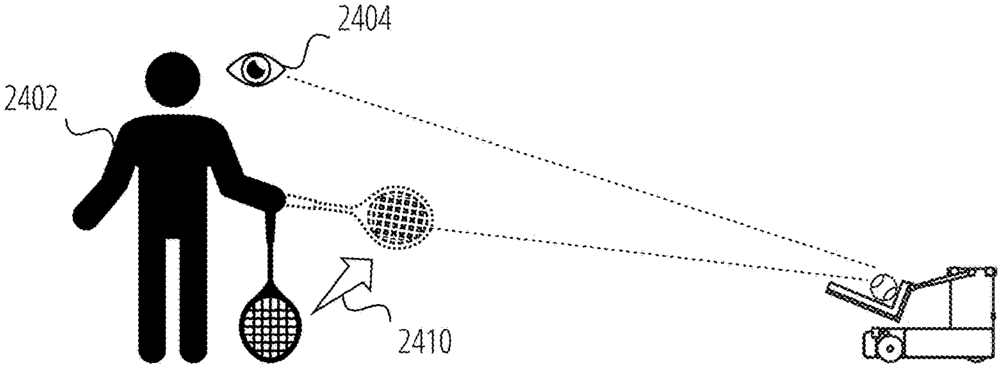

When commanded by a user, through either a user interface 2300 such as that illustrated in FIG. 23A, gesture controls 2400 such as those illustrated in FIG. 24A-FIG. 24C, voice commands, or some other method of communication, or as dictated by programmatic or environmental conditions, the ball collection robot 600 may enter a go to location mode 1108 state. In the go to location mode 1108 state, the ball collection robot 600 may navigate to a location within its map, and may follow waypoints it has determined or detected, to reach a target location. Once this location is reached, the ball collection robot 600 may go back to its ready mode 1106 state. In the case that the location indicated is its charging station, the ball collection robot 600 may navigate to the station, dock, and return to the charging mode/sleep mode 1102 state.

Based on a manual activation by a user or a conditional activation based on a programmatic or environmental condition detected, and provided the scoop is determined to not be full, the ball collection robot 600 may enter a pick up ball mode 1110 state. In this state, the ball collection robot 600 may navigate its environment and pick balls up off the ground while following ball pickup area rules. These rules may be set forth in preconfigured algorithms, and may depend on characteristics of the environment and gameplay of a particular sport. For example, a ball collection robot 600 configured to pick up tennis balls may be given a rule of "sideline" for its pickup area. The ball collection robot 600 may then navigate and operate within the sideline area, outside of the tennis court bounds.

When a pickup threshold is reached, the ball collection robot 600 may transition to a post pickup mode 1112 state. A pickup threshold may be met when the ball collection robot 600 determines, using cameras, weight measurements, or other sensor data, that its scoop is full. Alternatively, the pickup threshold may be met when the ball collection robot 600 detects no additional objects needing retrieval in its environment, or within the bounds it may operate in based on the pickup area rules. In the post pickup mode 1112 state, the ball collection robot 600 may navigate to a location where it is configured to bring balls after pickup, such as a ball basket or ball launcher, or a player, coach, or other personnel. The ball collection robot 600 may then perform a drop operation to deposit the contents of its scoop into the desired receptacle, or, if configured to go to a person, may remain in place until it determines that its scoop is empty.

Once the scoop is determined to be empty, the ball collection robot 600 may enter a go to standby location mode 1114 state. The ball collection robot 600 may in this state navigate to a preconfigured standby location, such as the sidelines, out of the way of gameplay and associated foot traffic. Once the sideline location is reached, the ball collection robot 600 may transition back to the ready mode 1106 state.

When manually activated by a user, the ball collection robot 600 may enter a follow person mode 1116 state. In this state, the ball collection robot 600 may navigate to within a predetermined distance of a particular person. For example, the ball collection robot 600 may travel to a target person, stopping at a distance of two meters from that person. The ball collection robot 600 may then pause its movement until or unless the person moves away from the robot. The robot may follow a moving person. In one embodiment, heuristics may be used to determine a distance which the target person may need to move before the robot follows, so that the robot does not expend unnecessary power tracking minor motions made by the target person. The ball collection robot 600 may remain in the follow person mode 1116 state until the state is deactivated by a user, when the ball collection robot 600 may return to the ready mode 1106 state. In one embodiment, the ball collection robot 600 may be capable of exiting the follow person mode 1116 state without manual deactivation. For example, the ball collection robot 600 may exit this state when it detects that it is running low on power, and may transition through the states needed to return to its docking station. (This may be true for any state; the ball collection robot 600 may be programmed to automatically transition through states to return to its docking station based on power level, time intervals without state change, or other programmatic or environmental conditions.)

Upon user request, the ball collection robot 600 may enter the carry basket mode 1118 state. In this state, the ball collection robot 600 may navigate to a ball basket, ball launcher, or other similar equipment. The ball collection robot 600 may pick this apparatus up with its scoop so that it is ready to be moved to a new location. Once the ball basket is picked up and ready for transport, the ball collection robot 600 may return to its ready mode 1106 state.

When commanded by a user, the ball collection robot 600 may enter a place basket mode 1120 state. In this state, the user requests that the basket be placed at the current location of the ball collection robot 600. In this state, the ball collection robot 600 lowers its scoop and deposits the basket at a current location. In one embodiment, as may be anticipated, the user may command the ball collection robot 600 to enter its carry basket mode 1118 state, then its follow person mode 1116 state, in which the user is the target person. Once the user has moved to a desired location, followed by the robot, the user may request the place basket mode 1120 state. In one embodiment, the ball collection robot 600 may be preconfigured with appropriate locations for ball baskets and ball launchers, and may be able to transition from the carry basket mode 1118 state to the place basket mode 1120 state without additional commands by the user. For example, the ball collection robot 600 may be configured with a "practice setup" routine in which it prepares a court for practice by locating a ball launcher and placing it in a desired location if it is not already at that location.

Figures 12A, 12B:
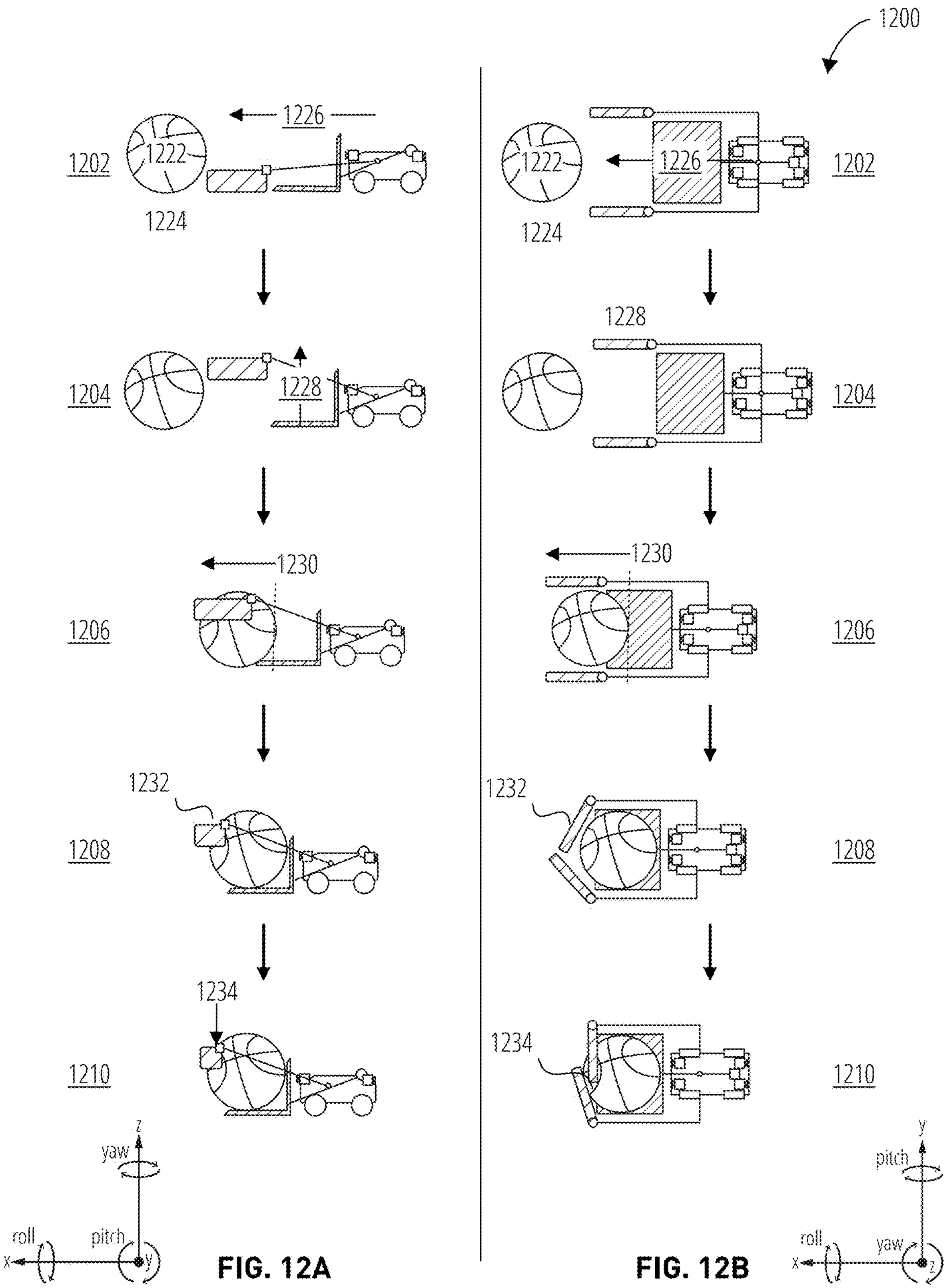
FIG. 12A through FIG. 12D illustrate a pickup strategy for a basketball 1200 in accordance with one embodiment.
Figure 12C:
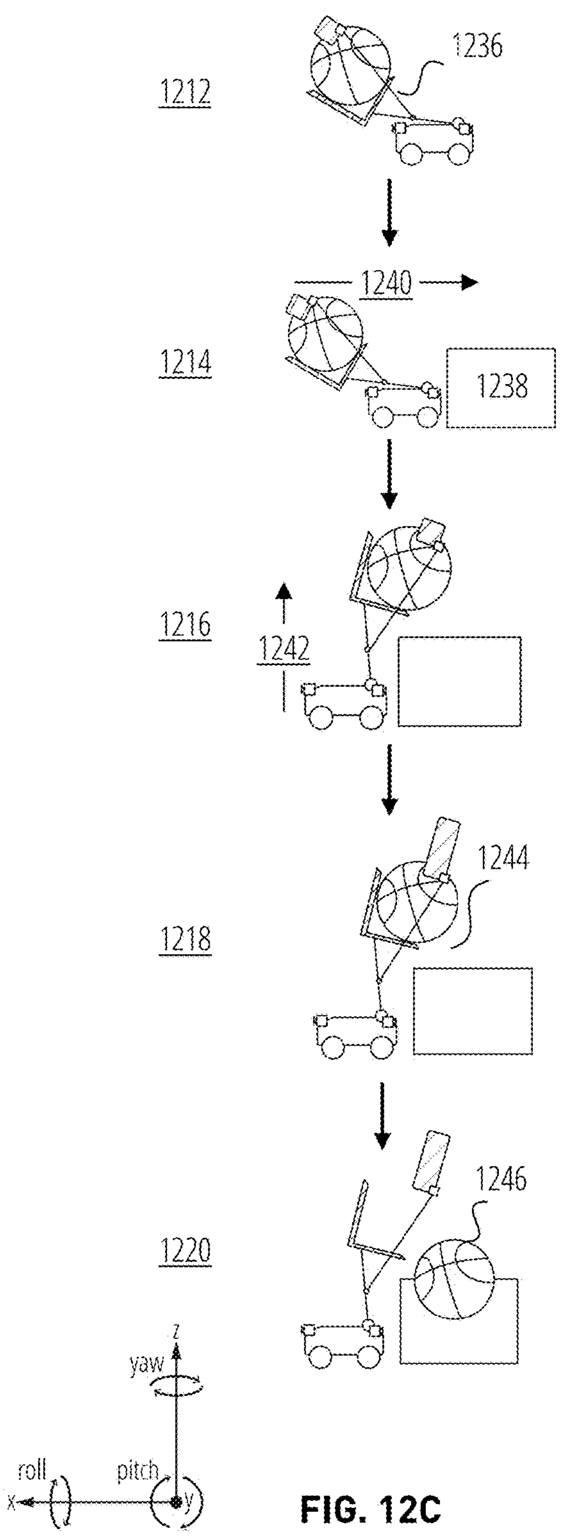
Figure 12D:
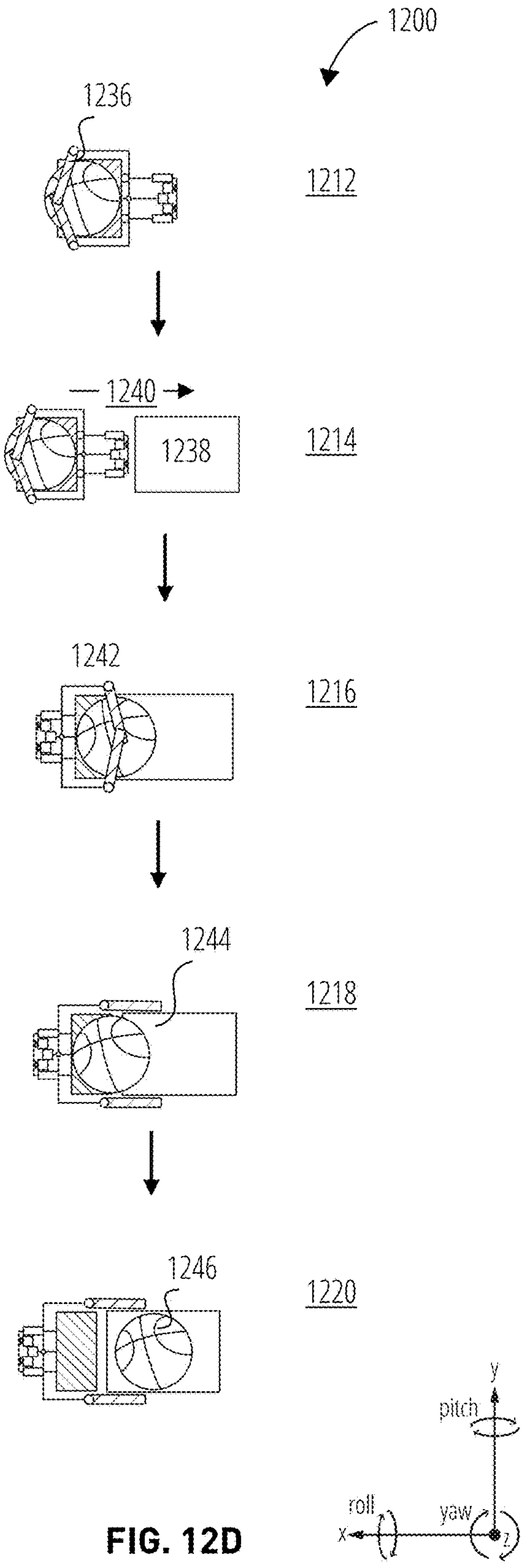

FIG. 12A-FIG. 12D illustrate a pickup strategy for a basketball 1200 in accordance with one embodiment. FIG. 12A shows a side view of the robot performing steps 1202-1210, while FIG. 12B shows a top view of the performance of these same steps. FIG. 12C illustrates a side view of steps 1212-1220, and FIG. 12D shows a top view of these steps. A large, slightly deformable object may be an object such as a basketball, which extends outside of the dimensions of the scoop, and may respond to pressure with very little deformation or change of shape.

As illustrated in FIG. 12A and FIG. 12B, the robot may first drive to the basketball 1222, such as a basketball, located at a starting location 1224, following an approach path 1226 at step 1202. The robot may adjust its pusher pad arms to a grabbing height 1228 based on the type of object at step 1204. For a basketball 1222 such as a basketball, this may be near or above the top of the basketball. The robot, at step 1206, may drive so that its arms align past the object 1230. The robot may employ a grabbing pattern 1232 at step 1208 to use its arms to push or roll the basketball onto the scoop or scoop. Using the pusher pad arms at step 1210, the robot may apply a light pressure 1234 to the top of the basketball to hold it securely within or atop the scoop.

As shown in FIG. 12C and FIG. 12D, the robot may lift the basketball at step 1212 while continuing to hold it with its pusher pad arms, maintaining the ball within the scoop in a carrying position 1236. Next, at step 1214, the robot may drive to the post pickup location 1238 where the basketball is intended to be placed, following a post pickup location approach path 1240. At step 1216, the robot may adjust the scoop and pusher pad arms to position the basketball at a deposition height 1242. For an object such as a basketball, this may position the scoop and ball in an area above the robot, tilted or aimed toward a container. The robot may at step 1218 open its arms to release the object into the post pickup location container using a dropping pattern 1244. The basketball may then fall out of the scoop 1246 and come to rest in its post pickup location container at step 1220.

While the robot shown in FIG. 12A-FIG. 12D may be seen to have pusher pad arms attaching to pivot points on the scoop arm, this is a simplified schematic view provided for exemplary purposes. Performance of the pickup strategy for a basketball 1200 is not limited to robot embodiments exhibiting this feature. The pickup strategy for a basketball 1200 may be performed by any of the robots disclosed herein, such as those illustrated in FIG. 1A through FIG. 7. One of ordinary skill in the art will readily apprehend how the pickup strategy for a basketball 1200 may be modified slightly for performance by a robot such as that illustrated in FIG. 8, as well.

Figure 13A:
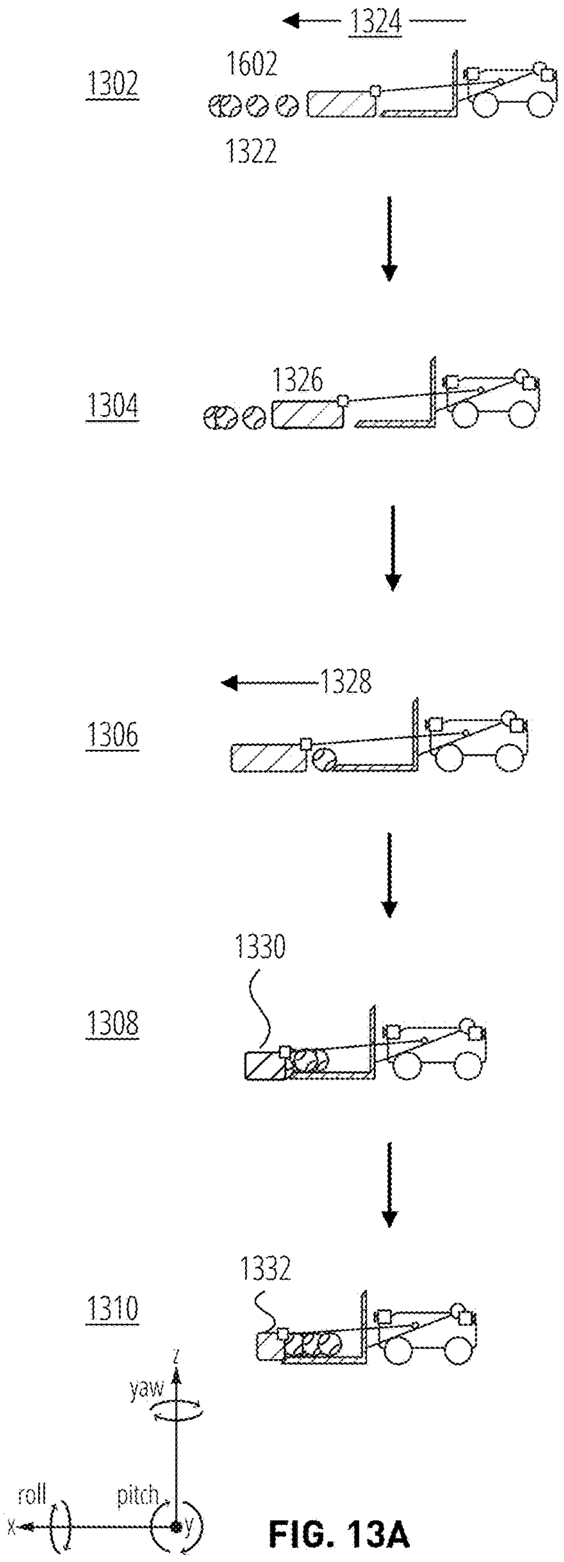
FIG. 13A-FIG. 13D illustrate a pickup strategy for tennis balls 1300 in accordance with one embodiment.
Figure 13B:
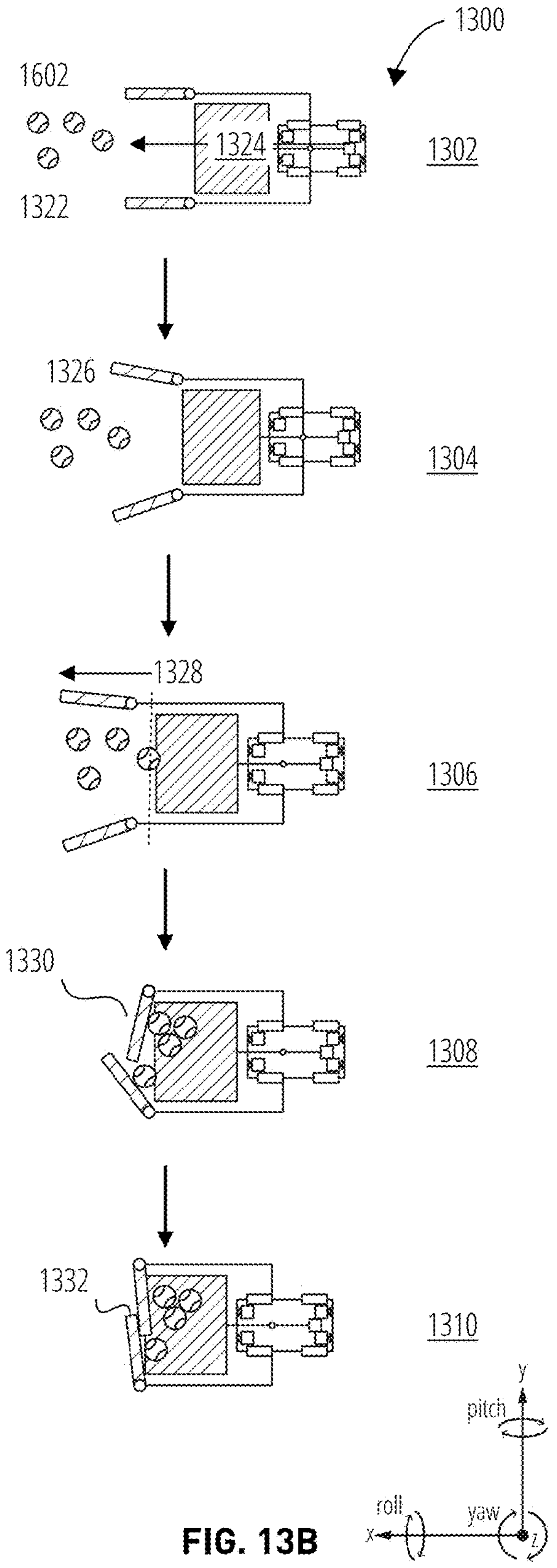
Figure 13C:
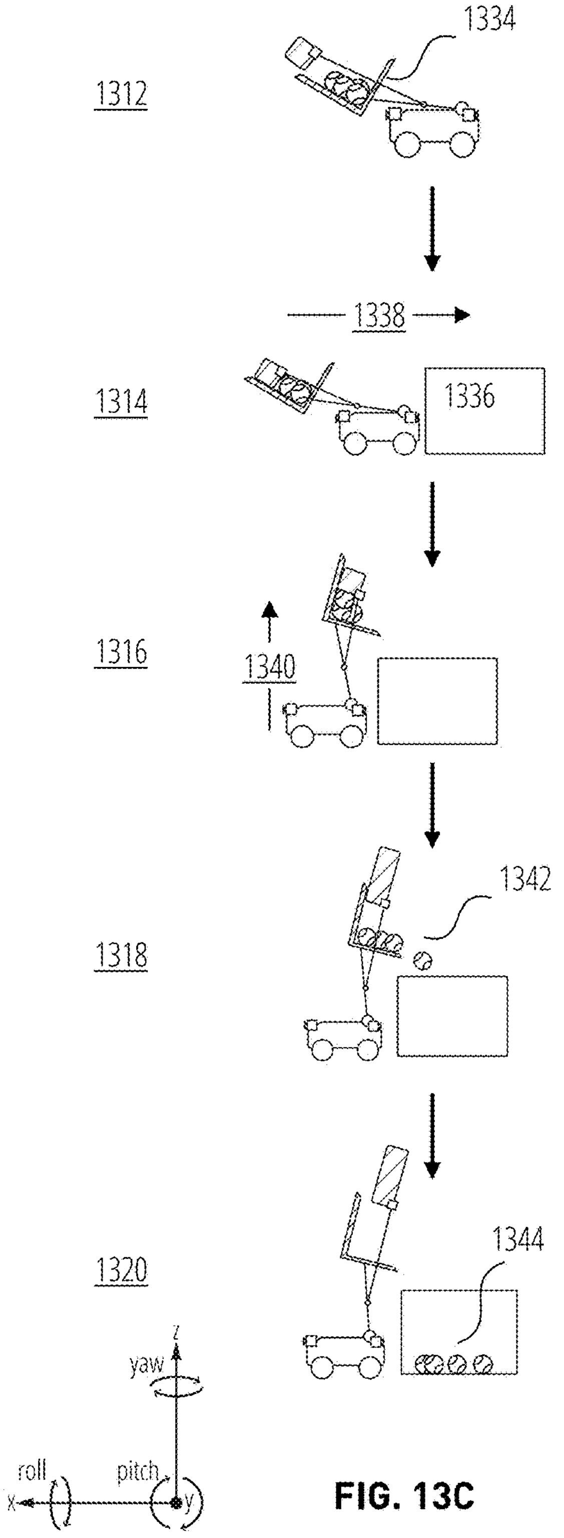
Figure 13D:
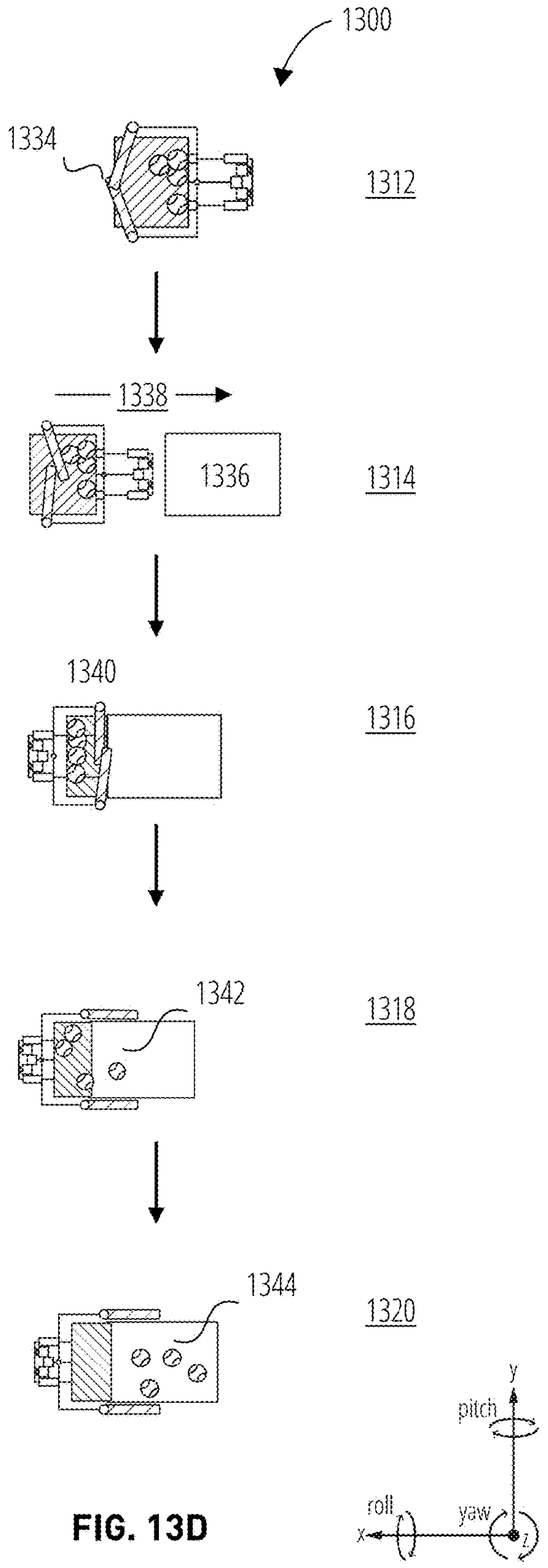

FIG. 13A-FIG. 13D illustrate a pickup strategy for tennis balls 1300 in accordance with one embodiment. FIG. 13A shows a side view of the robot performing steps step 1302-1310, while FIG. 13B shows a top view of the performance of these same steps. FIG. 13C illustrates a side view of steps 1312-1320, and FIG. 13D shows a top view of these steps. Tennis balls are illustrated, but a similar process may be used for racquetballs, squash balls, badminton birdies, golf bolls, or other small sports equipment that may be easily disbursed when contacted with the robot's pusher pad arms, or may slip out of the scoop during transit if appropriate care is not taken.

As illustrated in FIG. 13A and FIG. 13B, the robot may first drive to the tennis balls 1602 located at a starting location 1322, following an approach path 1324 at step 1302. The robot may, at step 1304, adjust its pusher pad arms to a grabbing height 1326 based on the type of object being collected. For tennis balls, this may be near or in contact with the floor. At step 1306, the robot may drive so that its arms are aligned past the objects 1328. The robot may employ a grabbing pattern 1330 at step 1308 to use its arms to push the objects onto the scoop. The grabbing pattern 1330 for such objects may apply less force, or use small, sweeping motions rather than a continuous pressure. The grabbing pattern 1330 may include a ball trapping maneuver 1400, in which one arm closes first and the other closes behind it to first trap then collect the balls. A more detailed view of this maneuver is provided in FIG. 14. At step 1310, the robot may close its arms 1332 across the front of the scoop, and may apply light pressure against the scoop, to prevent the tennis balls or other objects from rolling or sliding out.

Figure 16:
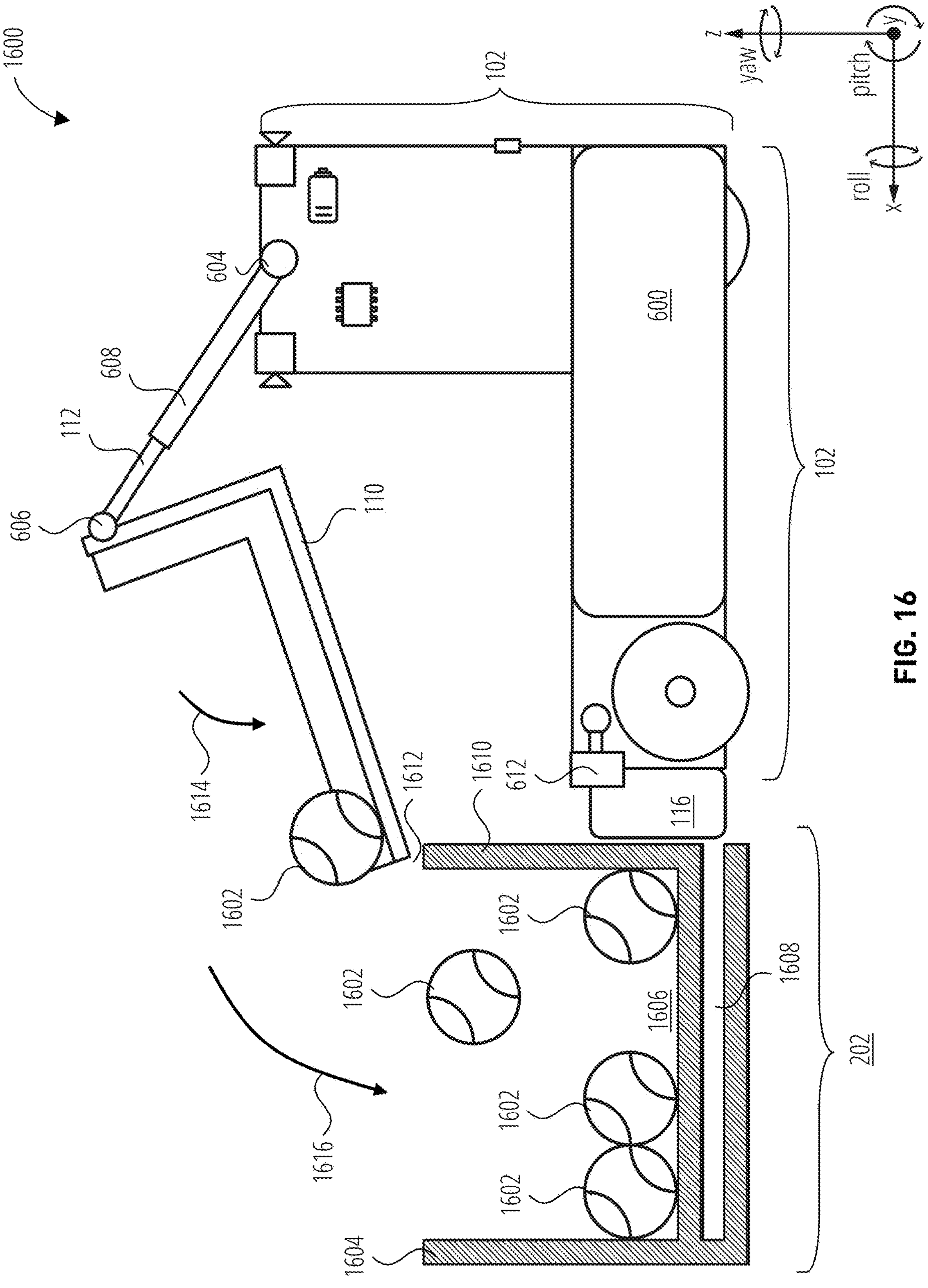
FIG. 16 illustrates a robot interaction with a ball basket 1600 in accordance with one embodiment.

As shown in FIG. 13C and FIG. 13D, the robot may lift the tennis balls or other objects at step 1312 while continuing to block the scoop front opening with its pusher pad arms, maintaining the objects within the scoop in a carrying position 1334. Next, at step 1314, the robot may drive to the post pickup location 1336 where the objects are intended to be placed, such as a ball basket, following a post pickup location approach path 1338. The robot may adjust the scoop and pusher pad arms at step 1316 to position the objects at a deposition height 1340. This may position the scoop in an area above the robot, tilted or aimed toward a container at the rear of the robot as shown. Alternatively, the container may be to the front of the robot and the objects deposited as illustrated in FIG. 16. At step 1318, the robot may open its arms to release any objects trapped by them into the post pickup location container using a dropping pattern 1342. The tennis balls or other objects may then roll, slide, or fall out of the scoop 1344 and come to rest in their post pickup location container at step 1320.

While the robot shown in FIG. 13A-FIG. 13D may be seen to have pusher pad arms attaching to pivot points on the scoop arm, this is a simplified schematic view provided for exemplary purposes. Performance of the pickup strategy for tennis balls 1300 is not limited to robot embodiments exhibiting this feature. The pickup strategy for tennis balls 1300 may be performed by any of the robots disclosed herein, such as those illustrated in FIG. 1A through FIG. 7. One of ordinary skill in the art will readily apprehend how the pickup strategy for tennis balls 1300 may be modified slightly for performance by a robot such as that illustrated in FIG. 8, as well.

Figure 14:
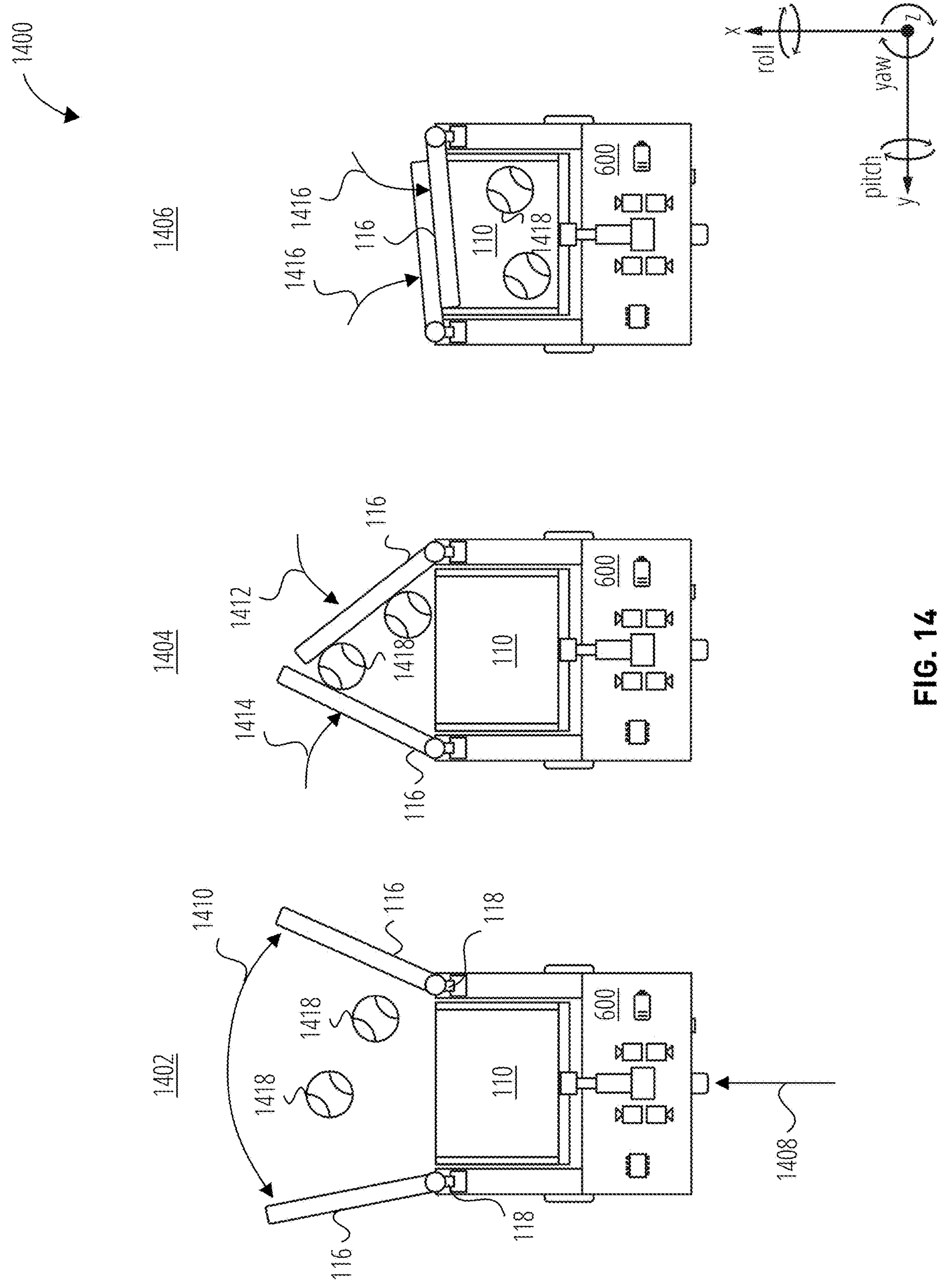
FIG. 14 illustrates a ball trapping maneuver 1400 in accordance with one embodiment.

FIG. 14 illustrates a ball trapping maneuver 1400 in accordance with one embodiment. This maneuver may be coordinated to contain and retrieve small, easily scattered objects such as tennis balls, badminton birdies, table tennis balls, pickle balls, golf balls, etc. Broadly speaking, the ball trapping maneuver 1400 may comprise an approach step 1402, a caging step 1404, and a securing step 1406.

During the approach step 1402, the ball collection robot 600 may move toward 1408 the target balls 1418 or other objects for pickup with the pusher pads spread wide enough 1410 to encompass a group of tennis balls or other objects to be picked up using the ball trapping maneuver 1400. In the caging step 1404, the ball collection robot 600 may then close one pusher pad 1412 slightly ahead of the other pusher pad 1414, such that the second pad may trap target balls 1418 or objects that may tend to roll or slide away from the pressure of the first pusher pad.

Finally, during the securing step 1406, the ball collection robot 600 may eventually close off 1416 the front of the scoop with both pusher pads, trapping the target balls 1418 or other objects within the basket. In one embodiment, the pusher pads may be configured to continue rotating inward in order to press the target balls 1418 captured against the back of the scoop, preventing them from rolling within or becoming dislodged from the scoop during transport, until the ball collection robot 600 acts to deposit the balls or objects at a post pickup location.

In one embodiment, the pusher pad arms 118 may include linear actuators, as is shown for the scoop arm 112 in FIG. 6B. These linear actuators may extend as part of the approach step 1402 in order to encompass the group of objects. The pusher pads 116 may then be closed in a wedge as shown for the caging step 1404, and the balls may be pulled all or partially into the scoop 110 through retraction of the linear actuators, as will be readily apprehended by one of ordinary skill in the art.

Figure 15A:
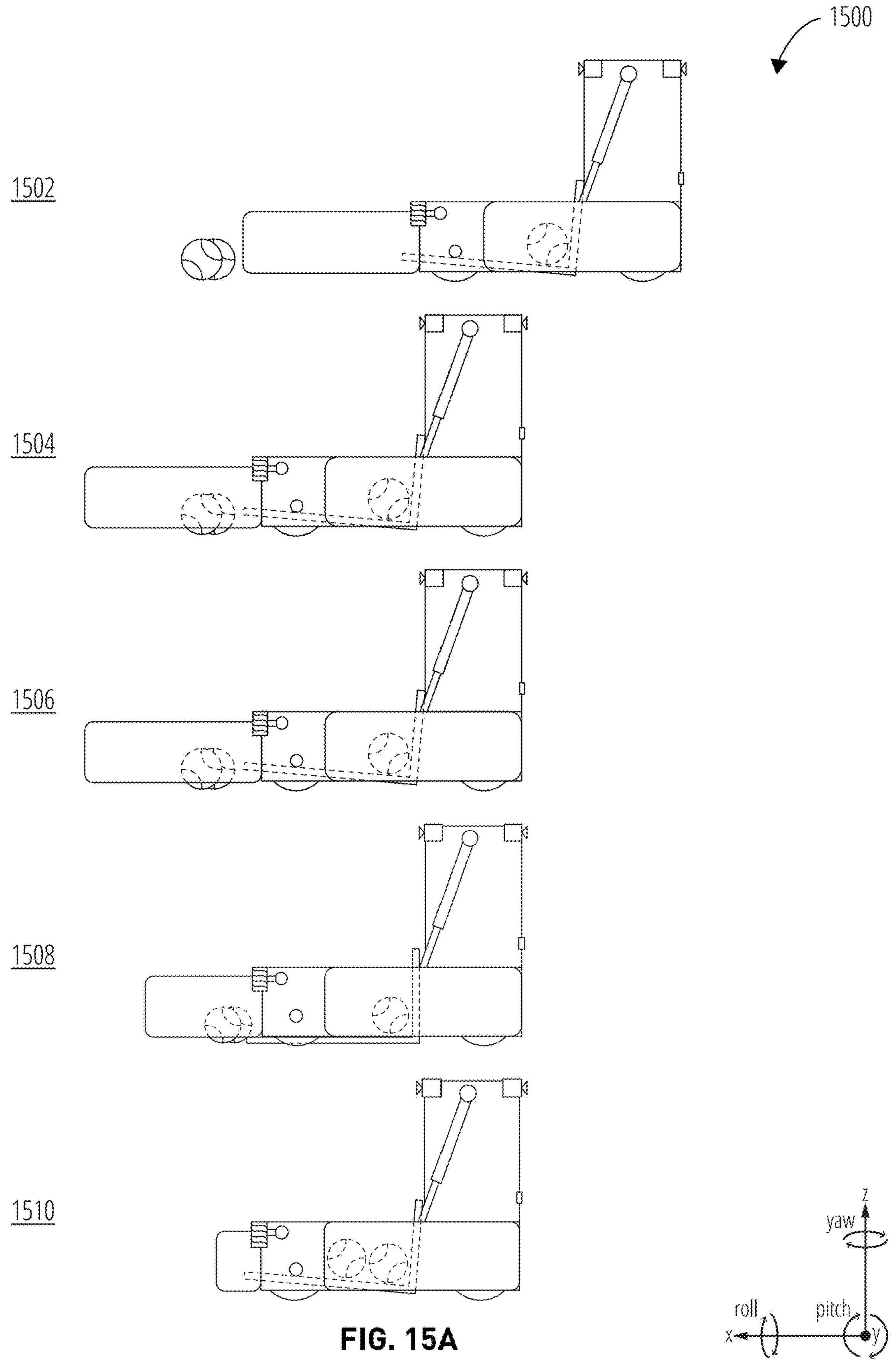
FIG. 15A and FIG. 15B illustrate an iterative ball pickup routine 1500 in accordance with one embodiment.
Figure 15B:
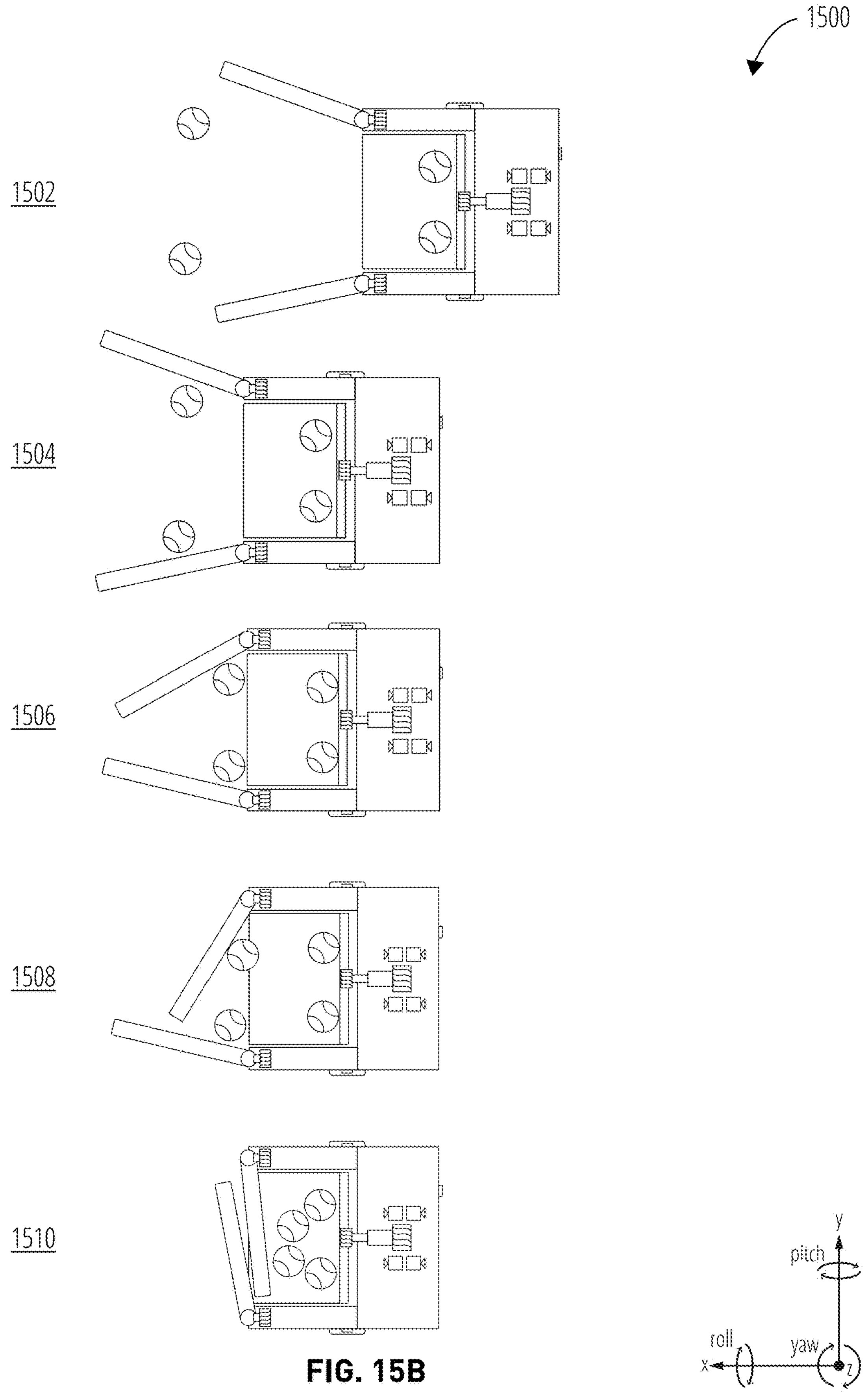

FIG. 15A and FIG. 15B illustrate an iterative ball pickup routine 1500 in accordance with one embodiment. FIG. 15A illustrates a left side elevation view of the ball collection robot 600 performing the iterative ball pickup routine 1500. FIG. 15B illustrates a plan view of the ball collection robot 600 performing the iterative ball pickup routine 1500. The iterative ball pickup routine 1500 describes the steps by which the ball collection robot 600 may incrementally pick up additional balls without dropping the balls it is already carrying in the scoop.

In step 1502, the scoop may be positioned near the ground and tilted slightly back. In this position, the balls in the scoop may be prevented from rolling forward, and balls on the ground may be prevented from rolling under the scoop. The robot may approach additional balls to be picked up with its pusher pads spread open, as described with respect to FIG. 14.

In step 1504, the robot may drive forward until the additional balls are against the edge of the scoop. In step 1506, the robot may begin closing its pusher pads which may hold the balls against the scoop edge, and may prevent the balls from rolling away.

In step 1508, the robot may lower the scoop to be flat against the ground. The robot may drive backwards slightly (e.g., 1-2 cm) while lowering the scoop to prevent the balls at the scoop edge from catching. The robot may continue closing its pusher pads in a caging maneuver such as was described with respect to FIG. 14.

Finally, in step 1510, the additional balls are captured in the scoop. The robot may hold them in place with the pusher pads. The robot may also return the scoop to the position near the ground and slightly tilted back in which it began at step 1502, again preventing any of the balls in the scoop from rolling out.

FIG. 16 illustrates a robot interaction with a ball basket 1600 in accordance with one embodiment. FIG. 16 illustrates degrees of freedom of motion with which the ball collection robot 600 may be configured, and a position the ball collection robot 600 may assume to perform a forward or front dump depositing tennis balls 1602 (or other small, portable sports equipment) into a ball basket 1604. The ball basket 1604 may include ball storage 1606, a slot 1608, and a wall of the basket 1610, and may be similar in construction and function as the ball basket 1800, ball basket 1900, ball basket with passively extendable legs 2000, ball basket with actively extendable legs 2100, and ball launcher 2200 illustrated in FIG. 18A-FIG. 22B, respectively. Each pusher pad 116 may be able to rotate horizontally through the action of the fifth motors 612 upon the pusher pads 116, such that the pusher pads 116 may fold inward, as illustrated in FIG. 16.

The scoop 110 may be rotated vertically with respect to the scoop arm 112 through the action of its third motor 606. As previously described, it may be moved away from or toward the chassis 102 through the action of a linear actuator 608 configured with the scoop arm 112. The scoop 110 may also be raised and lowered by the rotation of the scoop arm 112, actuated by the second motor 604.

FIG. 16 illustrates how the positions of the components of the ball collection robot 600 may be configured such that the pusher pads 116 may be folded against the chassis 102 through the action of fifth motor 612 so the ball collection robot 600 may approach a ball basket 1800, and the scoop 110 may be raised by second motor 604, extended by linear actuator 608, and tilted by third motor 606 so that tennis balls 1602 carried in the scoop 110 may be deposited in a ball basket 1800.

Configured thusly, the ball collection robot 600 may perform a forward or front dump of the tennis balls 1602 into a ball basket 1604 as shown. The ball collection robot 600 may approach the ball basket 1604 such that the ball basket 1604 is in front 202 of the ball collection robot 600. The ball collection robot 600 may move a front edge of the scoop 1612 over a wall of the basket 1610. The ball collection robot 600 may then rotate the scoop 110 to a downward position 1614 until all of the tennis balls 1602 have fallen out of the scoop 110 and been deposited in the ball basket 1604, accomplishing the forward dump 1616.

Figure 17A:
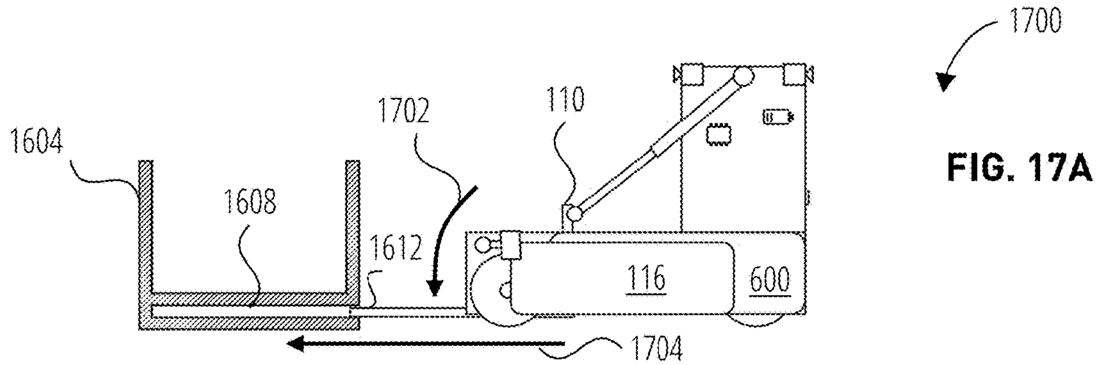
FIG. 17A-FIG. 17F illustrate a robot interaction with a trailer 1700 in accordance with one embodiment.

FIG. 17A-FIG. 17F illustrate a robot interaction with a trailer 1700 in accordance with one embodiment. The ball collection robot 600 may fold its pusher pads 116 horizontally against its chassis 102 as illustrated, and may navigate to a location such that a ball basket 1604 is in front of the ball collection robot 600. The ball collection robot 600 may then lower 1702 its scoop 110 to an appropriate height for the front edge of the scoop 1612 to engage with the slot 1608 of the ball basket 1604. The ball collection robot 600 may then move forward 1704, thereby inserting the scoop 110 into the slot 1608, as shown in FIG. 17A.

Figure 17B:
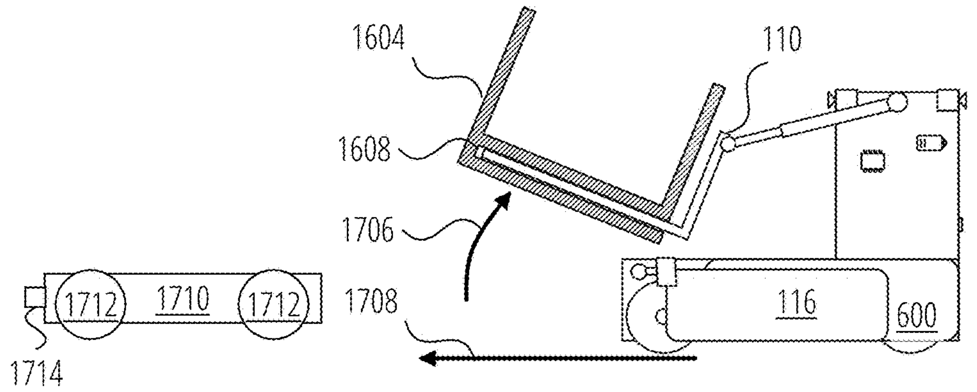

Once the scoop 110 is seated within the slot of the ball basket 1604, the ball collection robot 600 may raise the ball basket 1604 to a carrying position 1706, and may navigate 1708 to a trailer 1710, as shown in FIG. 17B. The trailer 1710 may have trailer wheels 1712 and a trailer coupler 1714.

Figure 17C:
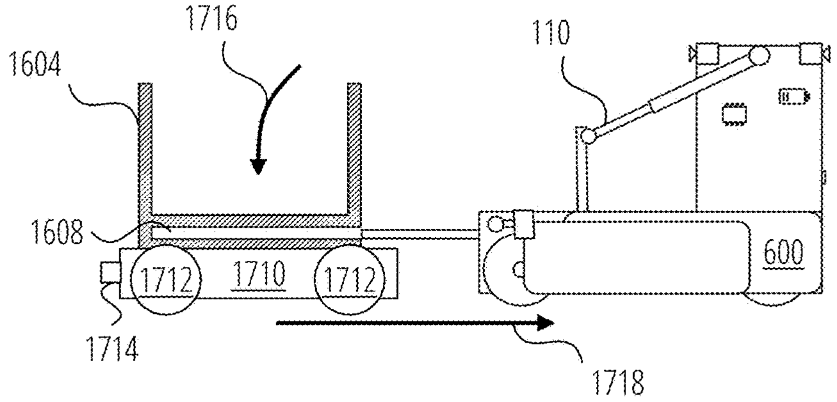

When in position, with the trailer 1710 to the front of the ball collection robot 600, the ball collection robot 600 may lower its scoop 110, thereby lowering 1716 the ball basket 1604 onto the trailer 1710. The ball collection robot 600 may then back up 1718, withdrawing the scoop 110 from the slot 1608 of the ball basket 1604 as indicated in FIG. 17C.

Figure 17D:
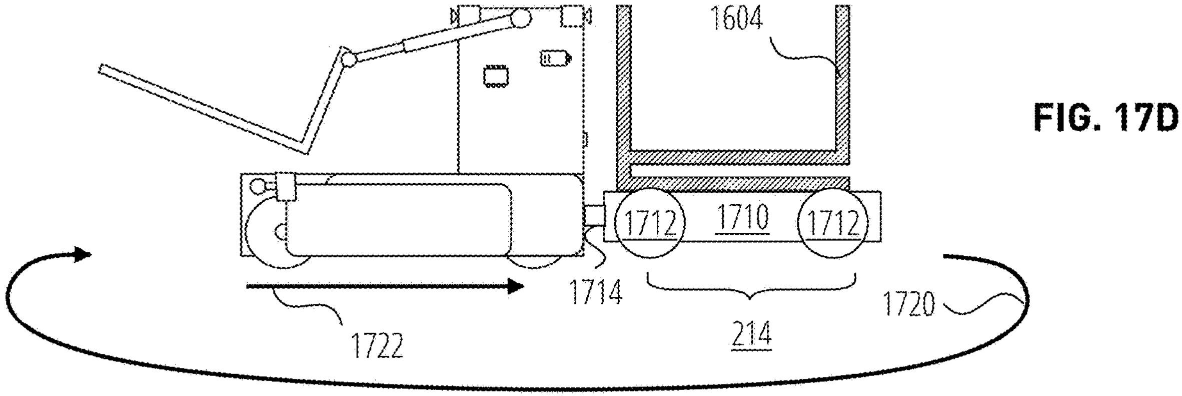

Once the ball basket 1604 is deposited on the trailer 1710, the ball collection robot 600 may navigate around 1720 to a position with the trailer 1710 to the rear 214 of the ball collection robot 600, the trailer coupler 1714 on the side of the trailer 1710 facing the ball collection robot 600. The ball collection robot 600 may then back up 1722 until the trailer coupler 1714 engages with a feature of the ball collection robot 600, thus securely coupling the the trailer 1710 to the ball collection robot 600, as shown in FIG. 17D.

The trailer coupler 1714 is illustrated as a feature of the trailer 1710 for simplicity, and is not intended to be limited to such. It is well understood by those of skill in the art that the trailer coupler 1714 may comprise any number of configurations, including magnetic coupling, mechanical coupling, etc., which may be designed as a pairing of physical features, one feature on the ball collection robot 600 and one on the trailer 1710, the two configured to engage with and securely attach to each other.

Figure 17E:
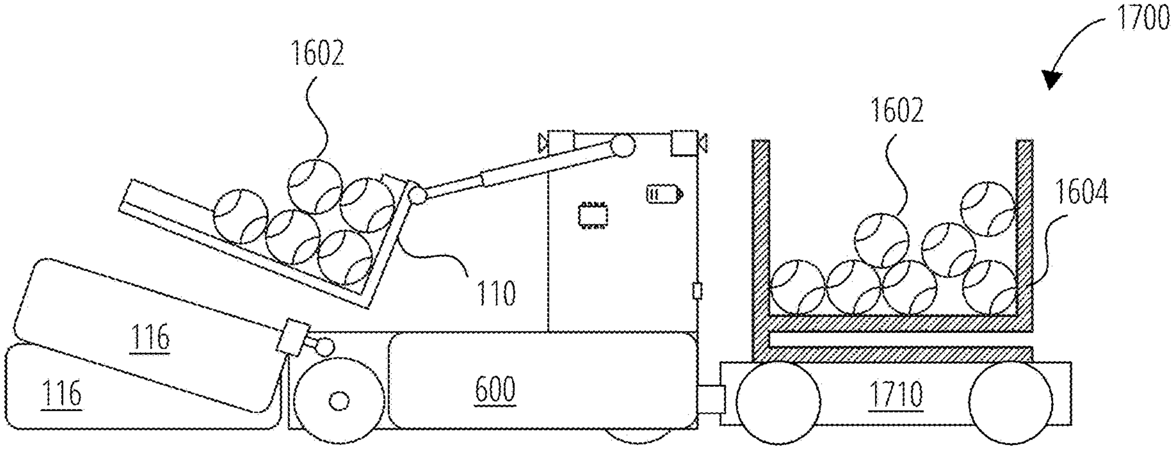

With the ball basket 1604 residing on the trailer 1710 and the trailer 1710 coupled to the ball collection robot 600, the ball collection robot 600 may proceed to capture and carry target objects such as tennis balls 1602 in its scoop 110 as disclosed elsewhere herein, while towing the trailer 1710 behind itself as it navigates and retrieves objects, as shown in FIG. 17E.

Figure 17F:
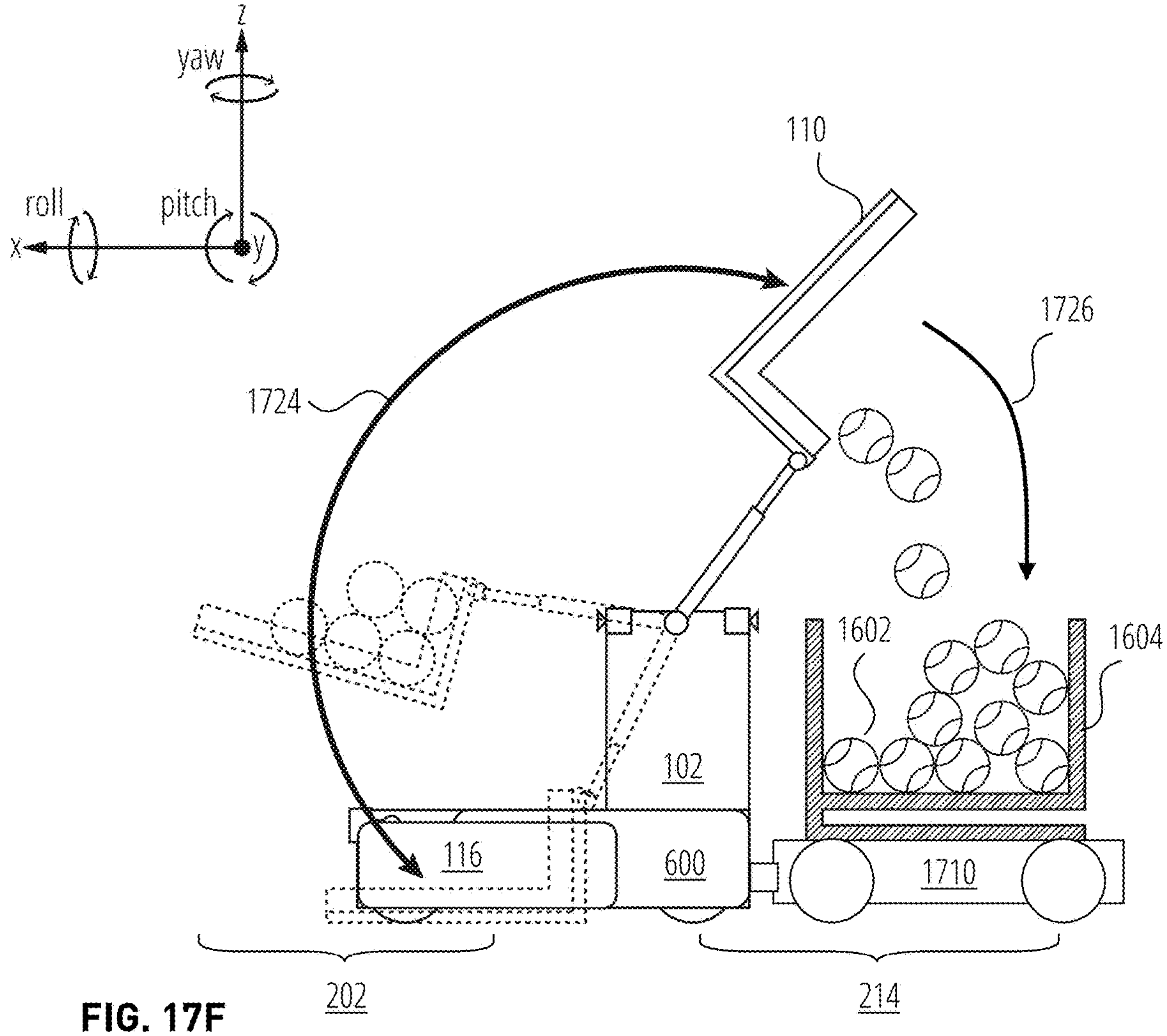

When the scoop 110 no longer has the capacity to collect more objects, the ball collection robot 600 may raise the scoop 110 along a path that is an arc 1724 from the front 202 of the ball collection robot 600, over the chassis 102 of the ball collection robot 600 toward the rear 214 of the ball collection robot 600. The ball collection robot 600 may maintain its scoop 110 in this raised position until all of the tennis balls 1602 or other objects have fallen from the scoop 110 into the ball basket 1604 residing on the trailer 1710 to the rear 214 of the ball collection robot 600, completing the rear dump 1726. In this manner, by carrying a ball basket 1604 on a trailer 1710 behind itself, into which it may empty its scoop 110 as needed by performing rear dumps 1726 as shown in FIG. 17F, the ball collection robot 600 may greatly expand its pickup threshold.

Figure 18A:
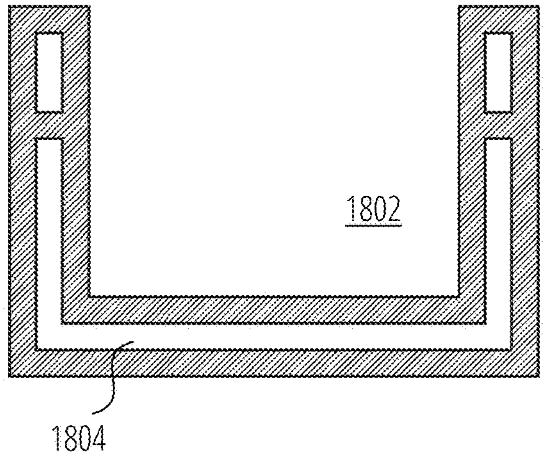
FIG. 18A-FIG. 18C illustrate a ball basket 1800 in accordance with one embodiment.
Figure 18B:
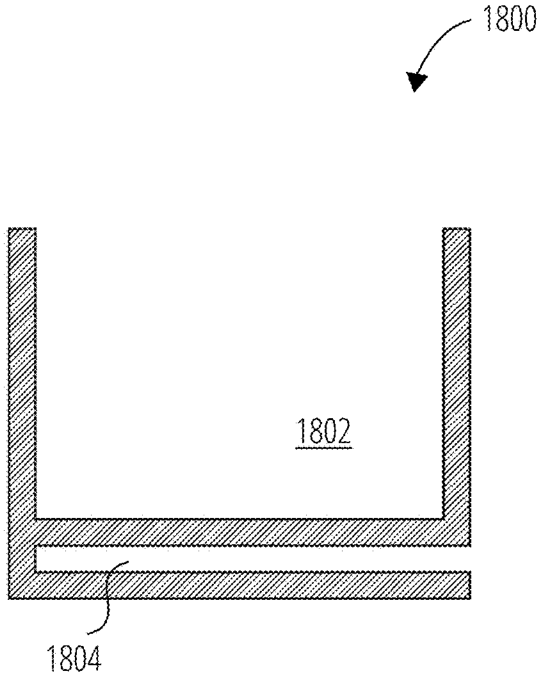
Figure 18C:
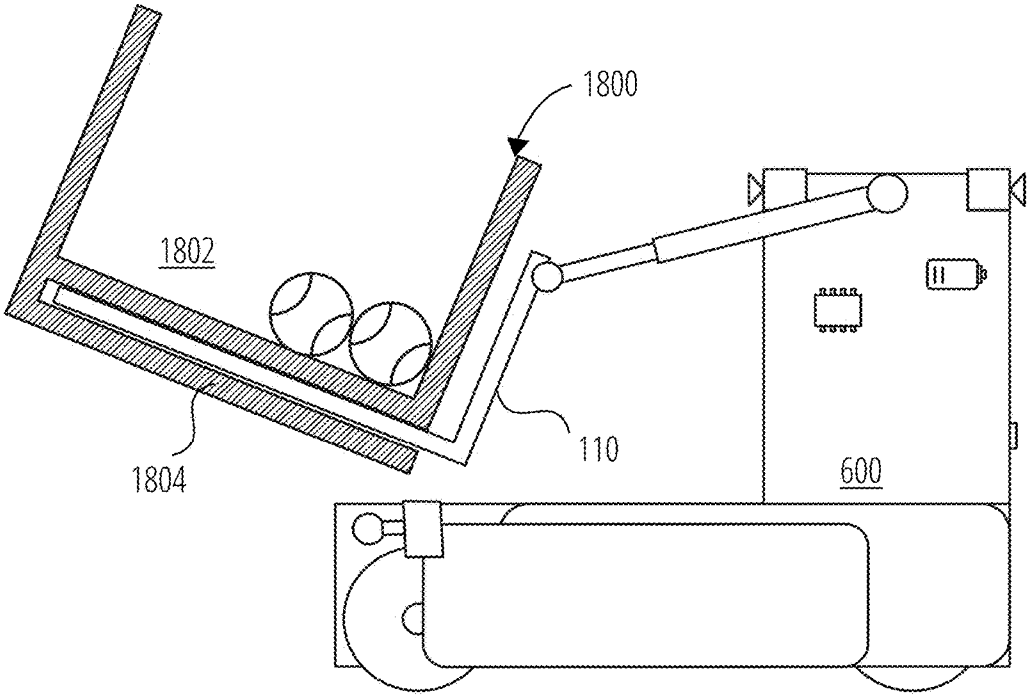

FIG. 18A-FIG. 18C illustrate a ball basket 1800 in accordance with one embodiment. FIG. 18A illustrates a front view and FIG. 18B illustrates a side view in cross-section of the ball basket 1800. The ball basket 1800 may include ball storage 1802 and a slot 1804 with which to interface with a robot's scoop. The ball basket 1800 may be manufactured from plastic, molded plastic, weather-resistant metals, and/or from other materials and processes that provide adequately sturdy and long-lasting equipment as are well known to one of ordinary skill in the art.

FIG. 18C illustrates how a robot such as the ball collection robot 600 may insert its scoop 110 within the slot 1804 (these elements being shown in cross section) and raise the ball basket 1800 to a carrying position for the purpose of relocating the ball basket 1800 to a desired location, with or without contents in the ball storage 1802 area.

Figure 19A:
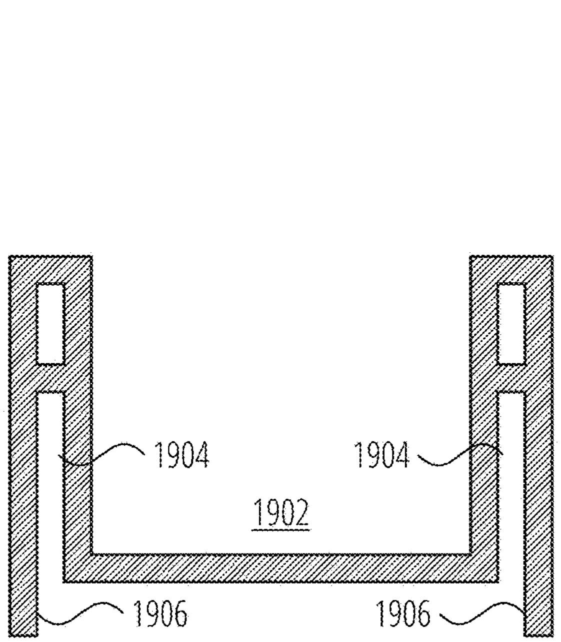
FIG. 19A-FIG. 19C illustrate a ball basket 1900 in accordance with one embodiment.
Figure 19B:
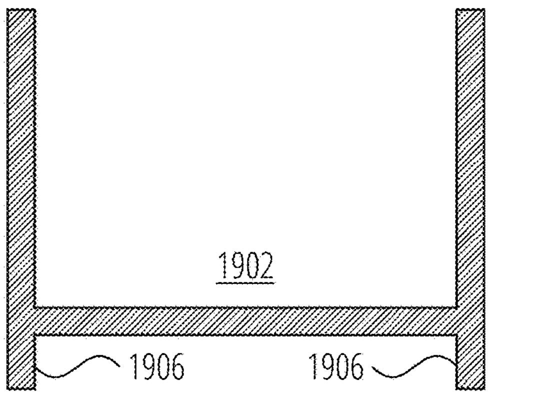
Figure 19C:
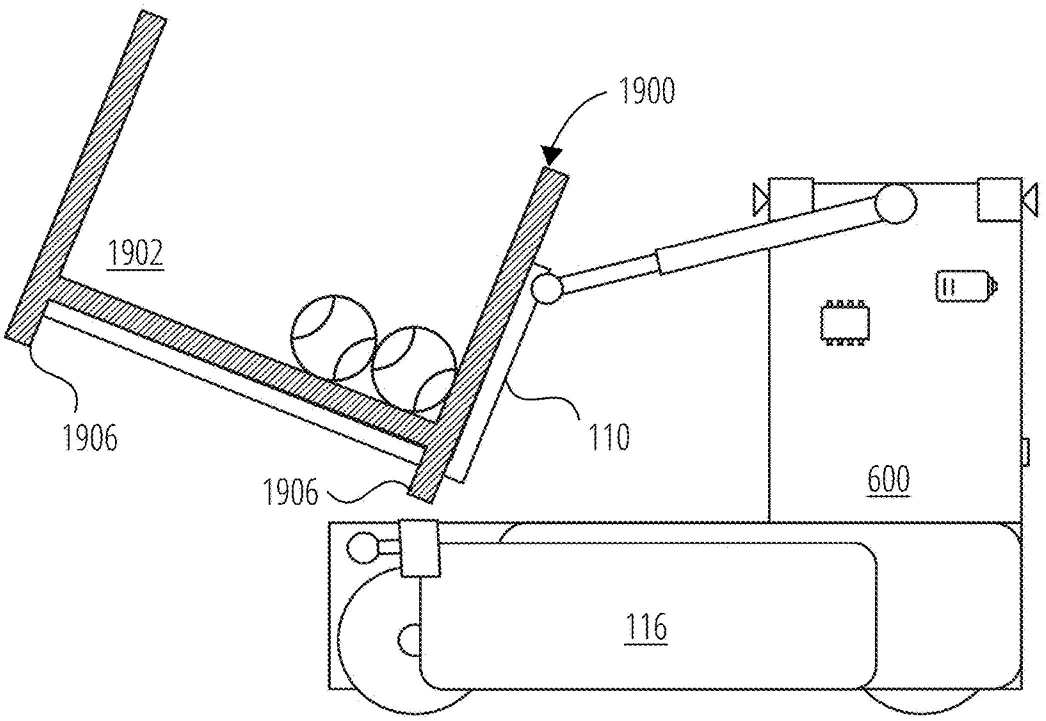

FIG. 19A-FIG. 19C illustrate a ball basket 1900 in accordance with one embodiment. FIG. 19A illustrates a front view and FIG. 19B illustrates a side view in cross-section of the ball basket 1900. The ball basket 1900 may include ball storage 1902, slots 1804 with which to interface with a robot's scoop, and legs 1906 supporting the ball basket 1900. The ball basket 1900 may be manufactured from plastic, molded plastic, weather-resistant metals, and/or from other materials and processes that provide adequately sturdy and long-lasting equipment as are well known those one of ordinary skill in the art.

FIG. 19C illustrates how a robot such as the ball collection robot 600 may insert its scoop 110 within the slots 1904 and between the legs 1906 of the ball basket 1900, and raise the ball basket 1900 to a carrying position for the purpose of relocating the ball basket 1900 to a desired location, with or without contents in the ball storage 1902 area.

In one embodiment, the legs 1906 may provide enough clearance such that slots 1904 are not needed, the scoop is able to pass below the ball storage 1902 and between the legs 1906, and the ball basket 1900 may simply rest atop the outer sides of the scoop when lifted.

Figure 20:
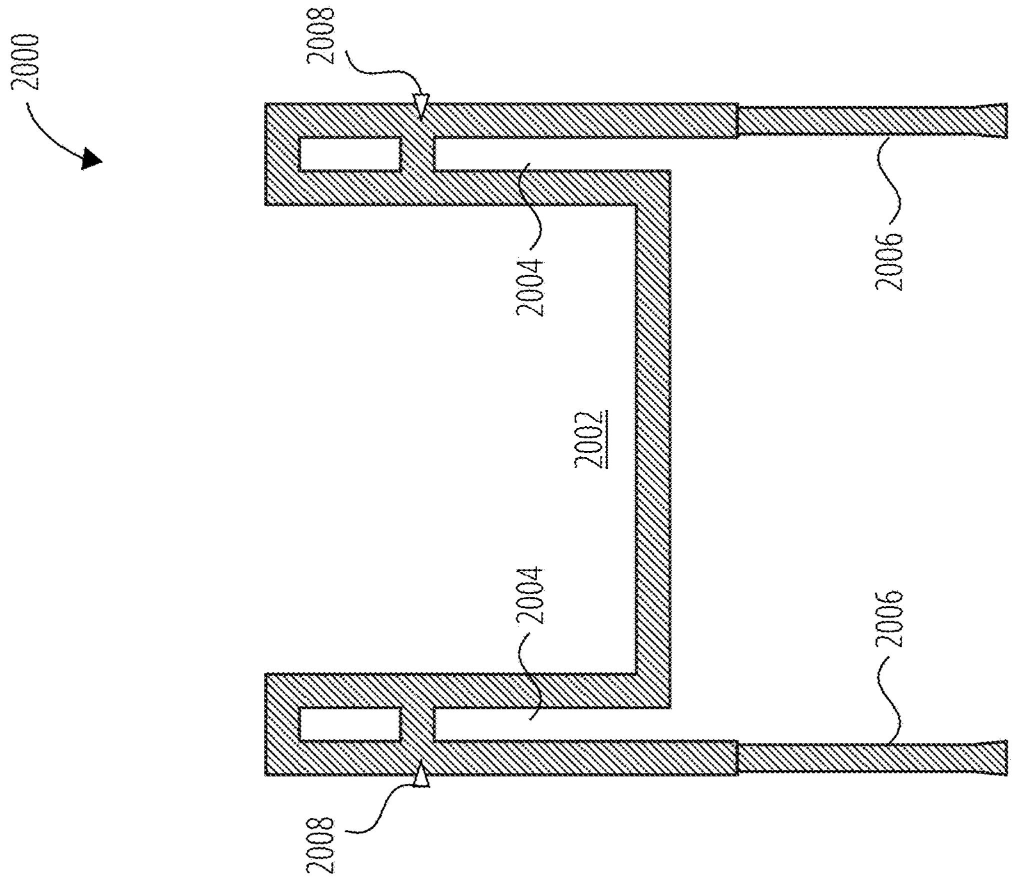
FIG. 20 illustrates a ball basket with passively extendable legs 2000 in accordance with one embodiment.

FIG. 20 illustrates a ball basket with passively extendable legs 2000. The ball basket with passively extendable legs 2000 may include ball storage 2002 and slots 2004 as illustrated for ball basket 1900 in FIG. 19A. The ball basket with passively extendable legs 2000 may also include telescoping legs 2006, such that the ball storage 2002 may be located near the ground when the robot is picking up and depositing balls within it, but may be elevated to a more convenient height when a person desires to retrieve balls from the basket for use. The ball basket with passively extendable legs 2000 may be manufactured from plastic, molded plastic, weather-resistant metals, and/or from other materials and processes that provide adequately sturdy and long-lasting equipment as are well known those of ordinary skill in the art.

In the passive instance shown in FIG. 20, a person or the robot may raise the ball basket with passively extendable legs 2000 to a suitable height, then employ leg locks 2008 to keep the legs extended to that height. A pin lock, a spring lock, or any other suitable leg lock 2008 may be employed. In one embodiment, a person may manually put the lock into place. The passive extension is shown here with telescoping legs, but other ways of extending and retracting these legs, such as folding the leg ends up toward or down away from the ball storage area, folding the legs in a concertina action, etc., may be readily apprehended by one of ordinary skill in the art.

Figure 21:
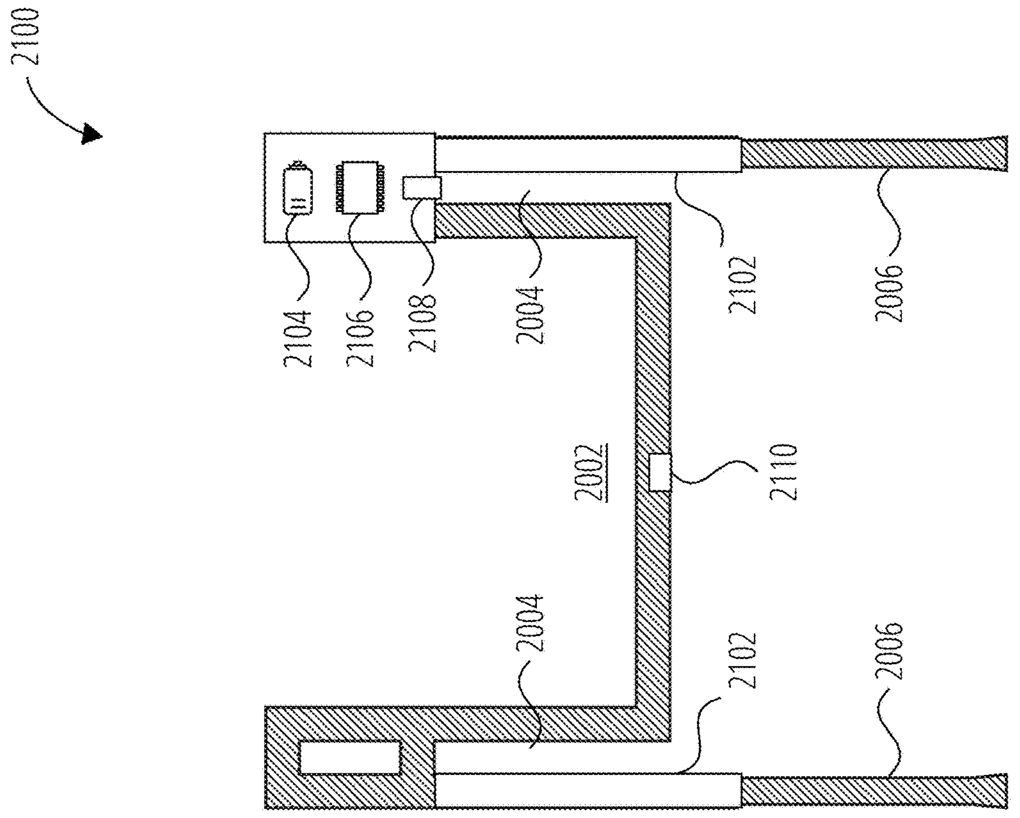
FIG. 21 illustrates a ball basket with actively extendable legs 2100 in accordance with one embodiment.

FIG. 21 illustrates a ball basket with actively extendable legs 2100. The ball basket with actively extendable legs 2100 may include ball storage 2002 and slots 2004 as illustrated for ball basket 1900 in FIG. 19A. The ball basket with actively extendable legs 2100 may also include telescoping legs 2006, as shown for the ball basket with passively extendable legs 2000 illustrated in FIG. 20. The ball basket with actively extendable legs 2100 may be manufactured from plastic, molded plastic, weather-resistant metals, and/or from other materials and processes that provide adequately sturdy and long-lasting equipment as are well known those of ordinary skill in the art.

In the ball basket with actively extendable legs 2100 shown in FIG. 21, linear actuators 2102 may be used to set and maintain extension of the telescoping legs 2006. A scoop sensor 2108, such as a camera, one-dimensional LIDAR, a contact sensor, a pressure sensor, a button, etc., may determine when a scoop is seated within the slots 2004, which may trigger a retraction of the linear actuators 2102, allowing easy transportation of the ball basket with actively extendable legs 2100 by the robot. Other possible configurations and operations may be readily apprehended by one of ordinary skill in the art, including additional sensors and algorithms to control the behavior of the ball basket with actively extendable legs 2100 during different states of gameplay, practice, court cleanup and arrangement, etc. A battery 2104 may be provided to power the linear actuators 2102 and control components of the ball basket with actively extendable legs 2100. A charge connector 2110 may be provided to recharge this battery 2104.

A controller 2106 may be provided to control the linear actuators 2102. In one embodiment, the controller 2106 may comprise some or all of the features of the robotic control system 2500 previously illustrated and may communicate wirelessly with a robot, a mobile device, or other computing device. When the robot's scoop is not present (such as after the ball basket is placed on the ground) then the linear actuators automatically extend so that the ball basket is at a height where it may be easily reached by players.

In one embodiment, the ball basket with actively extendable legs 2100 and robot may be connected via a wireless protocol such as Bluetooth so that the robot may send commands to the ball basket to raise or lower on demand. This may be useful in situations where the robot cannot reach high enough to drop balls into the ball basket. In such a circumstance the robot may approach the ball basket, send a wireless command for the ball basket to lower itself, drop balls into the ball basket, and send a wireless command for the ball basket to raise itself.

In one embodiment, the controller 2106 for the ball basket with actively extendable legs 2100 may further include sensors and control logic capable of recognizing radio frequency identification (RFID) tagging or other similar configurations used to individually mark specific balls or pieces of equipment. For example, a camera may be placed allowing recognition of different colors of tennis balls or other collected objects, or specific branding logos or other identifying marks. In this manner, the ball basket with actively extendable legs 2100 may support the ball collection robot 600 to accurately sort and store equipment based on this data.

The active extension is shown here with telescoping legs, but other ways of extending and retracting these legs, such as folding the leg ends up toward or down away from the ball storage area, folding the legs in a concertina action, etc., may be readily apprehended by one of ordinary skill in the art, and may be powered by actuators other than the simple linear actuators 2102 shown.

Figure 22C:
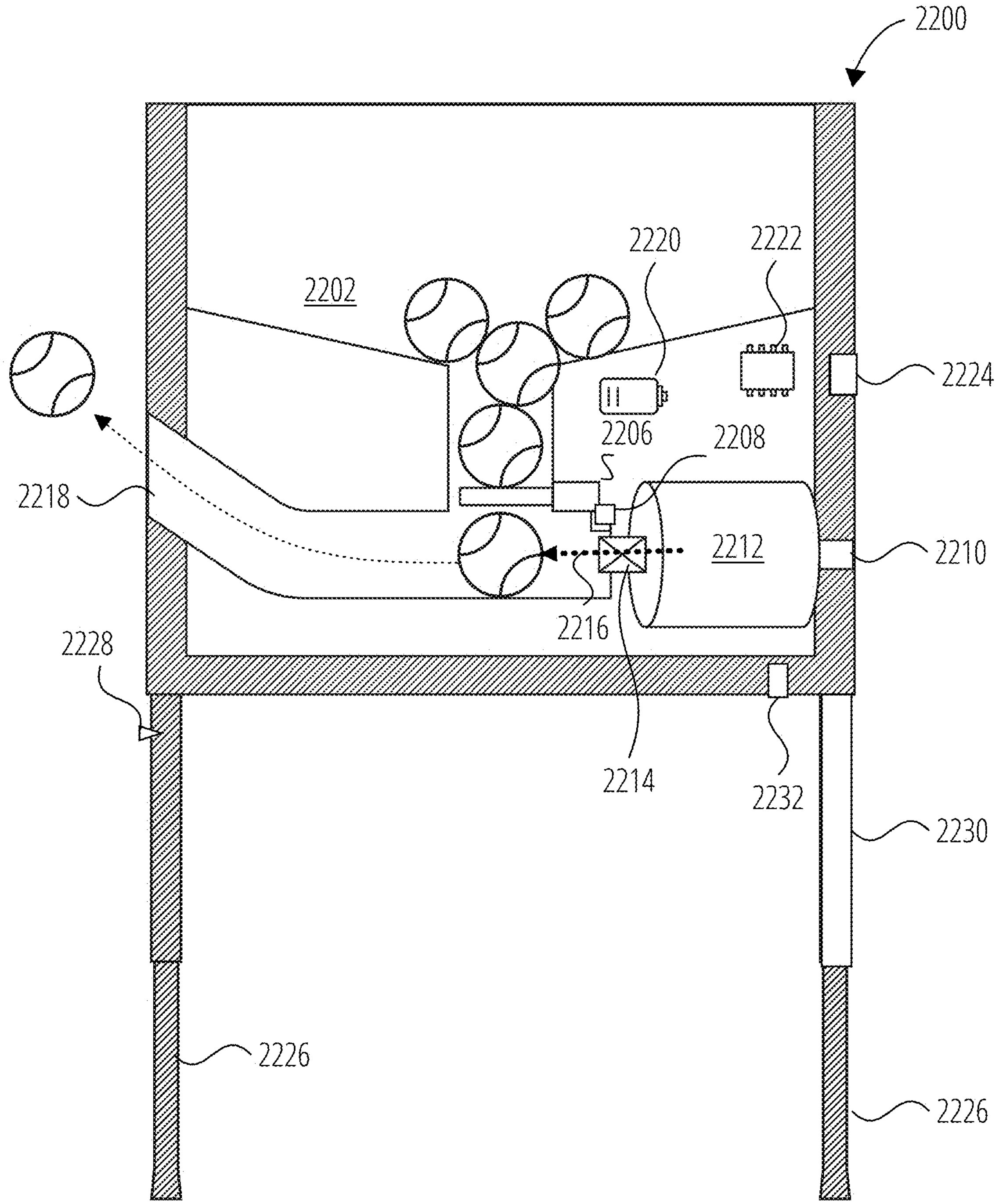

FIG. 22A-FIG. 22C illustrate a ball launcher 2200 in accordance with various embodiments. In one embodiment, the ball launcher 2200 may comprise ball storage 2202, one or more slots 2204, a linear actuator 2206, a ball sensor 2208, a compressor 2210, an air tank 2212, a valve 2214, an outlet 2218, a battery 2220, a controller 2222, and a charge connector 2224, as shown in FIG. 22A and FIG. 22B. In another embodiment, the ball launcher 2200 may comprise telescoping legs 2226, one or more leg locks 2228, one or more linear actuators 2230, and a scoop sensor 2232, as shown in FIG. 22C.

Similar to the ball baskets described with respect to FIG. 18A-FIG. 21, the ball launcher may be designed with one or more slots 2204, as shown, and/or legs as shown in FIG. 22C, configured in such a way so that there is space for a robot's scoop to fit under the ball launcher. In this manner, the robot may be able to pick up the ball launcher 2200 and carry it, as shown in FIG. 22B.

An alternative to having the robot drop balls it picks up into a ball basket may be to have it drop balls into a ball launcher 2200. The ball launcher 2200 may have ball storage 2202 at the top, and may also have a ball launching mechanism able to launch balls on demand toward players whenever needed. This mechanism may involve pistons, linear actuators, or, as illustrated, compressed air. The linear actuator 2206 may open to allow a ball to drop out from ball storage 2202 to an area accessible to an outlet 2218. An air tank 2212 may be filled with pressurized air 2216 using a compressor 2210. A valve 2214 may prevent air 2216 from escaping until desired.

When the ball sensor 2208 detects a ball is in an appropriate position, the valve 2214 may be opened, and a burst of pressurized air 2216 may impel a ball out of the outlet 2218.

Figure 25:
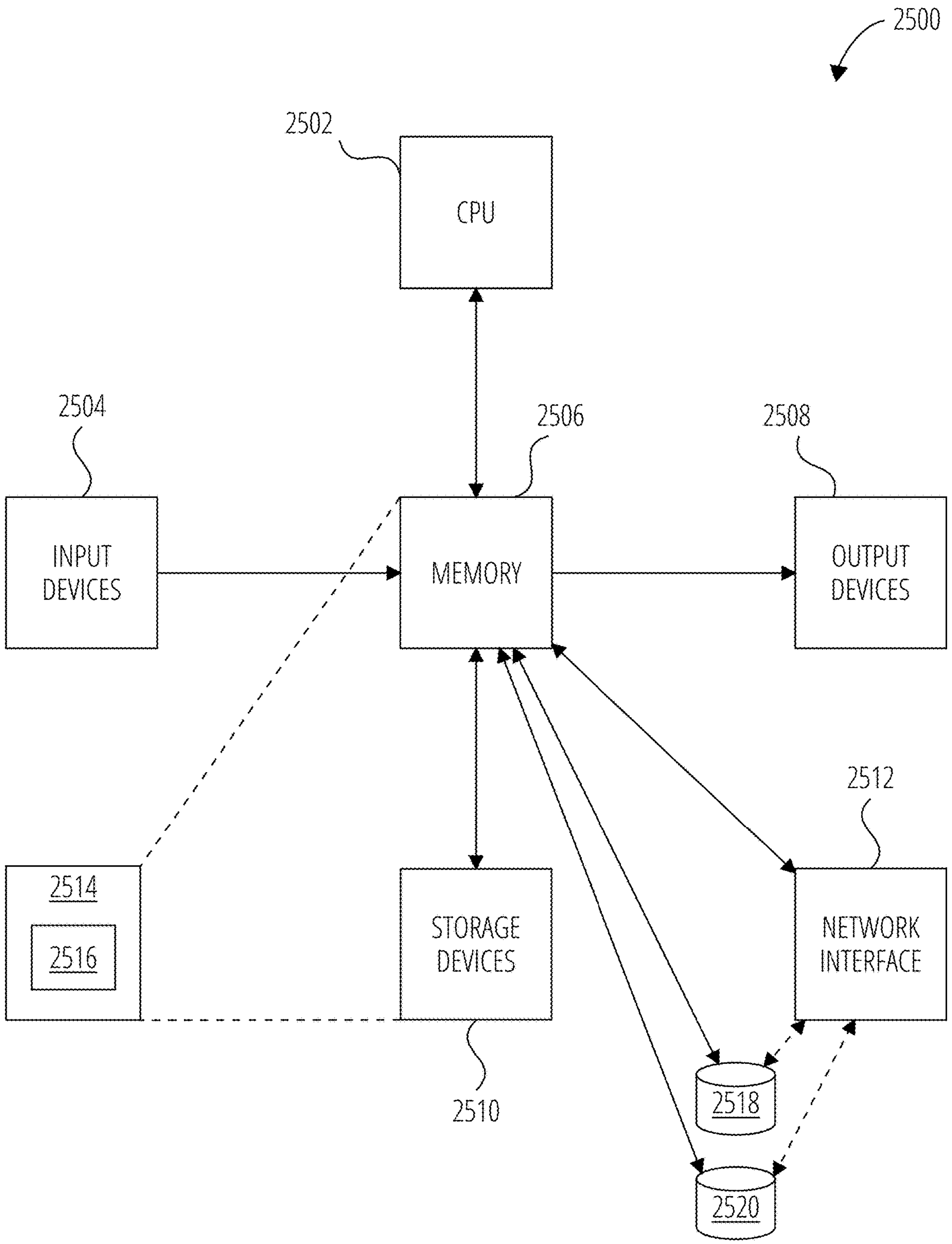
FIG. 25 illustrates an embodiment of a robotic control system 2500 to implement components and process steps of the system described herein.

These components may be controlled by a controller 2222, which may include some or all of the components of the robotic control system 2500 illustrated with respect to FIG. 25. In this manner, the ball launcher 2200 may be configured to communicate wirelessly with the robot, a mobile device, or other computing device. The electronic elements of the ball launcher 2200 may be powered by the battery 2220, which may be recharged through the charge connector 2224.

In one embodiment, the controller 2222 may further include sensors and control logic capable of recognizing radio frequency identification (RFID) tagging or other similar configurations used to individually mark specific balls or pieces of equipment. For example, a camera may be placed allowing recognition of different colors of tennis balls or other collected objects, or specific branding logos or other identifying marks. In this manner, the ball launcher 2200 may support the ball collection robot 600 to accurately sort and store equipment based on this data.

In some variations, as shown in FIG. 22C, the ball launcher 2200 may also have telescoping legs 2226 so that it may raise and lower itself, as described for the ball basket with passively extendable legs 2000 and the ball basket with actively extendable legs 2100. All telescoping legs 2226 may be passive and held in place when retracted with leg locks 2228, all legs may have linear actuators 2230 to extend and retract them automatically based on a user command or detection of a scoop 110 beneath the ball launcher 2200 and between the legs by a scoop sensor 2232. A subset or one of the legs may be actuated while the others are passive and locked with passive or actuated leg locks 2228. Since the ball launcher has storage at the top, it may also allow players to manually grab balls from the storage area as needed.

FIG. 23A-FIG. 23K illustrate a user interface 2300 in accordance with one embodiment. The views shown for this user interface 2300 are exemplary and are not intended to limit the scope of the disclosed solution. It will be readily apprehended by one of ordinary skill in the art that other features may be included, features may be removed, and feature arrangement may differ, without detracting from the ability of a user to interact with and implement the disclosed solution. The user interface 2300 may in one embodiment be provided as a downloaded application on a mobile device or other computing device. Some or all of the data used in operation of the user interface 2300 may be hosted in cloud storage. These computation components may operate as described with respect to the analogous elements of the robotic control system 2500 described above.

A user may employ this user interface 2300 to create routines for the ball collection robot 600 to follow, to manually request that the ball collection robot 600 transition through the ball collection robot operating states 1100 described with respect to FIG. 11, and perform other configuration actions as will be readily apprehended by one of ordinary skill in the art.

FIG. 23A shows a screen that may be displayed while the ball collection robot 600 is in the charging mode/sleep mode 1102 state. A charge status 2302 may show how much charge the robot's battery currently holds. An initialization control 2304 may be provided to wake up the robot and transition it to the initialization mode 1104 state. A state status 2306 may be displayed.

While the ball collection robot 600 is performing actions in its initialization mode 1104 state, a display such as that shown in FIG. 23B may be shown. A mapping status 2308 may be displayed when the robot is mapping its environment. A spinner or progress indicator 2310 may provide a visual indicator that an operation is currently in progress, and in some embodiments, may provide cues indicating how much progress has been made, how much time is remaining, etc., as will be readily understood by one of ordinary skill in the art.

Figure 23D:
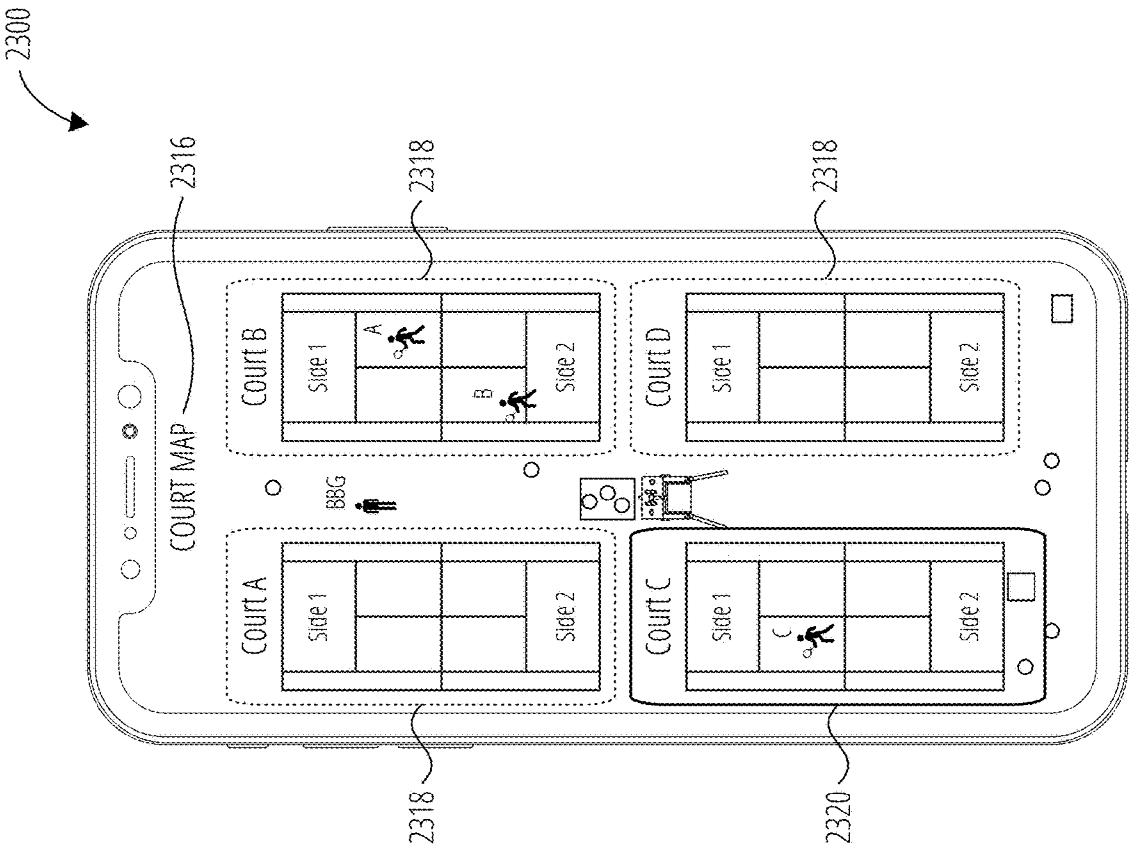
Figure 23C:
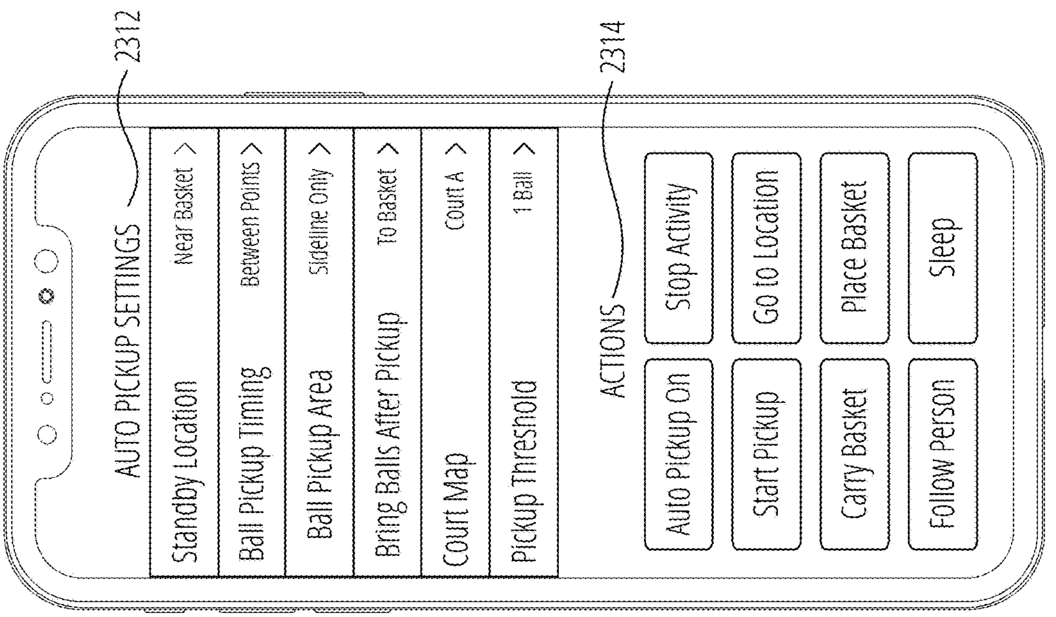

FIG. 23C displays a screen with auto-pickup setting controls 2312 and action control 2314 that may allow the user to configure the ball collection robot 600 to operate automatically, and may set parameters for automatic operation. As part of defining these parameters, the option to display a court map such as is illustrated in FIG. 23D may be provided. Controls may be provided to command the ball collection robot 600 to enter the various states illustrated in FIG. 11.

Auto-pickup setting controls 2312 may include controls that display the present settings and provide access to menus to change settings. Settings may include a standby location (see FIG. 23F), ball pickup timing (FIG. 23E), a ball pickup area (FIG. 23G), a location to bring balls after pickup (FIG. 23H), selectable court maps (FIG. 23D), and a pickup threshold.

Action controls 2314 may include an Auto Pickup On/Off control that allows a user to instruct the robot to automatically pickup balls or other equipment when certain conditions are met. A Stop Activity control may allow a user to stop all of the robot's current activities, including disabling auto pickup. A Start Pickup Balls control may allow a user to request the robot to immediately enter a pick up balls state. A Go To Location control may allow a user to instruct the robot to go to a specified location and wait there (see FIG. 23J). If the location is the charging dock, the robot may dock and charge. In one embodiment, an option may include a request to carry a basket to the specified location. A Carry Basket control may allow a user to instruct the robot to locate and pick up a ball basket. A Place Basket control may allow the user to instruct the robot to set a carried basket down on the ground at the robot's current location. A Follow Person control may allow a user to instruct the robot to follow a person as they move (see FIG. 23I). The robot may stay a short distance away from the person (e.g. 1 to 2 meters or 3 to 6 feet). In one embodiment, this control may provide an optional request for the robot to carry a basket as it follows the person. This may allow the robot to help a player bring balls out to the tennis court from a storage area. A Sleep control may allow a user to put the robot into a low power mode.

The court map 2316 displayed in FIG. 23D may be determined based on previous mappings performed by the ball collection robot 600 and/or may be pre-configurable and configurable within the user interface 2300. The court map may include a predetermined or detected surrounding area, court bounds for one or more playing courts such as Courts A, B, C, and D illustrated. Court selection controls 2318 may be provided allowing a user to select a particular detected court for operation. A court selection indicator 2320 may provide visual cues as to which court is currently selected.

In addition to court bounds and surrounding areas, obstacles, objects for pickup, post pickup locations, predetermined standby locations, and charging stations may also be mapped and displayed in the court map 2316. General locations for known or detected personnel may be displayed, and personnel may be recognized and marked with a preconfigured designator, or may be generically marked as indicated using, for example, "A," "B," and "C" for players and "BBG" for ball boys and ball girls. In one embodiment, all personnel detected may be marked uniquely for case of reference regardless of which court is currently selected for operation. In one embodiment, players and personnel within the currently-selected court and no others may be tagged for interaction, or players may be tagged by court rather than using completely unique tags.

The court map 2316 may also display other robots, ball baskets ball launchers designated equipment cabinets, equipment sheds, and all other information for static and mobile objects contained in the maps generated by, provided to, and used by the ball collection robot 600 to perform the operations disclosed herein.

Figure 23F:
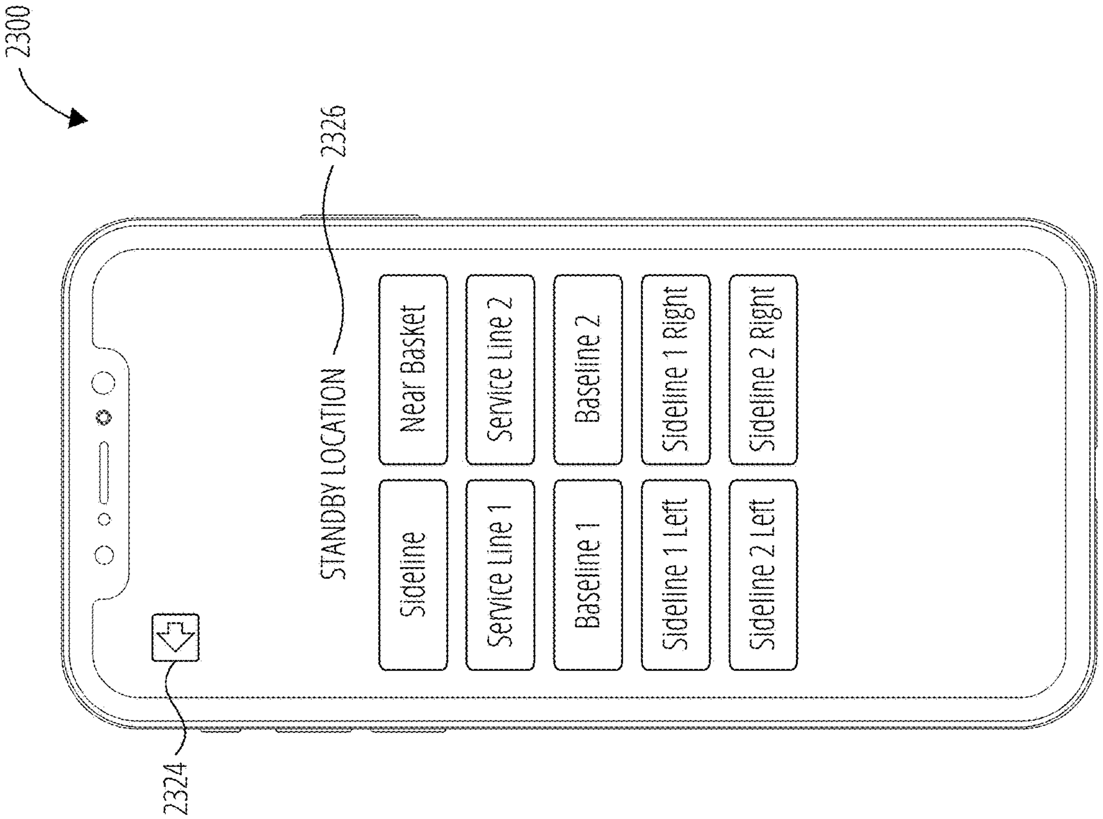
Figure 23E:
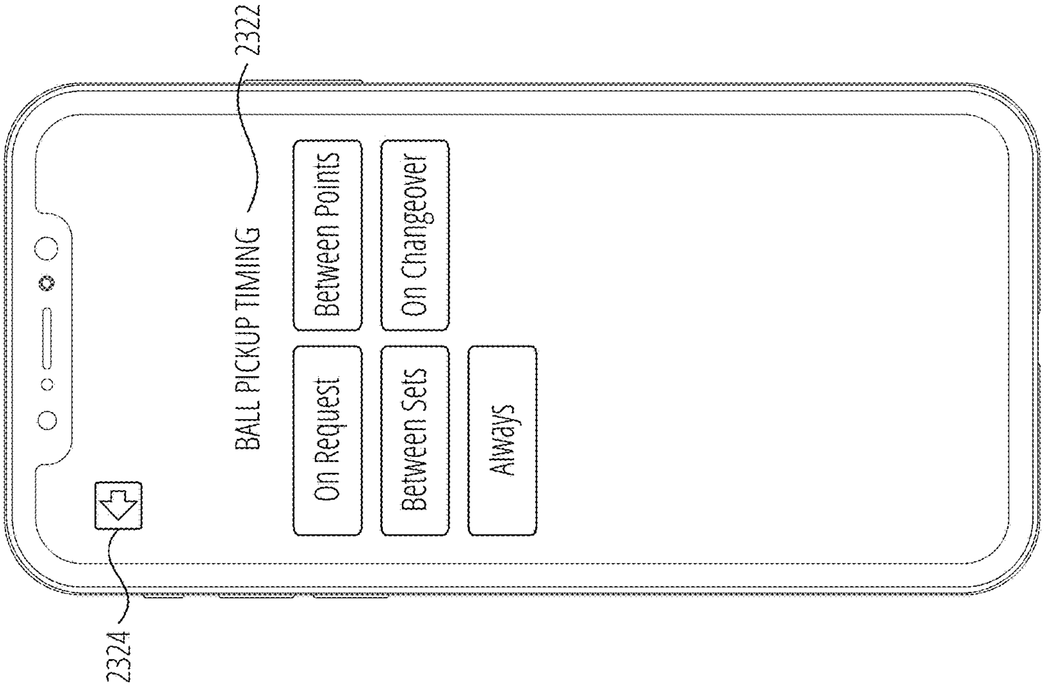

FIG. 23E provides ball pickup timing setting controls 2322 that may allow a user to determine the timing conditions under which the ball collection robot 600 may enter the pick up ball mode 1110 state. For example, as illustrated, the ball collection robot 600 may be set to perform pickup when manually requested, to pick up during intervals determined by the rules of gameplay, or to be in a mode to constantly detect and pick up balls from the ground. In one embodiment, the user interface 2300 may additionally include time-based rules, such as, "Perform pickup at 10 pm", when, for instance, a community court might be closed to play. A back button 2324 may allow the user to return to a previous screen, such as the settings and controls illustrated in FIG. 23C.

FIG. 23F shows standby location controls 2326 that a user may use to set the standby location the ball collection robot 600 navigates to when it enters its go to standby location mode 1114 state. These options may be preconfigured based on features common to all courts, that are then detected by the robot as part of its navigation, such as sideline and service lines. The standby location controls 2326 may include options for other known features of the environment, such as ball baskets. Alternatively, these locations may be points indicated on the court map of FIG. 23D and named by the user while using a setup mode of the user interface 2300. A back button 2324 may allow the user to return to a previous screen, such as the settings and controls illustrated in FIG. 23C.

Figure 23H:
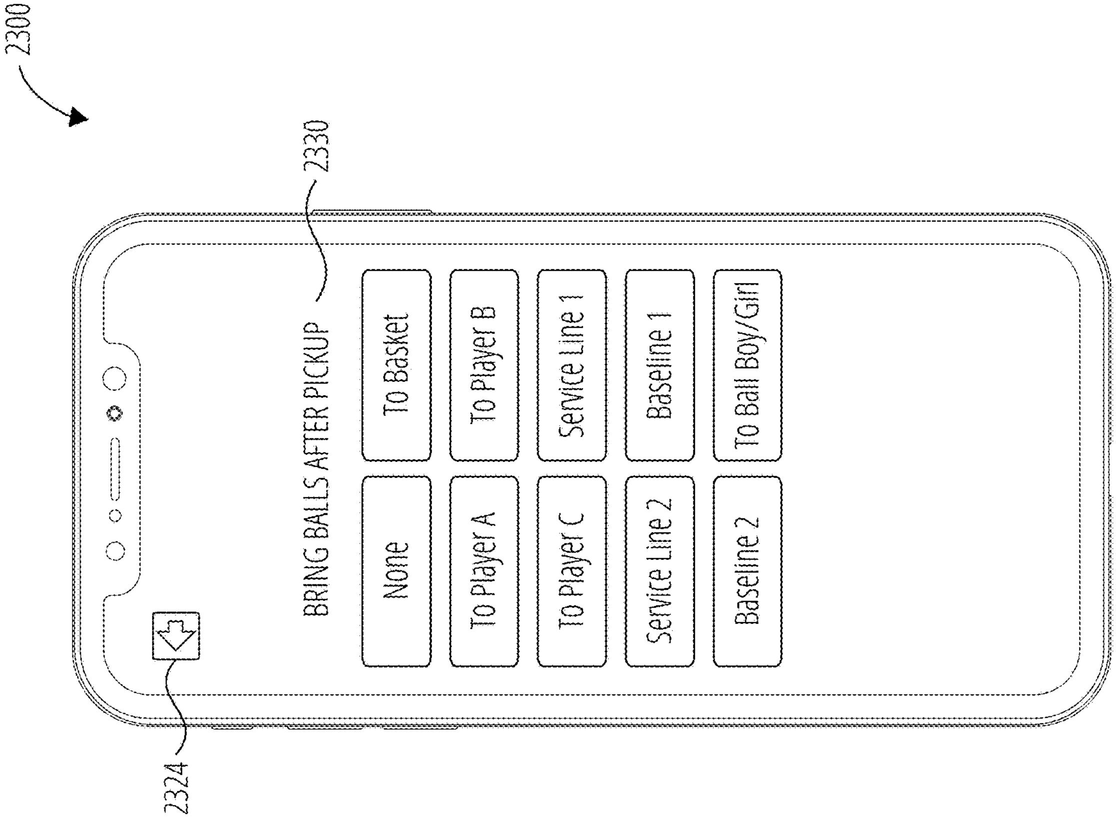
Figure 23G:
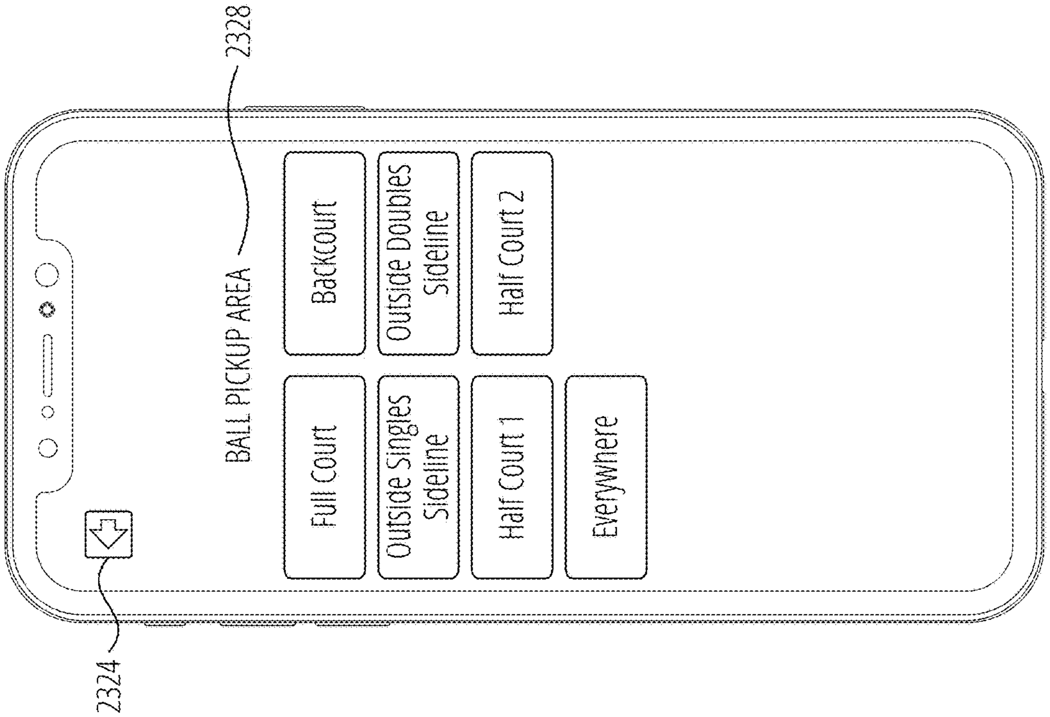

FIG. 23G illustrates ball pickup area rules controls 2328 that may allow a user to instruct the ball collection robot 600 on where is is expected to operate during its pick up ball mode 1110 state. Similar to the standby locations of FIG. 23F, these may be common areas understood based on configured parameters of a particular game, or locations determined and named by a user during setup. A back button 2324 may allow the user to return to a previous screen, such as the settings and controls illustrated in FIG. 23C.

FIG. 23H shows post pickup location controls 2330 for where the ball collection robot 600 may be instructed to take what it has picked up once it exits the pick up ball mode 1110 state and enters the post pickup mode 1112 state. The post pickup location may be "none" where it is desired that the ball collection robot 600 remain in place without motion once it is full or there are no more balls to retrieve. The post pickup location may be a basket, in which case the ball collection robot 600 may operate to deposit the balls it is carrying into that basket. The post pickup location may be a person, in which case, the ball collection robot 600 may be configured to automatically raise the scoop such that balls may be easily withdrawn by the person. In one embodiment, the ball collection robot 600 may be programmed to follow that person until commanded to no longer do so. Locations such as baskets, service lines, and other static and mobile landmarks, may be preconfigured, detectable by the robot, and/or determined during a set up operation by the user. A back button 2324 may allow the user to return to a previous screen, such as the settings and controls illustrated in FIG. 23C.

Figure 23J:
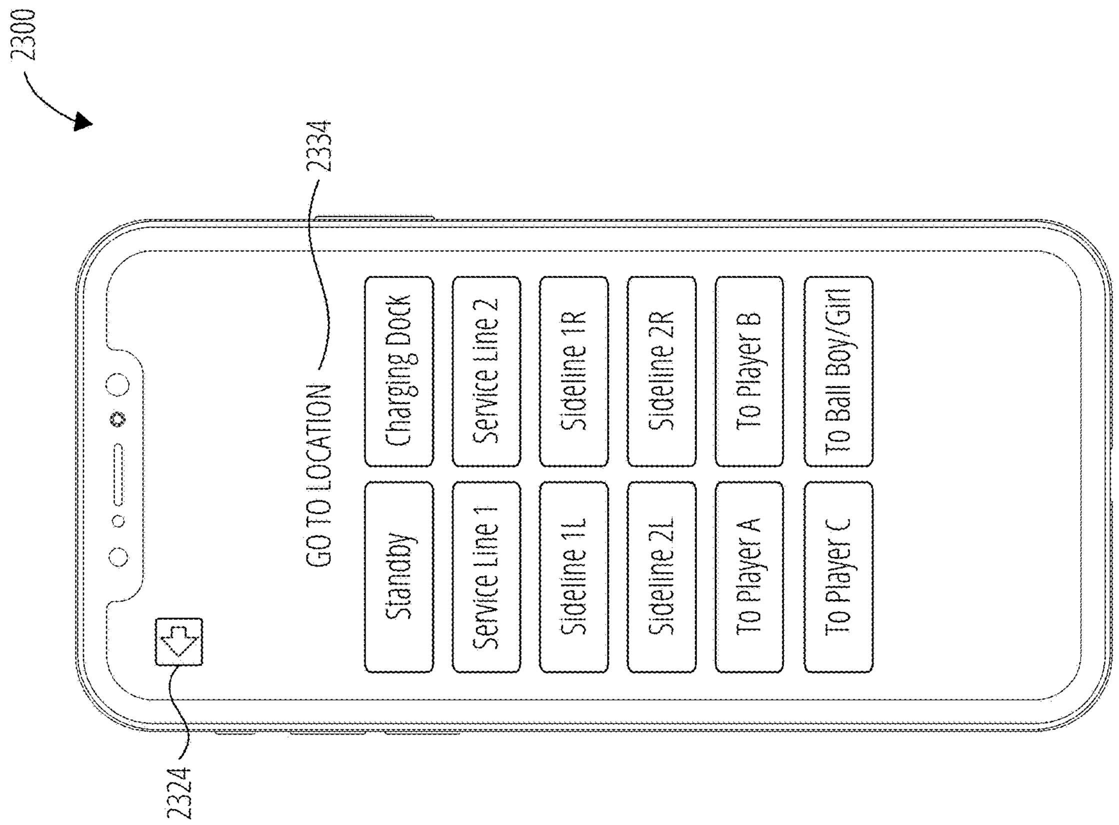
Figure 23I:
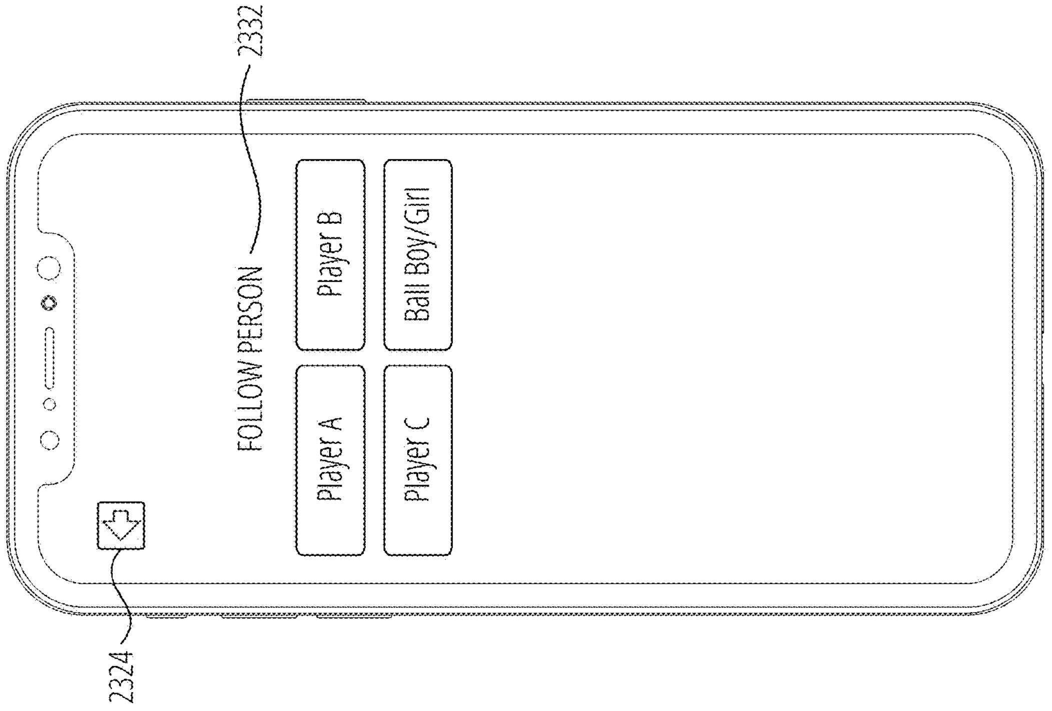

FIG. 23I shows follow person control 2332 that a user may select when commanding the ball collection robot 600 to enter its follow person mode 1116 state. Options may include players or other personnel detected during mapping or exploration or the ball girl or ball boy assisting in ball collection. Selecting a player may in one embodiment instruct the robot to follow a particular individual throughout the game, or to follow whomever is playing on a particular side of the court, either of which may be observed or detected by the robot, or indicated based on data shown in the court map of FIG. 23D. In one embodiment, additional controls may allow a user to instruct the ball collection robot 600 to note which player is currently serving, and to follow that player until service changes, at which time the robot may automatically follow the other player without additional manual intervention. A back button 2324 may allow the user to return to a previous screen, such as the settings and controls illustrated in FIG. 23C.

Similar to the options shown for standby location in FIG. 23F, FIG. 23J illustrates a set of go to location controls 2334 through which the ball collection robot 600 may be commanded to navigate to a desired location when it enters its go to location mode 1108 state. Locations may include players, landmarks associated with gameplay, known areas of the environment, the standby location determined using FIG. 23F, or the charging station. Other locations may readily suggest themselves to one of ordinary skill in the art. A back button 2324 may allow the user to return to a previous screen, such as the settings and controls illustrated in FIG. 23C.

Figure 23K:
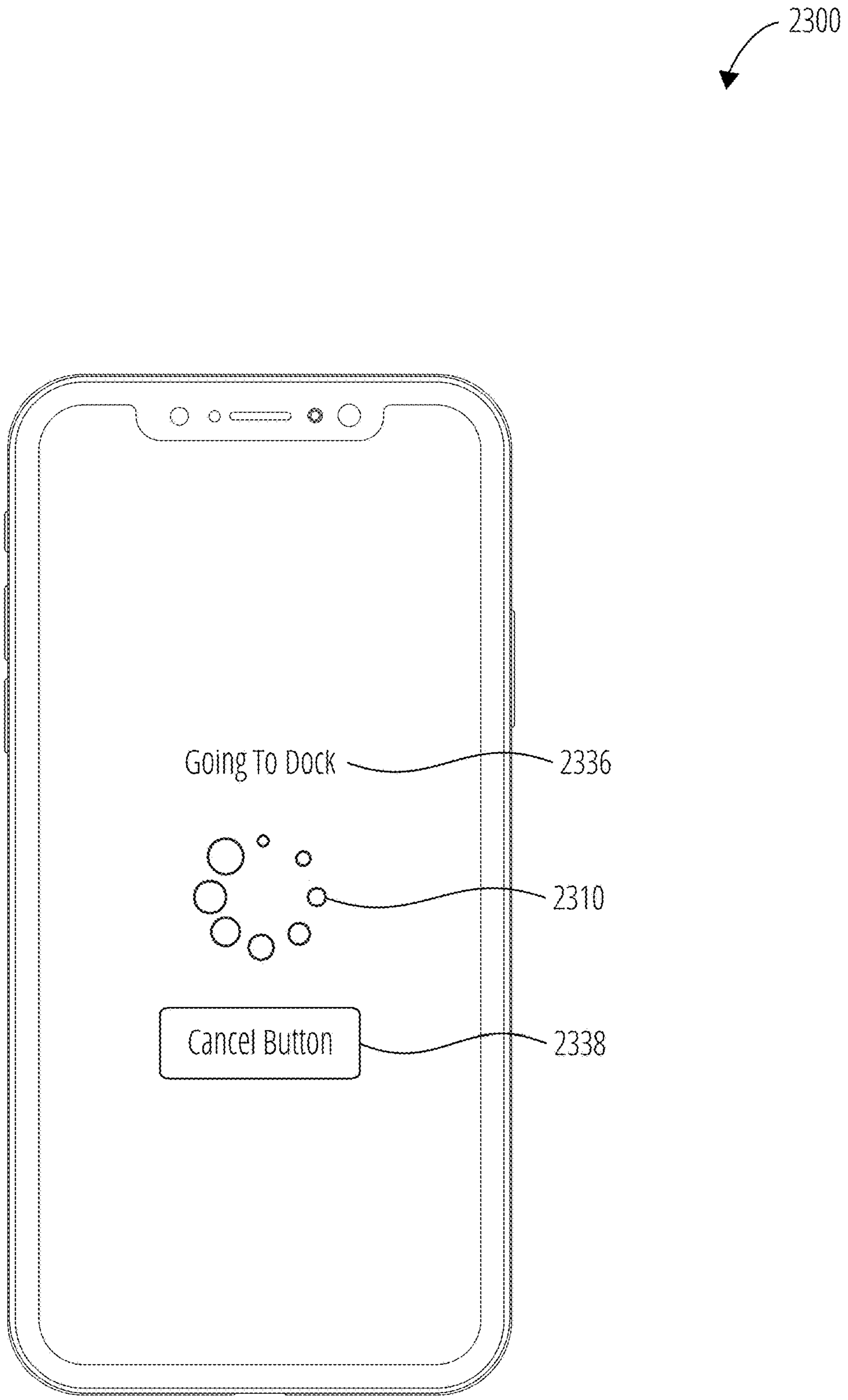

FIG. 23K shows a go to status 2336 such as a user might see after instructing the ball collection robot 600 to go to a location such as its docking station. As the robot navigates to that location, this screen may be shown, indicating the location instructed, such as the charging dock, a spinner or progress indicator 2310 indicating that the robot is working to complete the go to operation, and in some embodiments, how far the robot has progressed toward its location, and a cancel button 2338 that may allow the user to cancel the go to command.

In one embodiment, this screen may be shown when the robot has detected a low power state and is automatically returning to its charging dock. In one embodiment, a low-power, go to dock operation may not be cancelled, and the cancel button 2338 may be omitted from the screen. This screen may then be replaced with the screen of FIG. 23A when the ball collection robot 600 has docked for charging and entered the charging mode/sleep mode 1102 state. It will readily be understood that the ball collection robot 600 may dock to charge without entering the sleep mode state, or may enter the sleep mode state without docking, but that it is often desired that the charging mode/sleep mode 1102 state both be entered during charging, while a sleep mode may allow the ball collection robot 600 to conserve energy away from its charging or base station.

The controls, settings, and options illustrated in FIG. 23A-FIG. 23K and described above are provided for exemplary purposes. These illustrations are not intended to limit the features of the user interface 2300 disclosed. Additional and alternative features will readily suggest themselves to one of one of ordinary skill in the art for the purpose of supporting user interaction with the ball collection robot.

FIG. 24A-FIG. 24C illustrate gesture controls 2400 in accordance with one embodiment. The ball collection robot 600 may be capable of detecting and interpreting gaze and gesture of people in its environment using its sensing system 106. In this manner, it may be triggered to perform certain operations based on gestured cues when a steady gaze at the ball collection robot 600 is detected. In one embodiment, a vocal command may direct the robot's attention to the person, and aversion of gaze may signal that the robot is to begin operating based on the command given.

FIG. 24A shows a user 2402 with gaze 2404 directed toward the robot making a 2406. The user 2402 may gesture with their racquet from pointing at the robot to pointing to the ground at their own feet. This may signal the ball collection robot 600 to go to that person. It may be readily apprehended that a player being followed might command the ball collection robot 600 to follow another player by pointing at the robot, then moving the racquet toward that player. Other similar configurations will readily suggest themselves to one of ordinary skill in the art. The ball collection robot 600 may recognize such a gesture made with a golf club, a baseball bat, or a person's hand, in addition to a gesture made with a racquet as shown.

FIG. 24B illustrates a player making a rotating gesture pointing at the robot 2408 using their racquet (bat, club, hand, etc.). Such a motion might indicate to the robot that it is to begin picking up balls in its environment.

FIG. 24C shows an example in which a person makes a gesture from the user to the robot 2410 by pointing their racquet at their feet, then lifting it to point at the ball collection robot 600. Such a gesture may indicate a command to standby at its current location, or to navigate to its standby location. The gestures and commands illustrated and described herein are provided for exemplary purposes, and are not intended to limit the scope of communication between a user 2402 and the ball collection robot 600 using gesture controls 2400.

FIG. 25 depicts an embodiment of a robotic control system 2500 to implement components and process steps of the systems described herein. Some or all portions of the robotic control system 2500 and its operational logic may be contained within the physical components of a robot and/or within a cloud server in communication with the robot and/or within the physical components of a user's mobile computing device, such as a smartphone, tablet, laptop, personal digital assistant, or other such mobile computing devices. In one embodiment, aspects of the robotic control system 2500 on a cloud server and/or user's mobile computing device may control more than one robot at a time, allowing multiple robots to work in concert within a working space.

Input devices 2504 (e.g., of a robot or companion device such as a mobile phone or personal computer) comprise transducers that convert physical phenomena into machine internal signals, typically electrical, optical, or magnetic signals. Signals may also be wireless in the form of electromagnetic radiation in the radio frequency (RF) range but also potentially in the infrared or optical range. Examples of input devices 2504 are contact sensors which respond to touch or physical pressure from an object or proximity of an object to a surface, mice which respond to motion through space or across a plane, microphones which convert vibrations in the medium (typically air) into device signals, scanners which convert optical patterns on two or three-dimensional objects into device signals. The signals from the input devices 2504 are provided via various machine signal conductors (e.g., busses or network interfaces) and circuits to memory 2506.

The memory 2506 is typically what is known as a first- or second-level memory device, providing for storage (via configuration of matter or states of matter) of signals received from the input devices 2504, instructions and information for controlling operation of the central processing unit or CPU 2502, and signals from storage devices 2510. The memory 2506 and/or the storage devices 2510 may store computer-executable instructions and thus forming logic 2514 that when applied to and executed by the CPU 2502 implement embodiments of the processes disclosed herein. Logic 2514 may include portions of a computer program, along with configuration data, that are run by the CPU 2502 or another processor. Logic 2514 may include one or more machine learning models 2516 used to perform the disclosed actions. In one embodiment, portions of the logic 2514 may also reside on a mobile or desktop computing device accessible by a user to facilitate direct user control of the robot.

Information stored in the memory 2506 is typically directly accessible to the CPU 2502 of the device. Signals input to the device cause the reconfiguration of the internal material/energy state of the memory 2506, creating in essence a new machine configuration, influencing the behavior of the robotic control system 2500 by configuring the CPU 2502 with control signals (instructions) and data provided in conjunction with the control signals.

Second- or third-level storage devices 2510 may provide a slower but higher capacity machine memory capability. Examples of storage devices 2510 are hard disks, optical disks, large-capacity flash memories or other non-volatile memory technologies, and magnetic memories.

In one embodiment, memory 2506 may include virtual storage accessible through a connection with a cloud server using the network interface 2512, as described below. In such embodiments, some or all of the logic 2514 may be stored and processed remotely.

The CPU 2502 may cause the configuration of the memory 2506 to be altered by signals in storage devices 2510. In other words, the CPU 2502 may cause data and instructions to be read from storage devices 2510 in the memory 2506 which may then influence the operations of CPU 2502 as instructions and data signals, and which may also be provided to the output devices 2508. The CPU 2502 may alter the content of the memory 2506 by signaling to a machine interface of memory 2506 to alter the internal configuration and then converted signals to the storage devices 2510 alter its material internal configuration. In other words, data and instructions may be backed up from memory 2506, which is often volatile, to storage devices 2510, which are often non-volatile.

Output devices 2508 are transducers that convert signals received from the memory 2506 into physical phenomena such as vibrations in the air, patterns of light on a machine display, vibrations (i.e., haptic devices), or patterns of ink or other materials (i.e., printers and 3-D printers).

The network interface 2512 receives signals from the memory 2506 and converts them into electrical, optical, or wireless signals to other machines, typically via a machine network. The network interface 2512 also receives signals from the machine network and converts them into electrical, optical, or wireless signals to the memory 2506. The network interface 2512 may allow a robot to communicate with a cloud server, a mobile device, other robots, and other network-enabled devices.

In one embodiment, a global database 2518 may provide data storage available across the devices that comprise or are supported by the robotic control system 2500. The global database 2518 may include maps, robotic instruction algorithms, robot state information, static, movable, and tidyable object reidentification fingerprints, labels, and other data associated with known static, movable, and tidyable object reidentification fingerprints, or other data supporting the implementation of the disclosed solution. The term "Tidyable object" in this disclosure refers to elements of the scene that may be moved by the robot and put away in a home location. These objects may be of a type and size such that the robot may autonomously put them away, such as toys, clothing, books, stuffed animals, soccer balls, garbage, remote controls, keys, cellphones, etc. The global database 2518 may be a single data structure or may be distributed across more than one data structure and storage platform, as may best suit an implementation of the disclosed solution. In one embodiment, the global database 2518 is coupled to other components of the robotic control system 2500 through a wired or wireless network, and in communication with the network interface 2512.

In one embodiment, a robot instruction database 2520 may provide data storage available across the devices that comprise or are supported by the robotic control system 2500. The robot instruction database 2520 may include the programmatic routines that direct specific actuators of the ball collection robot, such as are described with respect to FIG. 1A-FIG. 8, to actuate and cease actuation in sequences that allow the ball collection robot to perform individual and aggregate motions to complete tasks.

Figure 26:
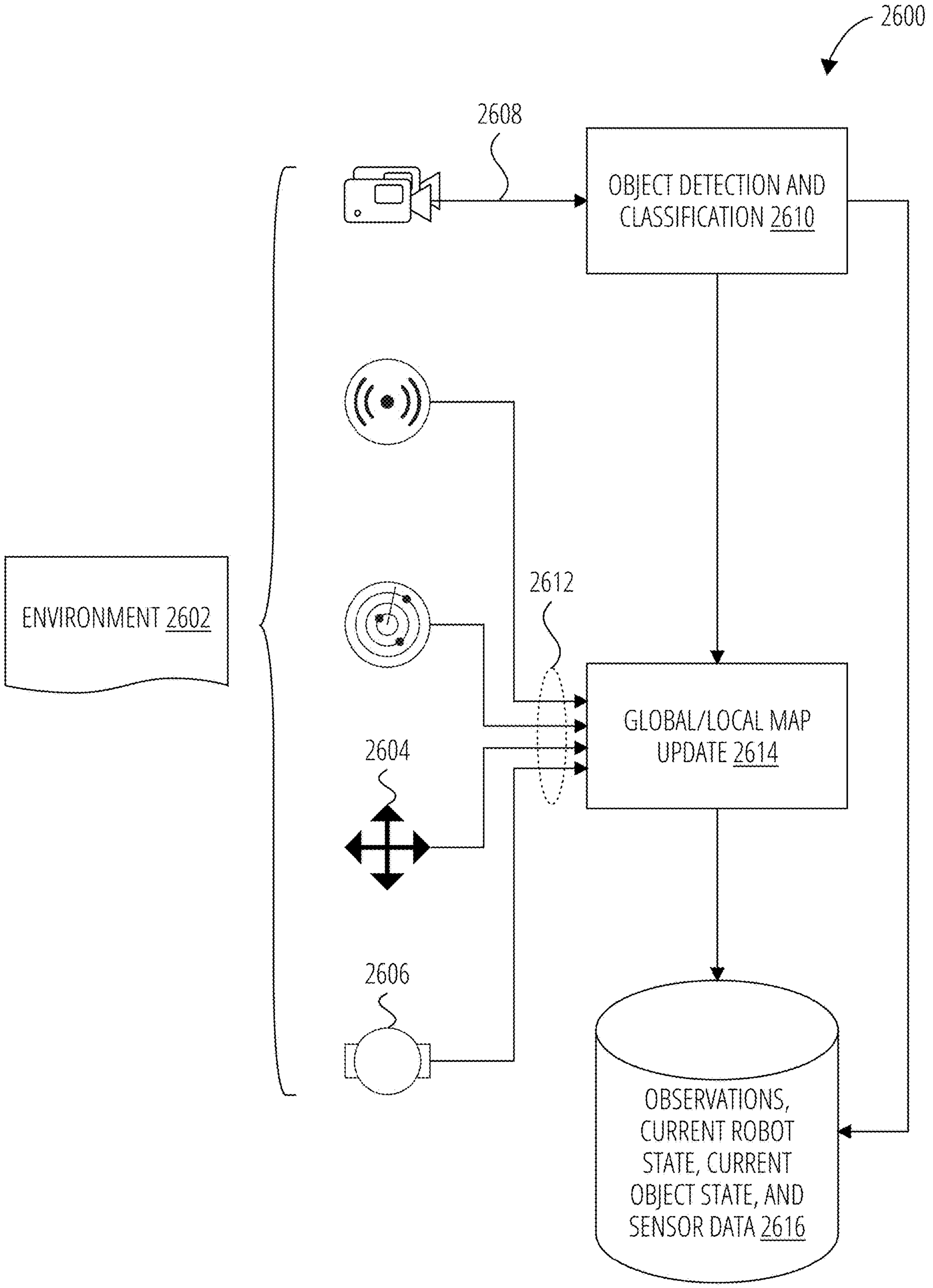
FIG. 26 illustrates sensor input analysis 2600 in accordance with one embodiment.

FIG. 26 illustrates sensor input analysis 2600 in accordance with one embodiment. Sensor input analysis 2600 may inform the robot of the dimensions of its immediate environment 2602 and the location of itself and other objects within that environment 2602.

The robot as previously described includes a sensing system 106. This sensing system 106 may include at least one of cameras 124, IMU sensors 132, lidar sensor 130, odometry 2604, and actuator force feedback sensor 2606. These sensors may capture data describing the environment 2602 around the robot 100.

Image data 2608 from the cameras 124 may be used for object detection and classification 2610. Object detection and classification 2610 may be performed by algorithms and models configured within the robotic control system 2500 of the robot 100. In this manner, the characteristics and types of objects in the environment 2602 may be determined.

Image data 2608, object detection and classification 2610 data, and other sensor data 2612 may be used for a global/local map update 2614. The global and/or local map may be stored by the robot 100 and may represent its knowledge of the dimensions and objects within its decluttering environment 2602. This map may be used in navigation and strategy determination associated with decluttering tasks.

The robot may use a combination of camera 124, lidar sensor 130 and the other sensors to maintain a global or local area map of the environment and to localize itself within that. Additionally, the robot may perform object detection and object classification and may generate visual re-identification fingerprints for each object. The robot may utilize stereo cameras along with a machine learning/neural network software architecture (e.g., semi-supervised or supervised convolutional neural network) to efficiently classify the type, size and location of different objects on a map of the environment.

The robot may determine the relative distance and angle to each object. The distance and angle may then be used to localize objects on the global or local area map. The robot may utilize both forward and backward facing cameras to scan both to the front and to the rear of the robot.

Image data 2608, object detection and classification 2610 data, other sensor data 2612, and global/local map update 2614 data may be stored as observations, current robot state, current object state, and sensor data 2616. The observations, current robot state, current object state, and sensor data 2616 may be used by the robotic control system 2500 of the robot in determining navigation paths and task strategies.

Figure 27:
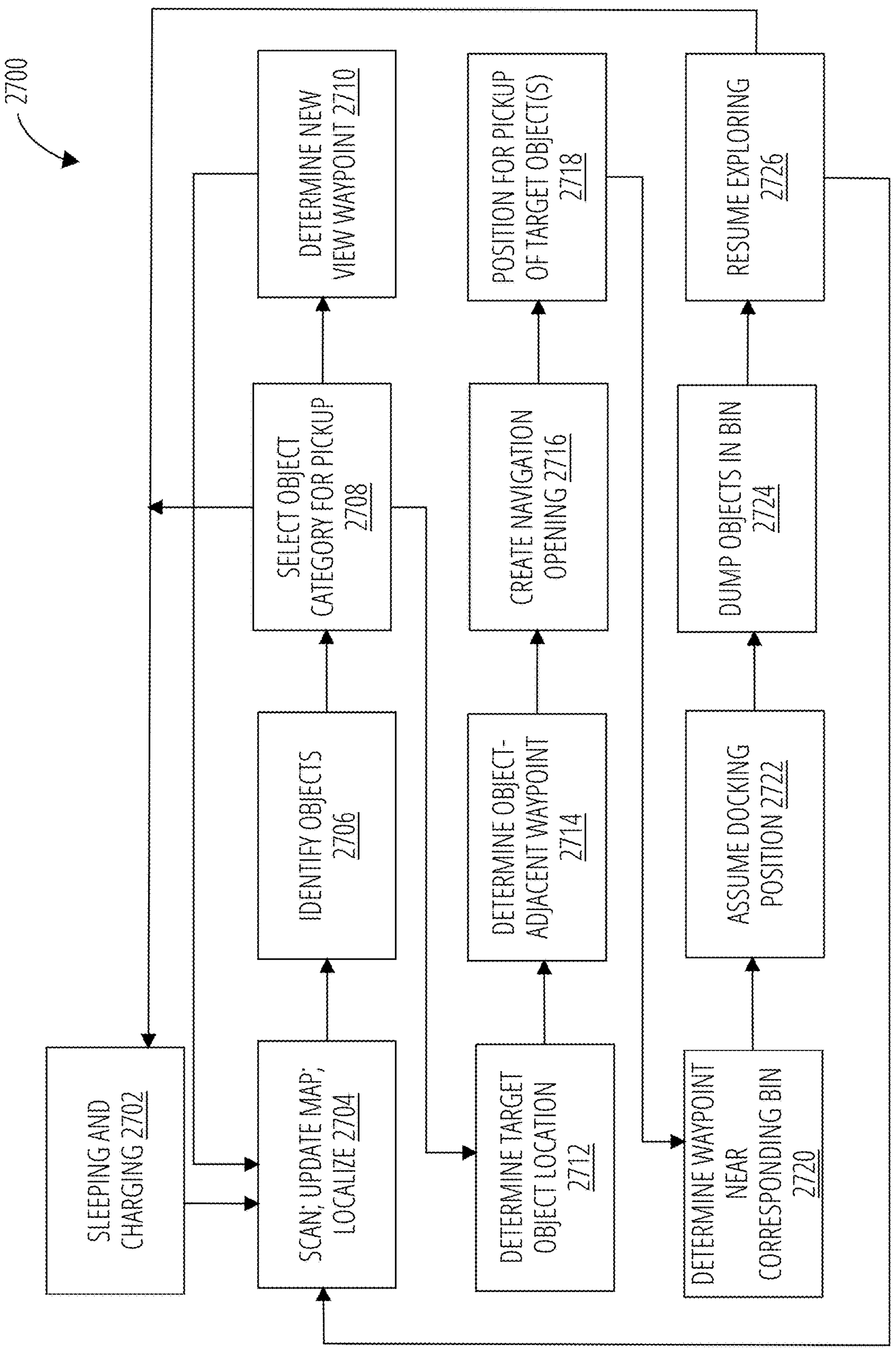
FIG. 27 depicts a robotic process 2700 in accordance with one embodiment.
Figure 28:
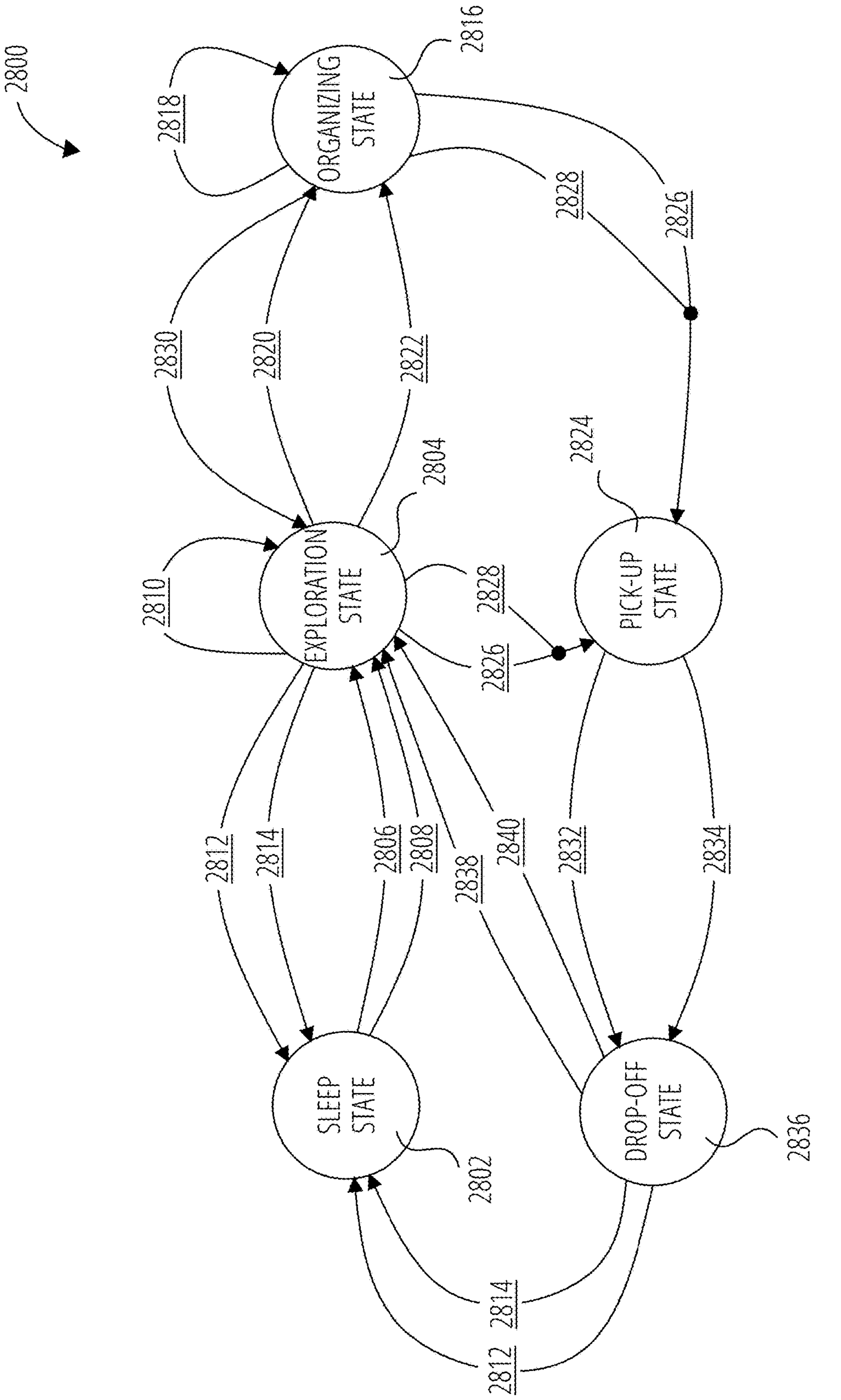
FIG. 28 depicts a state space map 2800 for a robotic system in accordance with one embodiment.

FIG. 27 depicts a robotic process 2700 in one embodiment, in which the robotic system sequences through an embodiment of a state space map 2800 as depicted in FIG. 28.

The sequence begins with the robot sleeping (sleep state 2802) and charging at the base station (block 2702). The robot is activated, e.g., on a schedule, and enters an exploration mode (environment exploration state 2804, activation action 2806, and schedule start time 2808). In the environment exploration state 2804, the robot scans the environment using cameras (and other sensors) to update its environmental map and localize its own position on the map (block 2704, explore for configured interval 2810). The robot may transition from the environment exploration state 2804 back to the sleep state 2802 on condition that there are no more objects to pick up 2812, or the battery is low 2814.

From the environment exploration state 2804, the robot may transition to the object organization state 2816, in which it operates to move the items on the floor to organize them by category 2818. This transition may be triggered by the robot determining that objects are too close together on the floor 2820, or determining that the path to one or more objects is obstructed 2822. If none of these triggering conditions is satisfied, the robot may transition from the environment exploration state 2804 directly to the object pick-up state 2824 on condition that the environment map comprises at least one drop-off container for a category of objects 2826, and there are unobstructed items for pickup in the category of the container 2828. Likewise the robot may transition from the object organization state 2816 to the object pick-up state 2824 under these latter conditions. The robot may transition back to the environment exploration state 2804 from the object organization state 2816 on condition that no objects are ready for pick-up 2830.

In the environment exploration state 2804 and/or the object organization state 2816, image data from cameras is processed to identify different objects (block 2706). The robot selects a specific object type/category to pick up, determines a next waypoint to navigate to, and determines a target object and location of type to pick up based on the map of environment (block 2708, block 2710, and block 2712).

In the object pick-up state 2824, the robot selects a goal location that is adjacent to the target object(s) (block 2714). It uses a path planning algorithm to navigate itself to that new location while avoiding obstacles. The robot actuates left and right pusher arms to create an opening large enough that the target object may fit through, but not so large that other unwanted objects are collected when the robot drives forwards (block 2716). The robot drives forwards so that the target object is between the left and right pusher arms, and the left and right pusher arms work together to push the target object onto the collection scoop (block 2718).

The robot may continue in the object pick-up state 2824 to identify other target objects of the selected type to pick up based on the map of environment. If other such objects are detected, the robot selects a new goal location that is adjacent to the target object. It uses a path planning algorithm to navigate itself to that new location while avoiding obstacles, while carrying the target object(s) that were previously collected. The robot actuates left and right pusher arms to create an opening large enough that the target object may fit through, but not so large that other unwanted objects are collected when the robot drives forwards. The robot drives forwards so that the next target object(s) are between the left and right pusher arms. Again, the left and right pusher arms work together to push the target object onto the collection scoop.

On condition that all identified objects in category are picked up 2832, or if the scoop is at capacity 2834, the robot transitions to the object drop-off state 2836 and uses the map of the environment to select goal location that is adjacent to bin for the type of objects collected and uses a path planning algorithm to navigate itself to that new location while avoiding obstacles (block 2720). The robot backs up towards the bin into a docking position where back of the robot is aligned with the back of the bin (block 2722). The robot lifts the scoop up and backwards rotating over a rigid arm at the back of the robot (block 2724). This lifts the target objects up above the top of the bin and dumps them into the bin.

From the object drop-off state 2836, the robot may transition back to the environment exploration state 2804 on condition that there are more items to pick up 2838, or it has an incomplete map of the environment 2840. the robot resumes exploring and the process may be repeated (block 2726) for each other type of object in the environment having an associated collection bin.

The robot may alternatively transition from the object drop-off state 2836 to the sleep state 2802 on condition that there are no more objects to pick up 2812 or the battery is low 2814. Once the battery recharges sufficiently, or at the next activation or scheduled pick-up interval, the robot resumes exploring and the process may be repeated (block 2726) for each other type of object in the environment having an associated collection bin.

Figure 29:
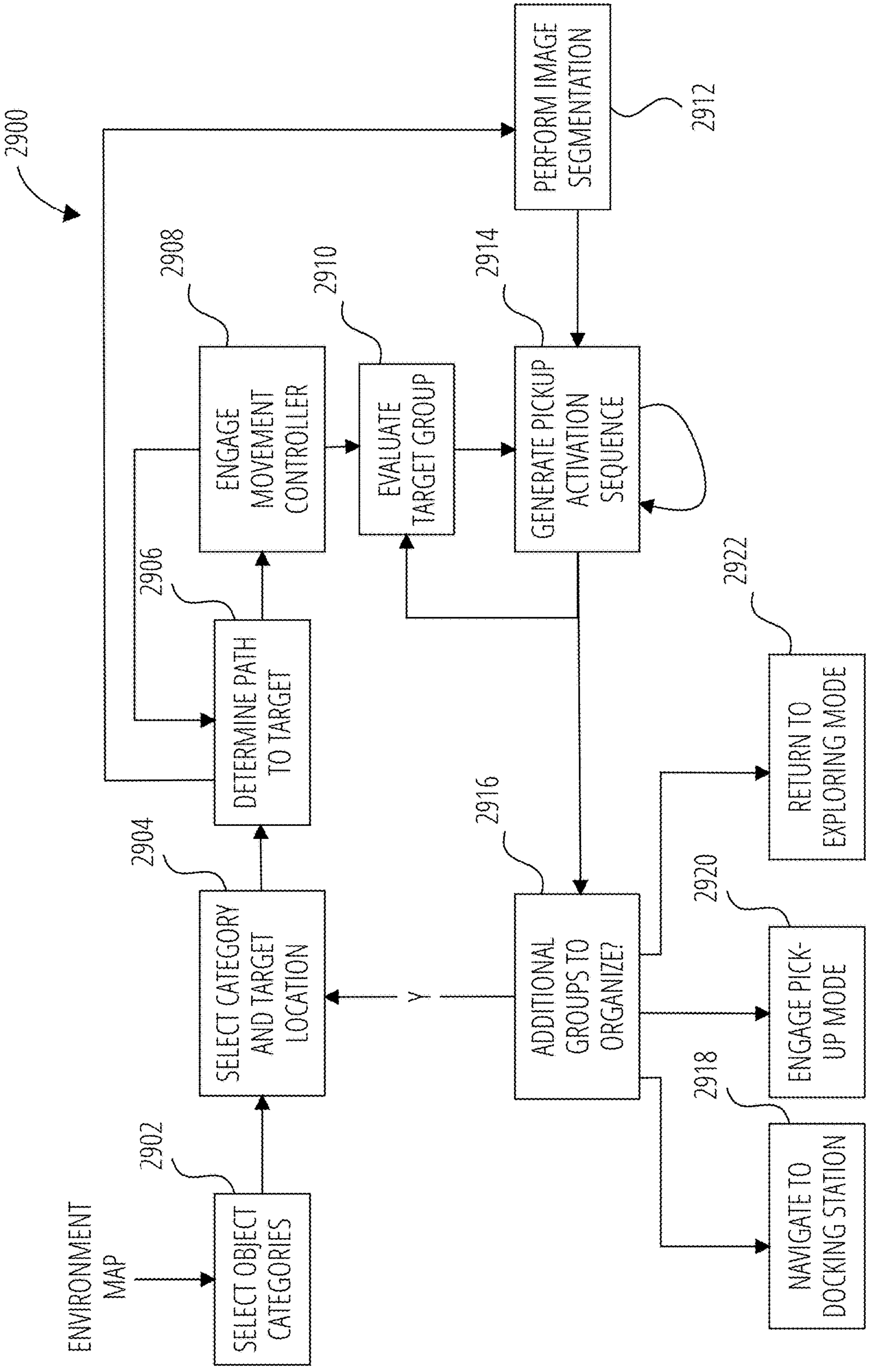
FIG. 29 depicts a robotic control algorithm 2900 for a robotic system in accordance with one embodiment.

FIG. 29 depicts a robotic control algorithm 2900 for a robotic system in one embodiment. The robotic control algorithm 2900 begins by selecting one or more category of objects to organize (block 2902). Within the selected category or categories, a grouping is identified that determines a target category and starting location for the path (block 2904). Any of a number of well-known clustering algorithms may be utilized to identify object groupings within the category or categories.

A path is formed to the starting goal location, the path comprising zero or more waypoints (block 2906). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 2908). The target group is evaluated upon achieving the goal location, including additional qualifications to determine if it may be safely organized (block 2910).

The robot's perception system is engaged (block 2912) to provide image segmentation for determination of a sequence of activations generated for the robot's manipulators (e.g., arms) and positioning system (e.g., wheels) to organize the group (block 2914). The sequencing of activations is repeated until the target group is organized, or fails to organize (failure causing regression to block 2910). Engagement of the perception system may be triggered by proximity to the target group. Once the target group is organized, and on condition that there is sufficient battery life left for the robot and there are more groups in the category or categories to organize, these actions are repeated (block 2916).

In response to low battery life the robot navigates back to the docking station to charge (block 2918). However, if there is adequate battery life, and on condition that the category or categories are organized, the robot enters object pick-up mode (block 2920), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 2922).

Figure 30:
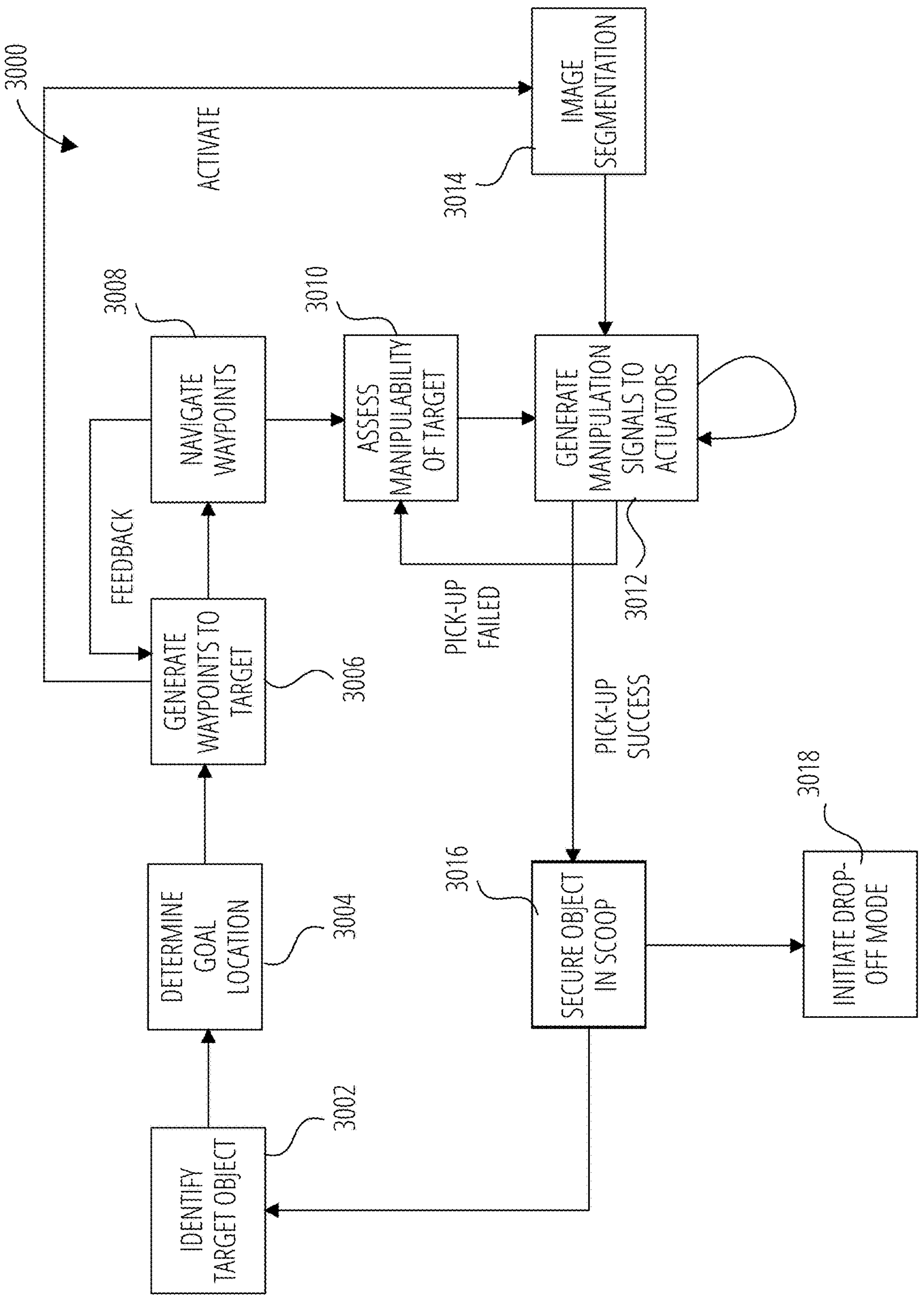
FIG. 30 depicts a robotic control algorithm 3000 for a robotic system in accordance with one embodiment.

FIG. 30 depicts a robotic control algorithm 3000 for a robotic system in one embodiment. A target object in the chosen object category is identified (item 3002) and a goal location for the robot is determined as an adjacent location of the target object (item 3004). A path to the target object is determined as a series of waypoints (item 3006) and the robot is navigated along the path while avoiding obstacles (item 3008).

Once the adjacent location is reached, as assessment of the target object is made to determine if may be safely manipulated (item 3010). On condition that the target object may be safely manipulated, the robot is operated to lift the object using the robot's manipulator arm, e.g., scoop (item 3012). The robot's perception module may by utilized at this time to analyze the target object and nearby objects to better control the manipulation (item 3014).

The target object, once on the scoop or other manipulator arm, is secured (item 3016). On condition that the robot does not have capacity for more objects, or it's the last object of the selected category(ies), object drop-off mode is initiated (item 3018). Otherwise the robot may begin the process again (3002).

Figure 31:
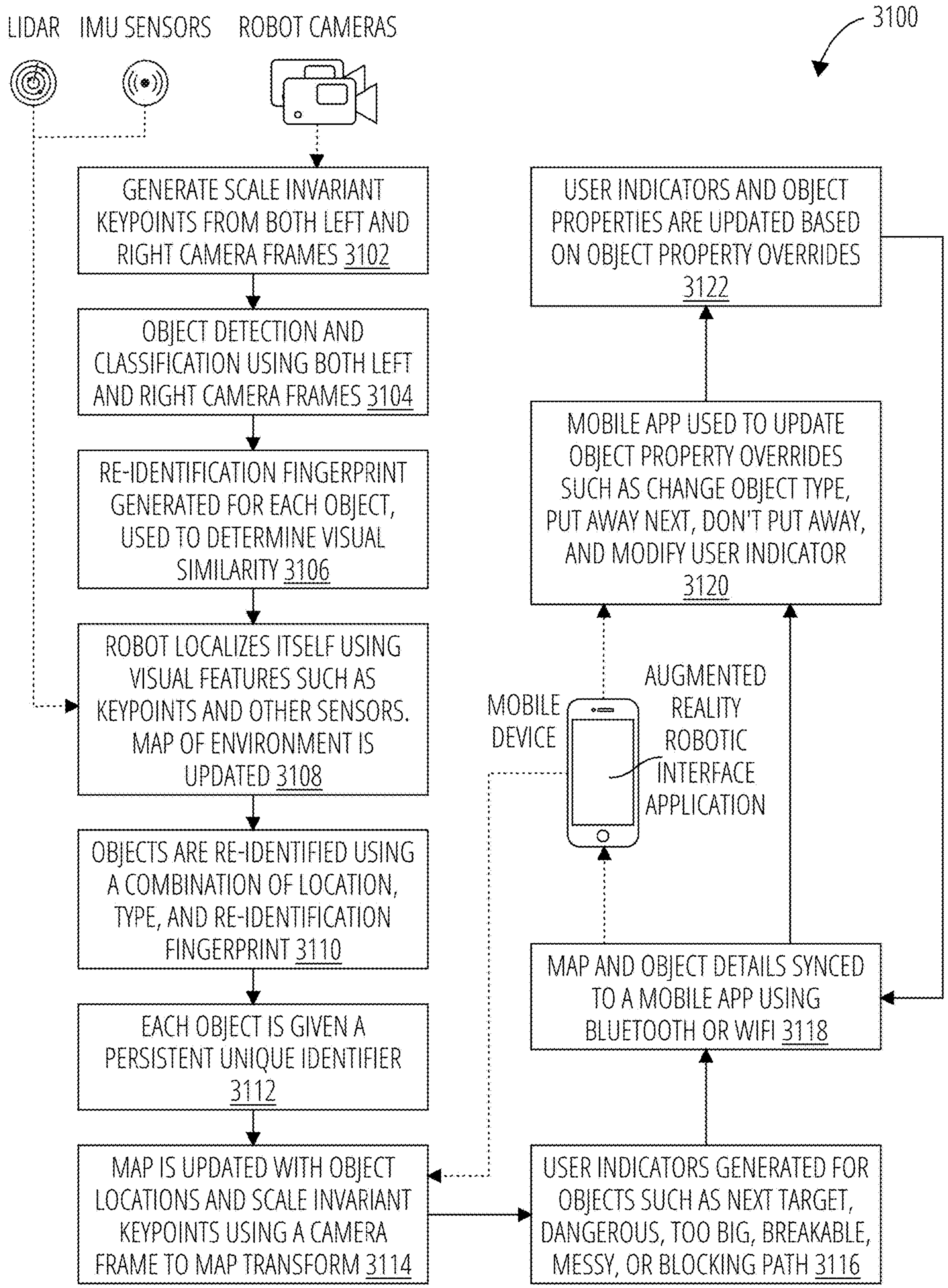
FIG. 31 depicts a robotic control algorithm 3100 in accordance with one embodiment.

FIG. 31 illustrates a robotic control algorithm 3100 in accordance with one embodiment. At block 3102, a left camera and a right camera, or some other configuration of robot cameras, of a robot such as that disclosed herein, may provide input that may be used to generate scale invariant keypoints within a robot's working space.

"Scale invariant keypoint" or "visual keypoint" in this disclosure refers to a distinctive visual feature that may be maintained across different perspectives, such as photos taken from different areas. This may be an aspect within an image captured of a robot's working space that may be used to identify a feature of the area or an object within the area when this feature or object is captured in other images taken from different angles, at different scales, or using different resolutions from the original capture.

Scale invariant keypoints may be detected by a robot or an augmented reality robotic interface installed on a mobile device based on images taken by the robot's cameras or the mobile device's cameras. Scale invariant keypoints may help a robot or an augmented reality robotic interface on a mobile device to determine a geometric transform between camera frames displaying matching content. This may aid in confirming or fine-tuning an estimate of the robot's or mobile device's location within the robot's working space.

Scale invariant keypoints may be detected, transformed, and matched for use through algorithms well understood in the art, such as (but not limited to) Scale-Invariant Feature Transform (SIFT), Speeded-Up Robust Features (SURF), Oriented Robust Binary features (ORB), and SuperPoint.

Objects located in the robot's working space may be detected at block 3104 based on the input from the left camera and the right camera, thereby defining starting locations for the objects and classifying the objects into categories. In one embodiment, a machine learning model may be run on left and right camera frames to generate a panoptic segmentation of the scene and a depth estimation layer.

At block 3106, re-identification fingerprints may be generated for the objects, wherein the re-identification fingerprints are used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 3108, the robot may be localized within the robot's working space. Input from at least one of the left camera, the right camera, light detecting and ranging (LIDAR) sensors, and inertial measurement unit (IMU) sensors may be used to determine a robot location. The robot's working space may be mapped to create a global area map that includes the scale invariant keypoints, the objects, and the starting locations of the objects. The objects within the robot's working space may be re-identified at block 3110 based on at least one of the starting locations, the categories, and the re-identification fingerprints. Each object may be assigned a persistent unique identifier at block 3112.

At block 3114, the robots may receive a camera frame from an augmented reality robotic interface installed as an application on a mobile device operated by a user, and may update the global area map with the starting locations and scale invariant keypoints using a camera frame to global area map transform based on the camera frame. In the camera frame to global area map transform, the global area map may be searched to find a set of scale invariant keypoints that match the those detected in the mobile camera frame by using a specific geometric transform. This transform may maximize the number of matching keypoints and minimize the number of non-matching keypoints while maintaining geometric consistency.

At block 3116, user indicators may be generated for objects, wherein user indicators may include next target, target order, dangerous, too big, breakable, messy, and blocking travel path. The global area map and object details may be transmitted to the mobile device at block 3118, wherein object details may include at least one of visual snapshots, the categories, the starting locations, the persistent unique identifiers, and the user indicators of the objects. This information may be transmitted using wireless signaling such as BlueTooth or Wifi, as supported by the communications 134 module introduced in FIG. 1C and the network interface 2512 introduced in FIG. 25.

The updated global area map, the objects, the starting locations, the scale invariant keypoints, and the object details, may be displayed on the mobile device using the augmented reality robotic interface. The augmented reality robotic interface may accept user inputs to the augmented reality robotic interface, wherein the user inputs indicate object property overrides including change object type, put away next, don't put away, and modify user indicator, at block 3120. The object property overrides may be transmitted from the mobile device to the robot, and may be used at block 3122 to update the global area map, the user indicators, and the object details. Returning to block 3118, the robot may re-transmit its updated global area map to the mobile device to resynchronize this information.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A robotic system comprising:
- a robot including:
  - a scoop;
  - pusher pad arms with pusher pads to open and close across a front end of the scoop at a front end of the robot,
    - wherein the pusher pad arms with the pusher pads include a first pusher pad coupled to a first pusher pad arm at a first pad pivot point adjacent to a first front side of the scoop and a second pusher pad coupled to a second pusher pad arm at a second pad pivot point adjacent to a second front side of the scoop, and
    - wherein the first pad pivot point allows the first pusher pad to open and close across the first front side of the scoop and the second pad pivot point allows the second pusher pad to open and close across the second front side of the scoop;
  - at least one wheel or one track for mobility of the robot;
  - a processor; and
  - a memory storing instructions that, when executed by the processor, allow operation and control of the robot;
- a base station;
- a plurality of ball baskets for at least one of storing balls and launching the balls;
- a robotic control system in at least one of the robot and a cloud server; and
- logic, to:
  - execute an initialization mode, including:
    - map, by the robot using data from cameras of the robot, an environment with a court, including:
      - identify the court, court boundary lines, at least one player on the court, and ball baskets; and
      - localize itself within the environment;
  - receive an operating state from at least one of a user and a timing setting;
  - on condition the operating state is a pick up ball mode:
    - determine if a pickup threshold has been reached;
    - on condition the pickup threshold has not been reached:
      - determine a pickup strategy for picking up the balls;
      - execute the pickup strategy until the pickup threshold has been reached, the pickup strategy including:
        - navigate the environment while following ball pickup area rules;
        - extend the pusher pads out and forward with respect to the pusher pad arms and raise the pusher pads to a grabbing height;

approach a target ball, coming to a stop when the target ball is positioned between the pusher pads;

subsequently push the target ball with the pusher pads onto the scoop to hold the target ball in the scoop; and raise at least one of the scoop and the pusher pads, holding the target ball, to a carrying position;

determine if the pickup threshold has been reached;

on condition the pickup threshold has been reached:

execute a post pickup mode, including:

navigate to a post pickup location to at least one of:

transfer the balls into the ball baskets; and bring the balls to the at least one player.

2. The robotic system of claim 1, wherein the robot includes:

a chassis;

a mobility system;

at least one first motor configured to actuate the mobility system;

a sensing system including the cameras;

a scoop arm associated with a second motor to rotate the scoop arm;

a third motor associated with the scoop arm and configured to rotate the scoop;

a linear actuator configured to retract and extend the scoop arm;

fourth motors configured to raise, lower, and extend the pusher pad arms;

fifth motors configured to rotate the pusher pads horizontally; and the logic further comprising:

rotate the pusher pads horizontally against the chassis through action of the fifth motors;

approach one of the ball baskets, by a front of the robot, by actuating the at least one first motor and the mobility system;

raise the scoop by actuating the second motor and rotating the scoop arm;

extend the linear actuator to move a front edge of the scoop over a wall of the ball basket;

rotate the scoop to a downward position by actuating the third motor;

allow the scoop to remain in the downward position until all of the balls have been deposited in the ball basket;

rotate the scoop to a horizontal position by actuating the third motor;

retract the linear actuator to move a front edge of the scoop away from the wall of the ball basket; and lower the scoop by actuating the second motor and rotating the scoop arm.

3. The robotic system of claim 2, the logic further comprising a carry basket mode, including:

navigate the robot to a target ball basket or a ball launcher;

lift, by the robot, the target ball basket or the ball launcher, with the scoop, into the carrying position; and transport the ball basket or the ball launcher to a new location.

4. The robotic system of claim 3, the logic further comprising a place basket mode, including:

lower, by the robot, the scoop, placing the ball basket or the ball launcher, at a current location.

5. The robotic system of claim 1, the logic further comprising a go to standby location mode, including:

on condition the balls have been transferred into the ball baskets or the balls have been removed by the at least one player:

navigate the robot to a standby location; and map the environment.

6. The robotic system of claim 1, the logic further comprising a follow person mode, including:

navigate the robot to keep a fixed distance from a target player; and pause movement when the target player stops moving or instructs the robot to stop moving.

7. The robotic system of claim 1, the logic further comprising a ready mode, including:

after the initialization mode, continue to map the environment, including at least one of:

a position of the at least one player;

locations of the balls;

points scored by the at least one player; and a stage of at least one of a game or a match.

8. The robotic system of claim 7, the logic further comprising a go to location mode, including:

navigate the robot to a location on a map to reach a target location;

on condition the target location is the base station:

dock at a charging dock on the base station; and enter at least one of a charging mode and a sleep mode; and on condition the target location is not the base station:

enter the ready mode.

9. A method comprising:

executing an initialization mode by a robot, the robot comprising a scoop, pusher pad arms with pusher pads to open and close across a front end of the scoop at a front end of the robot, wherein the pusher pad arms with the pusher pads include a first pusher pad coupled to a first pusher pad arm at a first pad pivot point adjacent to a first front side of the scoop and a second pusher pad coupled to a second pusher pad arm at a second pad pivot point adjacent to a second front side of the scoop, and wherein the first pad pivot point allows the first pusher pad to open and close across the first front side of the scoop and the second pad pivot point allows the second pusher pad to open and close across the second front side of the scoop, at least one wheel or one track for mobility of the robot, and a robotic control system including a processor and a memory storing instructions that, when executed by the processor, allow operation and control of the robot, and the initialization mode including:

mapping an environment with a court using data from cameras of the robot, including:

identifying the court, court boundary lines, at least one player on the court, and ball baskets; and localizing itself within the environment;

receiving an operating state from at least one of a user and a timing setting;

on condition the operating state is a pick up ball mode:

determining if a pickup threshold has been reached;

on condition the pickup threshold has not been reached:

determining a pickup strategy for picking up balls;

executing the pickup strategy until the pickup threshold has been reached, the pickup strategy including:

navigating the environment while following ball pickup area rules;

extending the pusher pads out and forward with respect to the pusher pad arms and raise the pusher pads to a grabbing height;

approaching a target ball, coming to a stop when the target ball is positioned between the pusher pads;

subsequently pushing the target ball with the pusher pads onto the scoop to hold the target ball in the scoop;

raising at least one of the scoop and the pusher pads, holding the target ball, to a carrying position; and determining if the pickup threshold has been reached;

on condition the pickup threshold has been reached:

executing a post pickup mode, including:

navigating to a post pickup location to at least one of:

transfer the balls into the ball baskets; and bring the balls to the at least one player.

10. The method of claim 9, further comprising:

wherein the robot includes a chassis, a mobility system, at least one first motor configured to actuate the mobility system, a sensing system including the cameras, a scoop arm associated with a second motor to rotate the scoop arm, a third motor associated with the scoop arm and configured to rotate the scoop, a linear actuator configured to retract and extend the scoop arm, fourth motors configured to raise, lower, and extend the pusher pad arms, and fifth motors configured to rotate the pusher pads horizontally;

rotating the pusher pads horizontally against the chassis through action of the fifth motors;

approaching one of the ball baskets, by a front of the robot, by actuating the at least one first motor and the mobility system;

raising the scoop by actuating the second motor and rotating the scoop arm;

extending the linear actuator to move a front edge of the scoop over a wall of the ball basket;

rotating the scoop to a downward position by actuating the third motor;

allowing the scoop to remain in the downward position until all of the balls have been deposited in the ball basket;

rotating the scoop to a horizontal position by actuating the third motor;

retracting the linear actuator to move a front edge of the scoop away from the wall of the ball basket; and lowering the scoop by actuating the second motor and rotating the scoop arm.

11. The method of claim 10, further comprising:

wherein the robot further includes a trailer configured to be coupled to a rear of the chassis, wherein the trailer includes trailer wheels and is configured to hold at least one ball basket;

extending the linear actuator to move a rear wall of the scoop from an initial position to a resulting position over a wall of the ball basket closest to the chassis;

raising the scoop over the chassis, from the front to the rear of the chassis, by actuating the second motor and rotating the scoop arm;

rotating the scoop, in a direction lowering the rear wall of the scoop to a downward position, by actuating the third motor;

allowing the scoop to remain in the downward position until all of the balls have been deposited in the ball basket;

lowering the scoop over the chassis, from the rear to the front of the chassis, by actuating the second motor and rotating the scoop arm;

rotating the scoop to the horizontal position by actuating the third motor; and retracting the linear actuator to move the scoop to the initial position.

12. The method of claim 11, further comprising:

navigating the robot to a target ball basket or a ball launcher;

lifting, by the robot, the target ball basket or the ball launcher, with the scoop, into the carrying position;

transporting, by the robot, the target ball basket or the ball launcher to the trailer;

loading the target ball basket or the ball launcher onto the trailer;

moving the robot into a trailer coupling position; and coupling the trailer to the robot.

13. The method of claim 10, further comprising:

executing a carry basket mode by the robot, including:

navigating the robot to a target ball basket or a ball launcher;

lifting, by the robot, the target ball basket or the ball launcher, with the scoop, into the carrying position; and transporting the ball basket or the ball launcher to a new location.

14. The method of claim 13, further comprising:

executing a place basket mode by the robot, including:

lower, by the robot, the scoop, placing the ball basket or the ball launcher, at a current location.

15. The method of claim 9, further comprising:

executing a go to standby location mode by the robot, including:

on condition the balls have been transferred into the ball baskets or the balls have been removed by the at least one player:

navigating the robot to a standby location; and mapping the environment.

16. The method of claim 9, further comprising:

executing a follow person mode by the robot, including:

navigating the robot to keep a fixed distance from a target player; and pause movement when the target player stops moving or instructs the robot to stop moving.

17. The method of claim 9, further comprising:

executing a ready mode by the robot, including:

after the initialization mode, continuing to map the environment, including at least one of:

a position of the at least one player;

locations of the balls;

points scored by the at least one player; and a stage of at least one of a game or a match.

18. The method of claim 17, further comprising:

executing a go to location mode by the robot, including:

navigating the robot to a location on a map to reach a target location;

on condition the target location is a base station:

docking at a charging dock on the base station; and entering at least one of a charging mode and a sleep mode; and on condition the target location is not the base station: entering the ready mode.

19. A robotic system comprising:

a robot including:

a scoop;

pusher pad arms with pusher pads;

at least one wheel or one track for mobility of the robot;

a processor; and a memory storing instructions that, when executed by the processor, allow operation and control of the robot;

a base station;

a plurality of ball baskets for at least one of storing balls and launching the balls;

a chassis;

a mobility system;

at least one first motor configured to actuate the mobility system;

a sensing system including cameras;

a scoop arm associated with a second motor to rotate the scoop arm;

a third motor associated with the scoop arm and configured to rotate the scoop;

a linear actuator configured to retract and extend the scoop arm;

fourth motors configured to raise, lower, and extend the pusher pad arms;

fifth motors configured to rotate the pusher pads horizontally;

a trailer configured to be coupled to a rear of the chassis, wherein the trailer includes trailer wheels and is configured to hold at least one ball basket;

a robotic control system in at least one of the robot and a cloud server; and logic, to:

execute an initialization mode, including:

map, by the robot, an environment with a court, including:

identify the court, court boundary lines, at least one player on the court, and ball baskets; and localize itself within the environment;

receive an operating state from at least one of a user and a timing setting;

on condition the operating state is a pick up ball mode:

determine if a pickup threshold has been reached;

on condition the pickup threshold has not been reached:

determine a pickup strategy for picking up the balls;

execute the pickup strategy until the pickup threshold has been reached, the pickup strategy including:

navigate the environment while following ball pickup area rules;

extend the pusher pads out and forward with respect to the pusher pad arms and raise the pusher pads to a grabbing height;

approach a target ball, coming to a stop when the target ball is positioned between the pusher pads;

push the target ball with the pusher pads onto the scoop to hold the target ball in the scoop; and raise at least one of the scoop and the pusher pads, holding the target ball, to a carrying position;

determine if the pickup threshold has been reached;

on condition the pickup threshold has been reached:

execute a post pickup mode, including:

navigate to a post pickup location to at least one of:

transfer the balls into the ball baskets; and bring the balls to the at least one player;

the logic further comprising:

rotate the pusher pads horizontally against the chassis through action of the fifth motors;

approach one of the ball baskets, by a front of the robot, by actuating the at least one first motor and the mobility system;

raise the scoop by actuating the second motor and rotating the scoop arm;

extend the linear actuator to move a front edge of the scoop over a wall of the ball basket;

rotate the scoop to a downward position by actuating the third motor;

allow the scoop to remain in the downward position until all of the balls have been deposited in the ball basket;

rotate the scoop to a horizontal position by actuating the third motor;

retract the linear actuator to move a front edge of the scoop away from the wall of the ball basket;

lower the scoop by actuating the second motor and rotating the scoop arm;

extend the linear actuator to move a rear wall of the scoop from an initial position to a resulting position over a wall of the ball basket closest to the chassis;

raise the scoop over the chassis, from the front to the rear of the chassis, by actuating the second motor and rotating the scoop arm;

rotate the scoop, in a direction lowering the rear wall of the scoop to a downward position, by actuating the third motor;

allow the scoop to remain in the downward position until all of the balls have been deposited in the ball basket;

lower the scoop over the chassis, from the rear to the front of the chassis, by actuating the second motor and rotating the scoop arm;

rotate the scoop to the horizontal position by actuating the third motor; and retract the linear actuator to move the scoop to the initial position.

20. The robotic system of claim 19, the logic further comprising:

navigate the robot to a target ball basket or a ball launcher;

lift, by the robot, the target ball basket or the ball launcher, with the scoop, into the carrying position;

transport, by the robot, the target ball basket or the ball launcher to the trailer;

load the target ball basket or the ball launcher onto the trailer;

move the robot into a trailer coupling position; and couple the trailer to the robot.

* * * * *